Feb. 5, 1952   F. X. REES ET AL   2,584,739
CENTRALIZED TRAFFIC CONTROLLING SYSTEM
Filed July 24, 1948

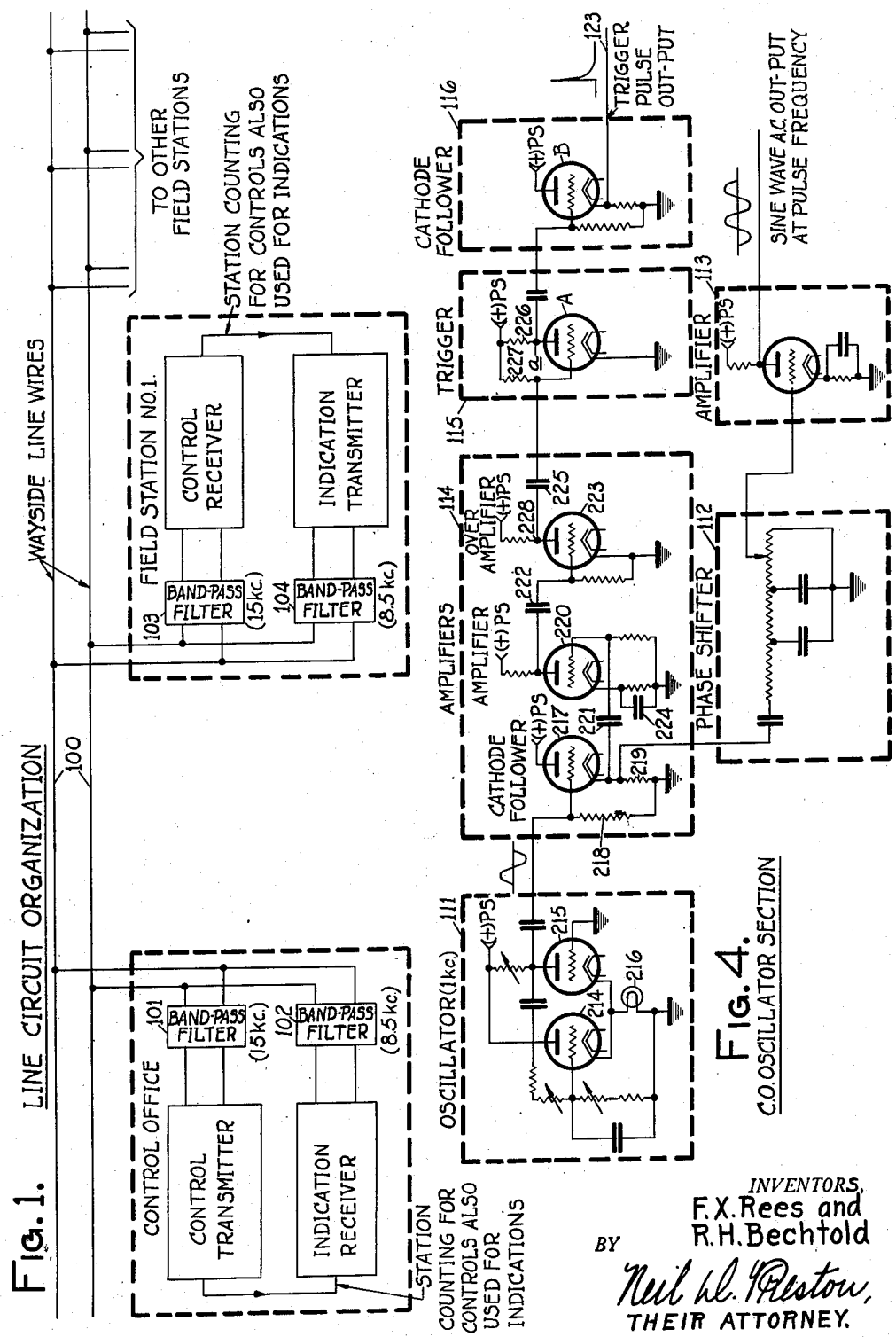
Feb. 5, 1952 — F. X. REES ET AL — 2,584,739
CENTRALIZED TRAFFIC CONTROLLING SYSTEM
Filed July 24, 1948 — 23 Sheets-Sheet 1
INVENTORS,
F.X.Rees and
R.H.Bechtold
BY
THEIR ATTORNEY.

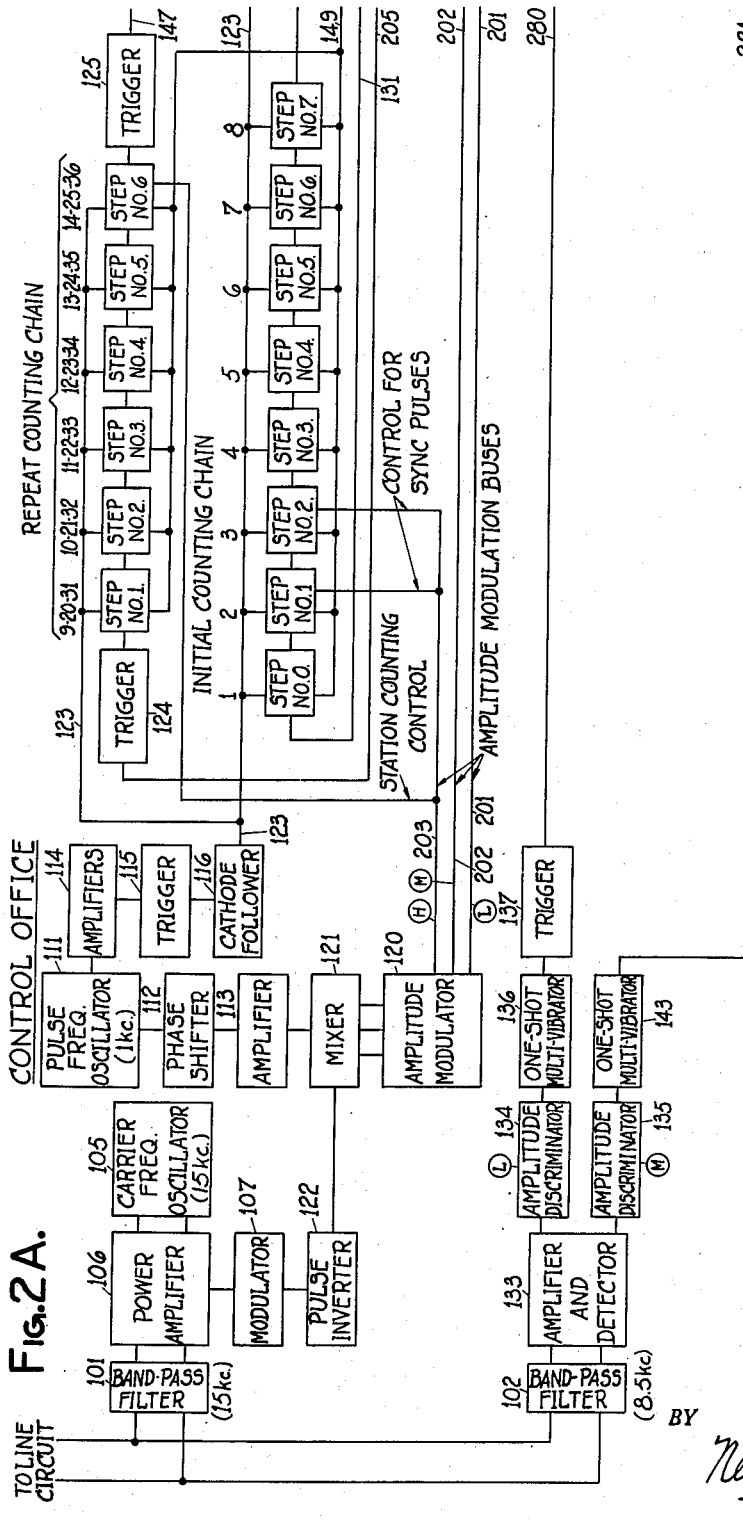

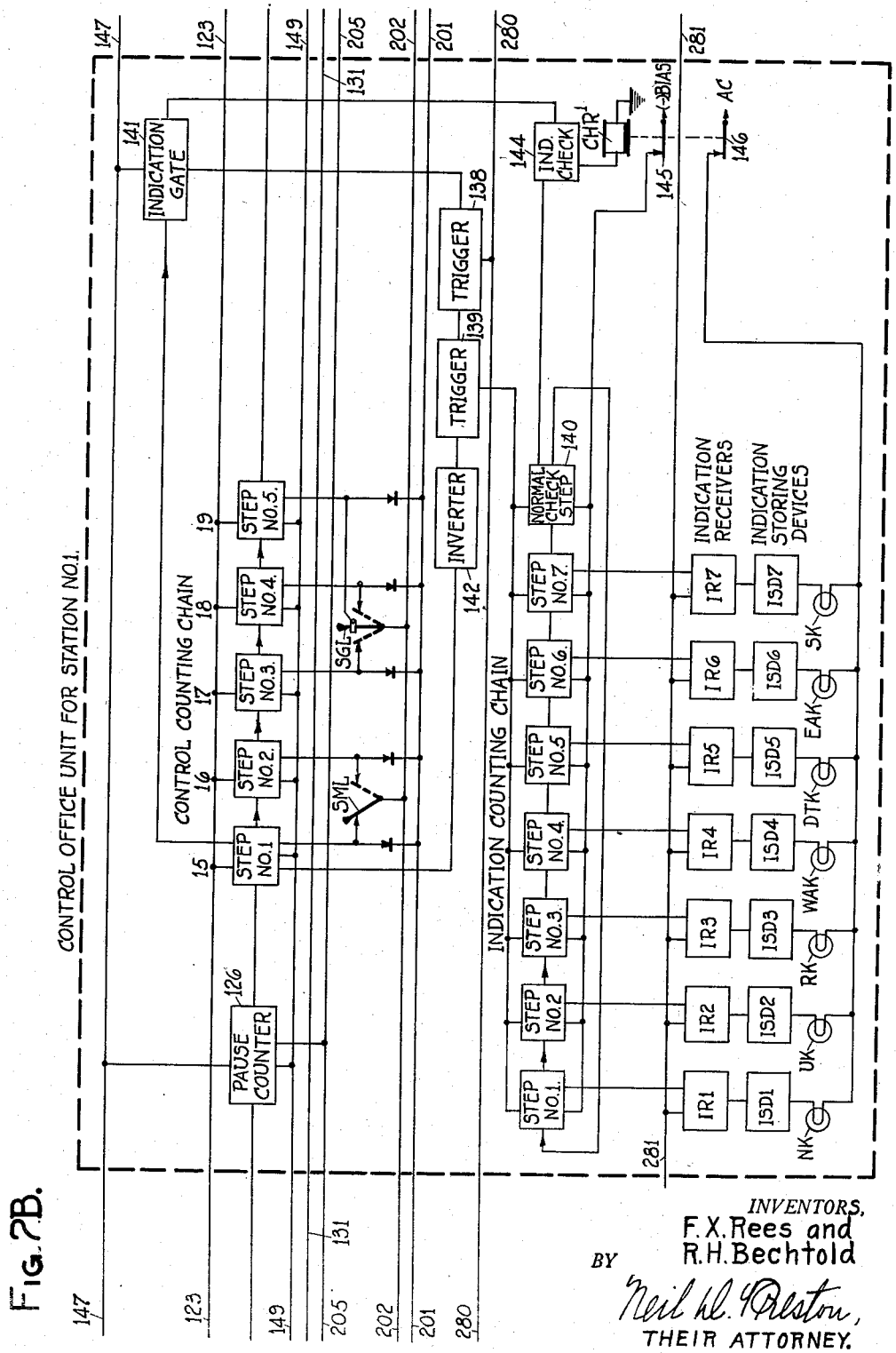

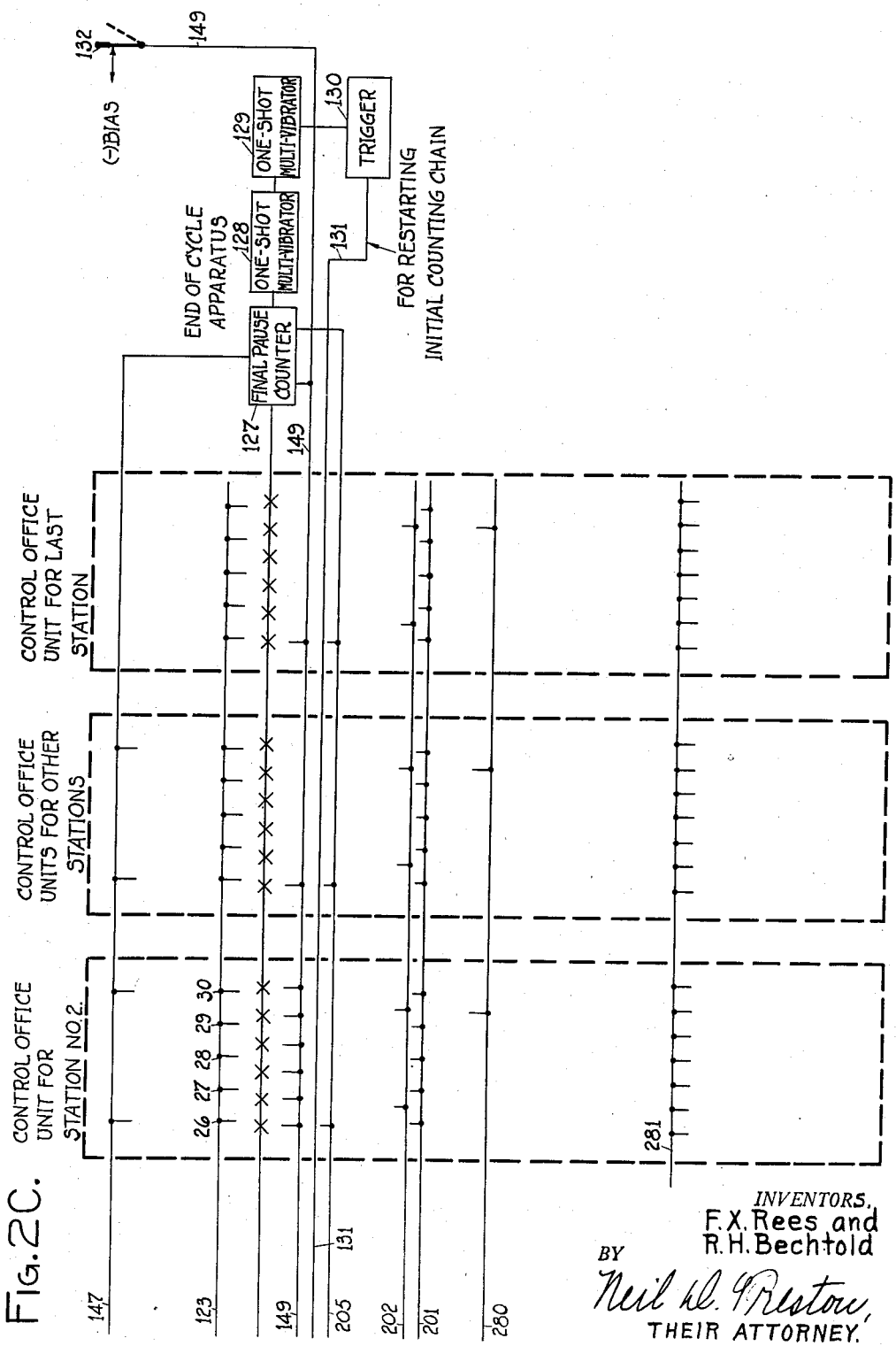

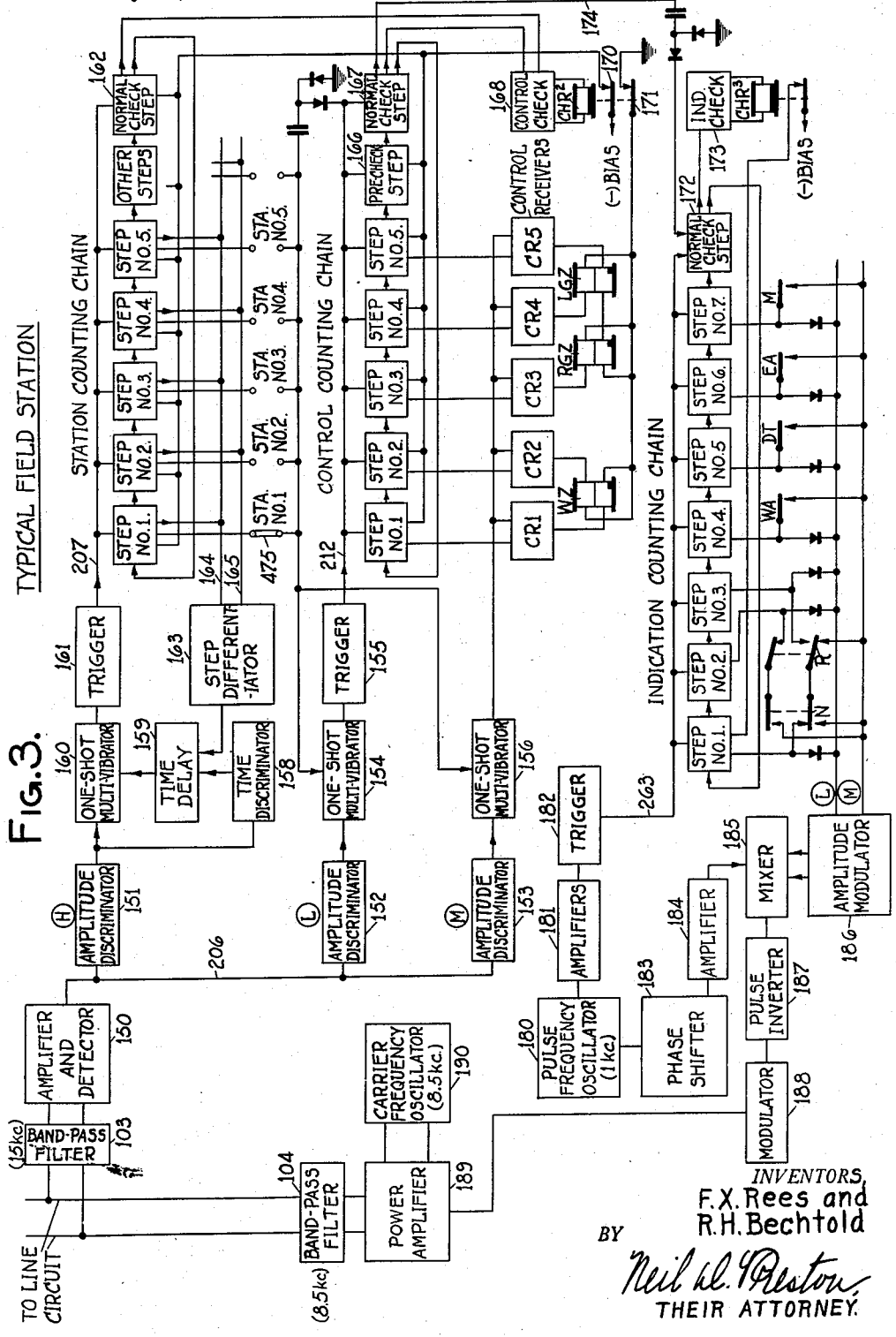

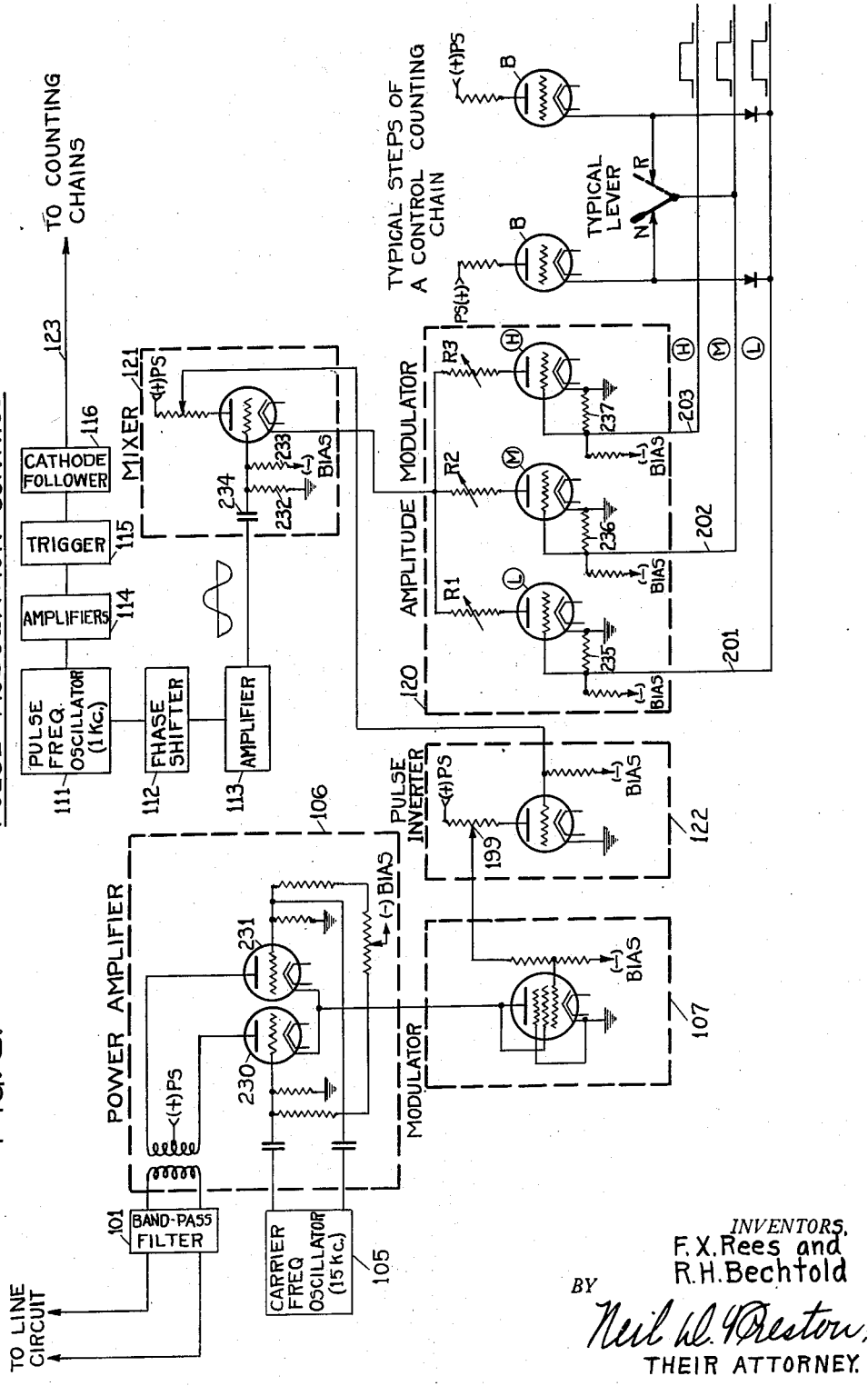

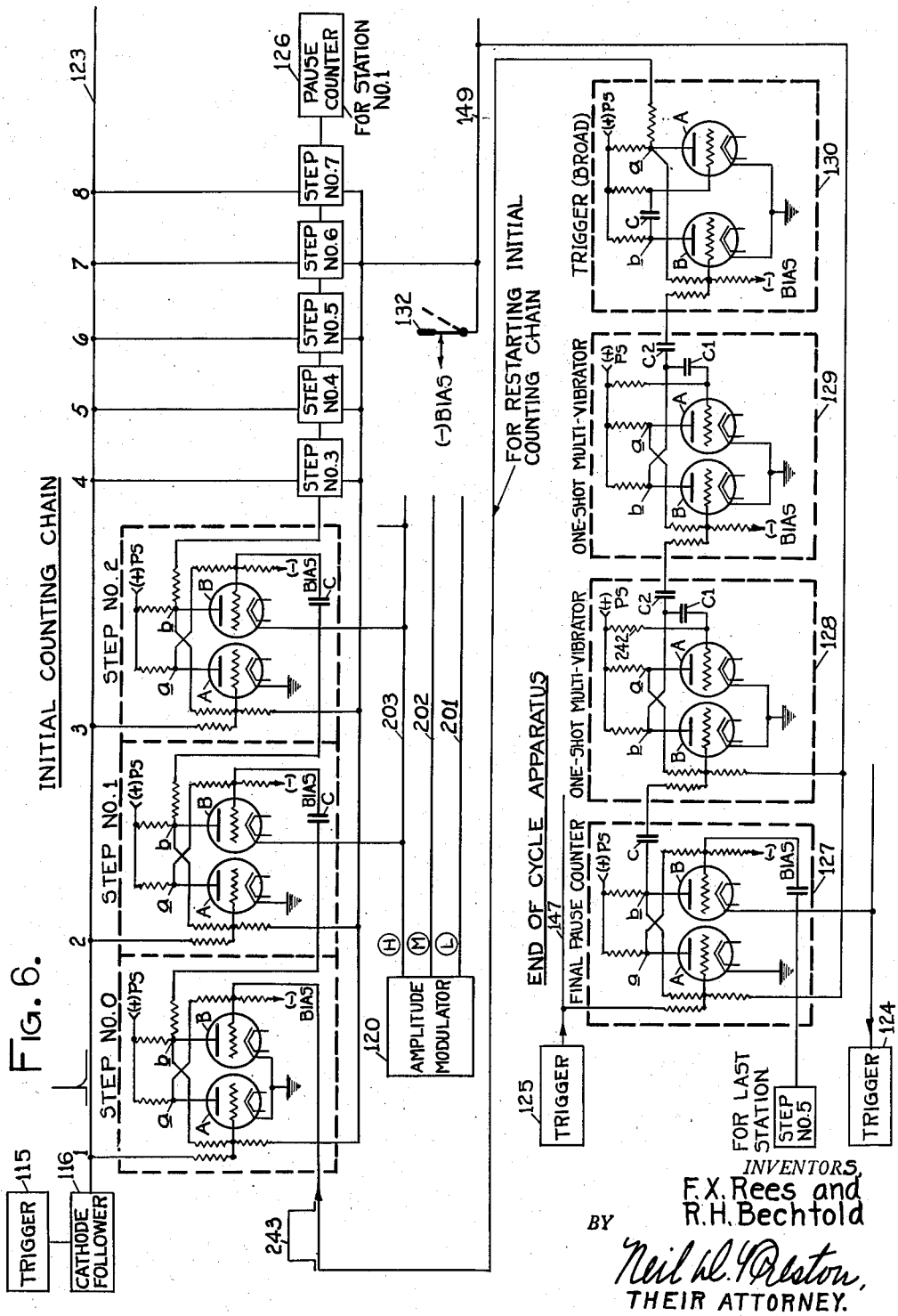

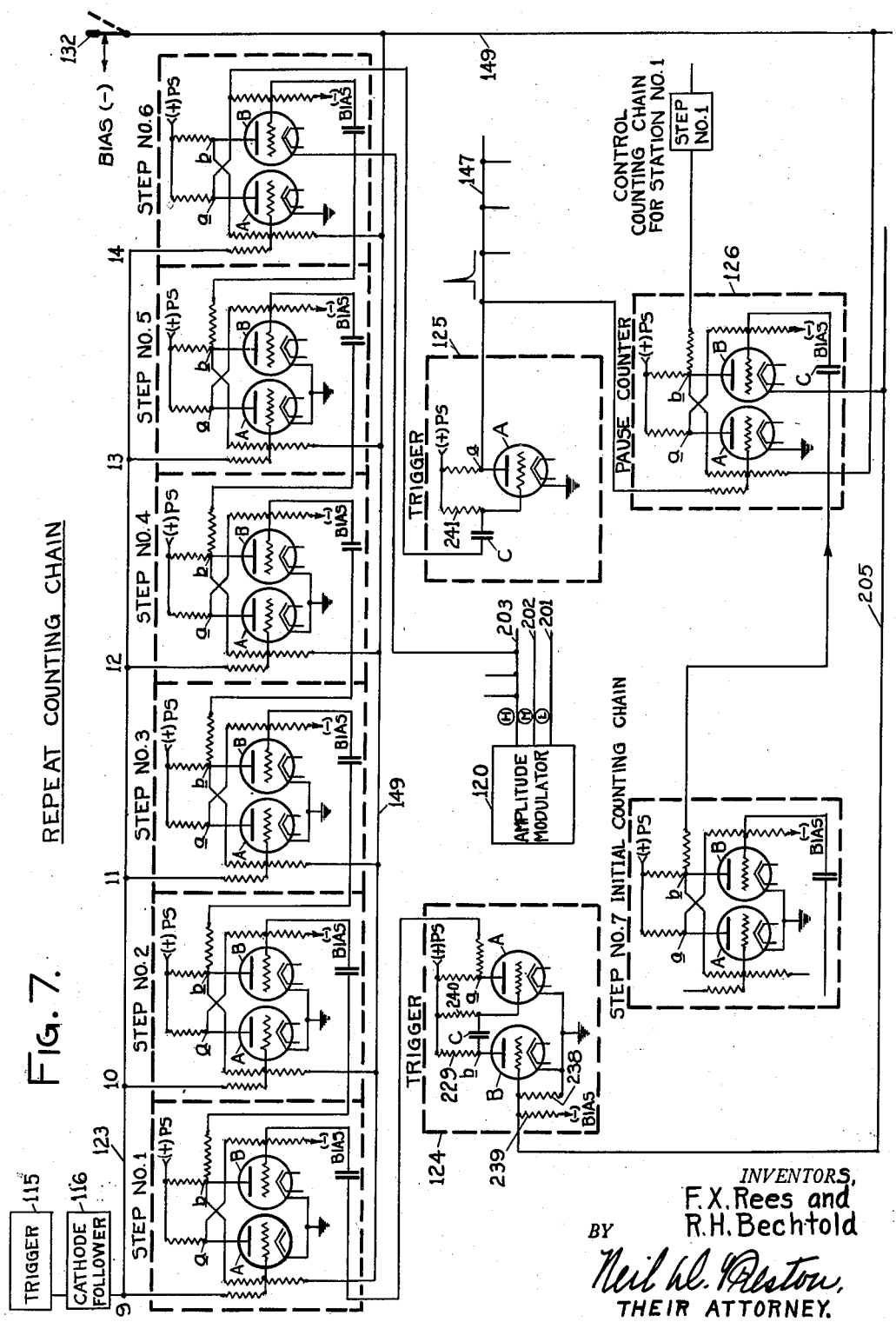

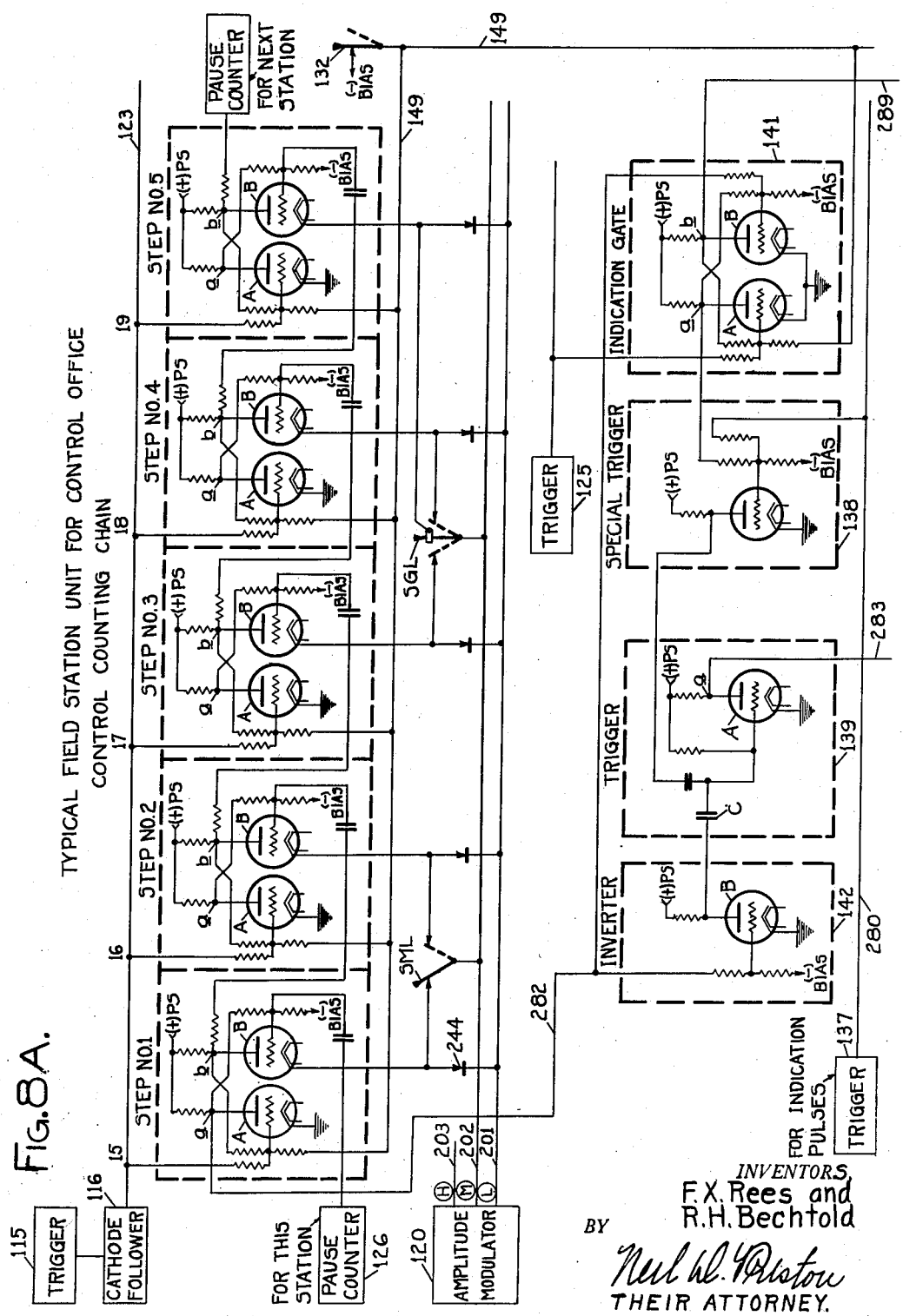

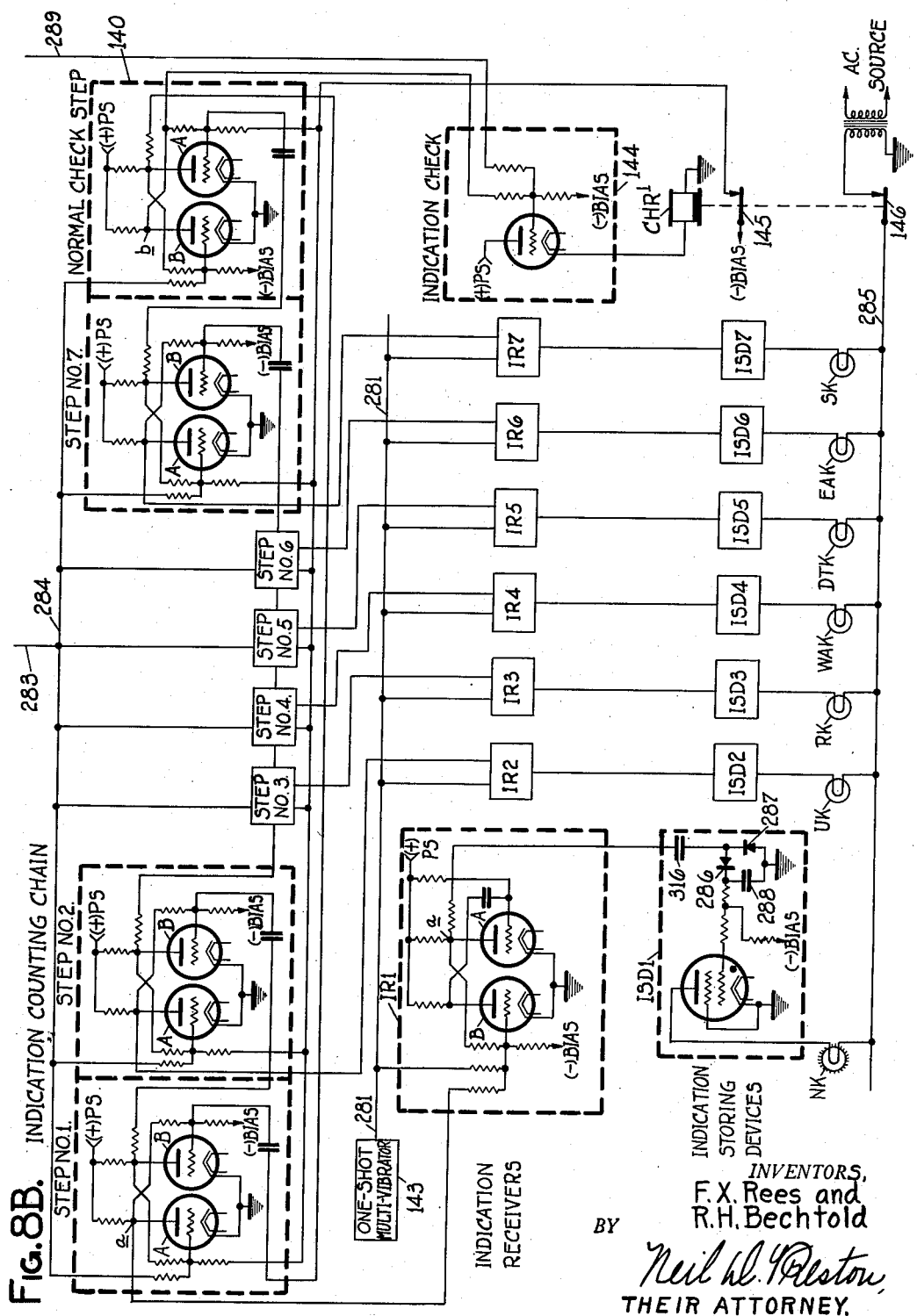

INVENTORS,
F.X. Rees and
R.H. Bechtold
BY
Neil W. Preston,
THEIR ATTORNEY.

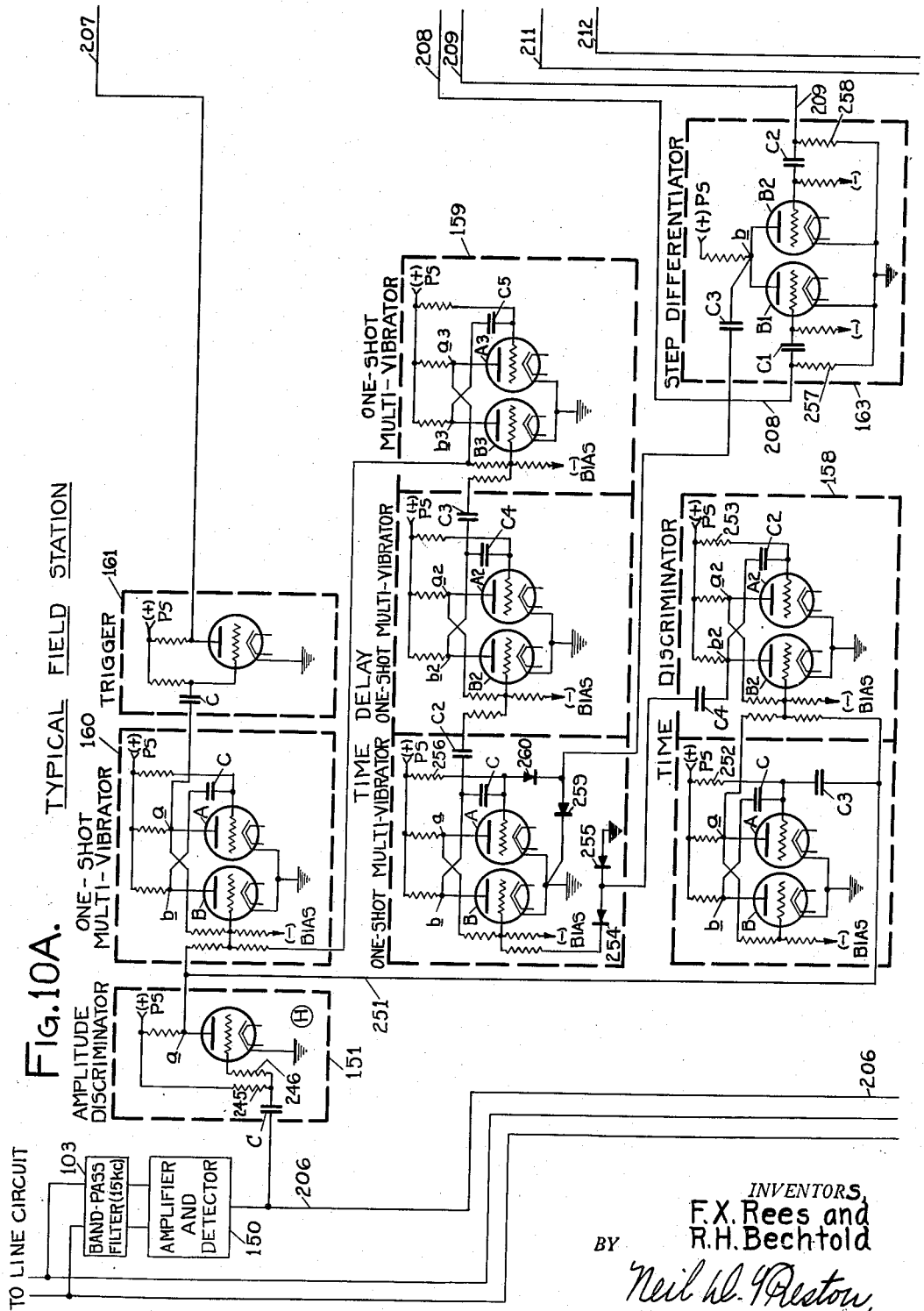

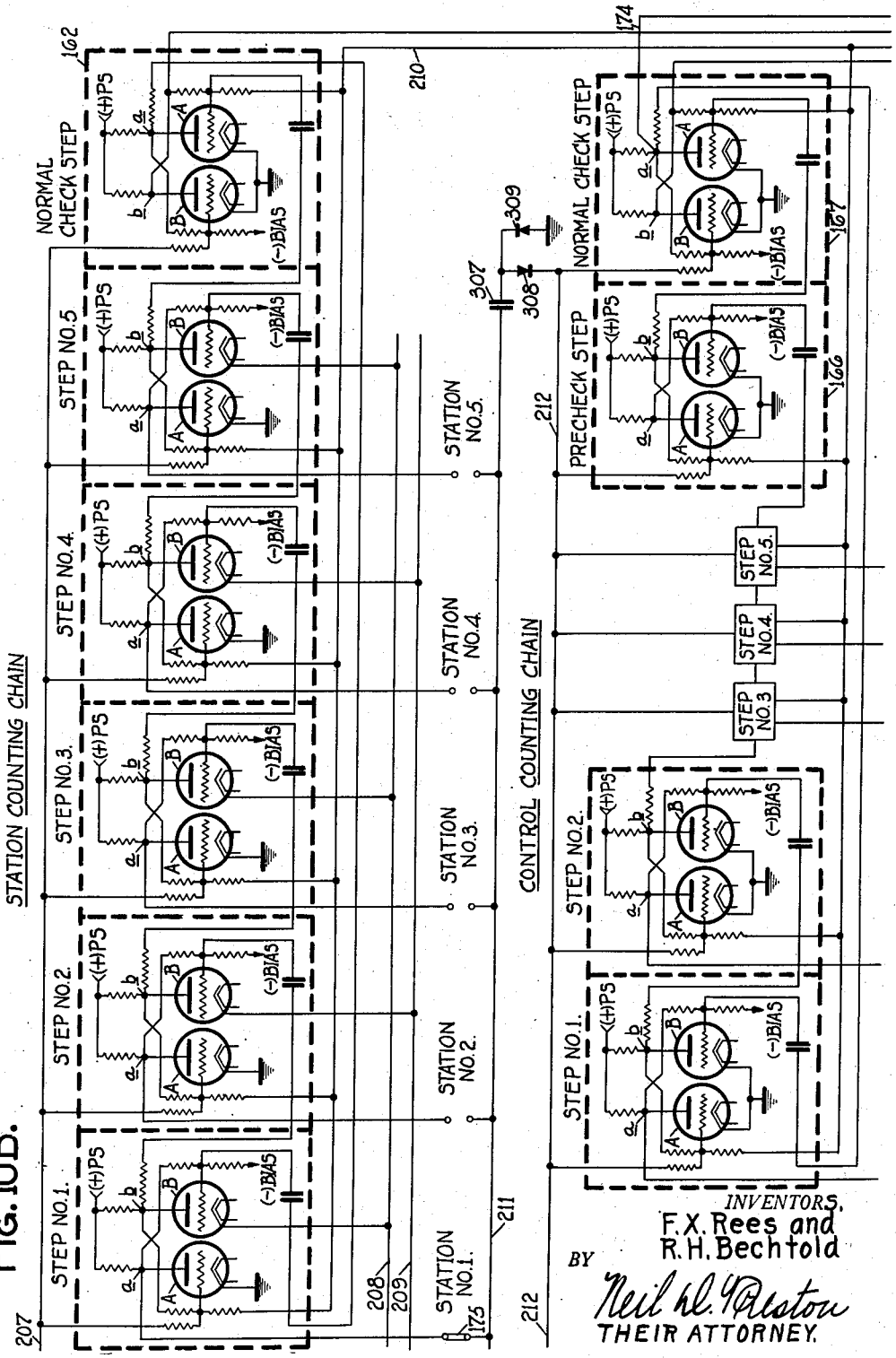

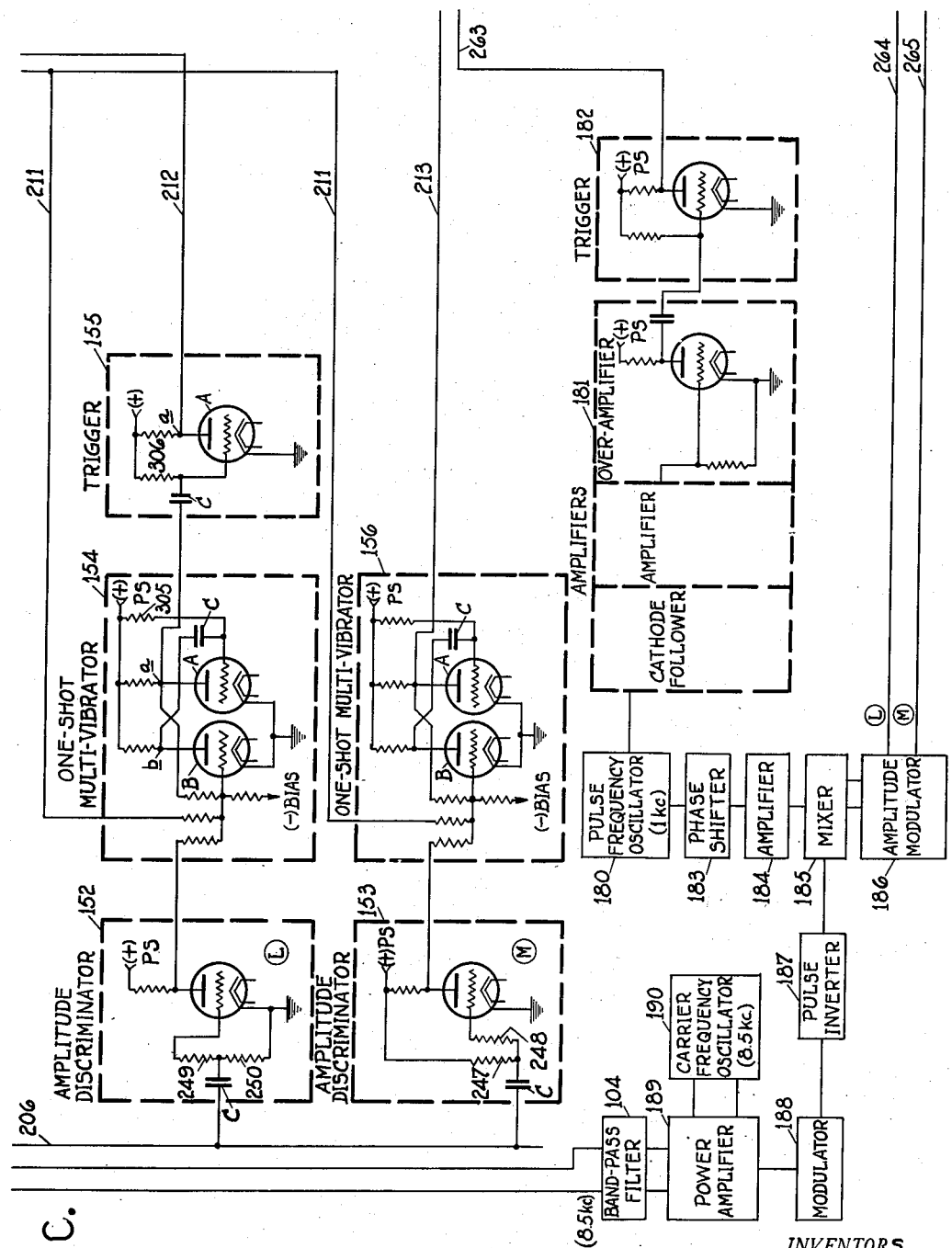

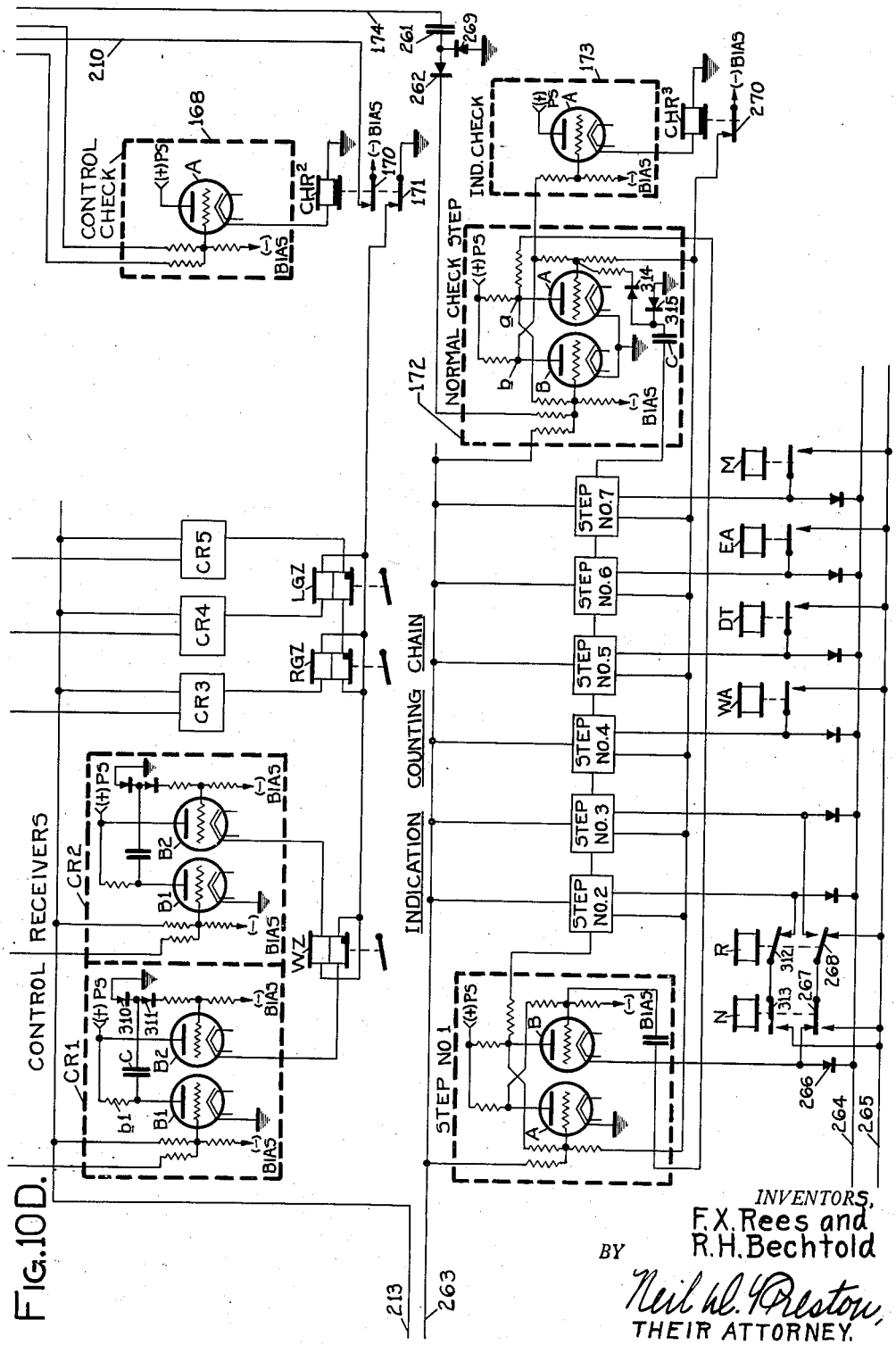

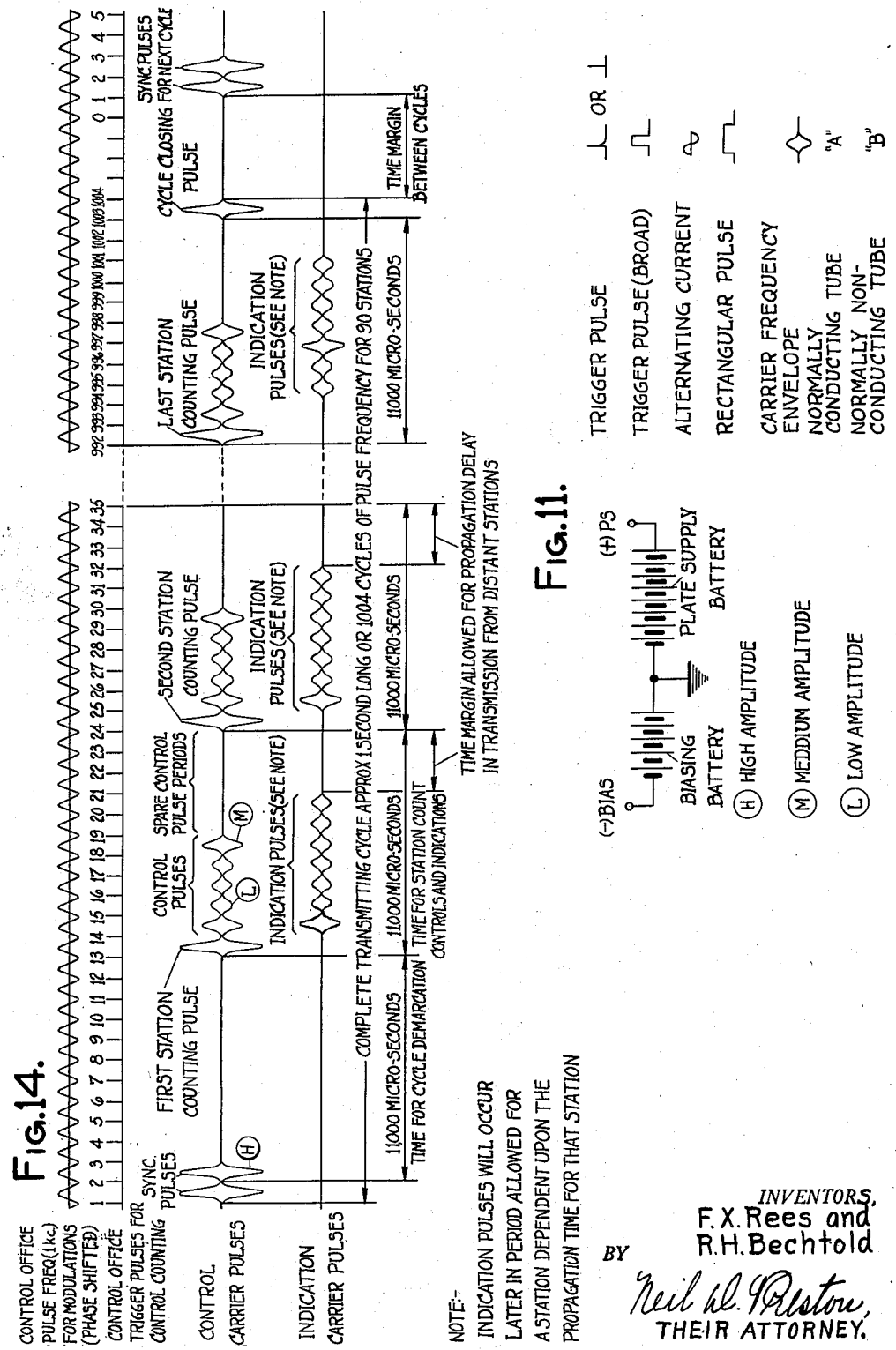

Feb. 5, 1952 F. X. REES ET AL 2,584,739
CENTRALIZED TRAFFIC CONTROLLING SYSTEM
Filed July 24, 1948 23 Sheets-Sheet 17
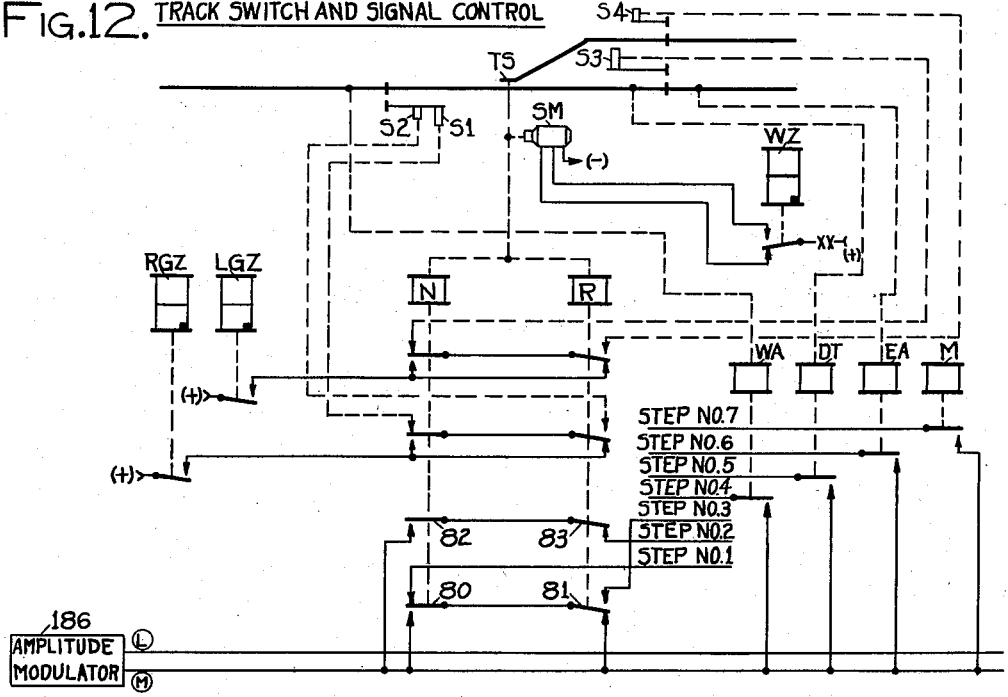
FIG.12. TRACK SWITCH AND SIGNAL CONTROL
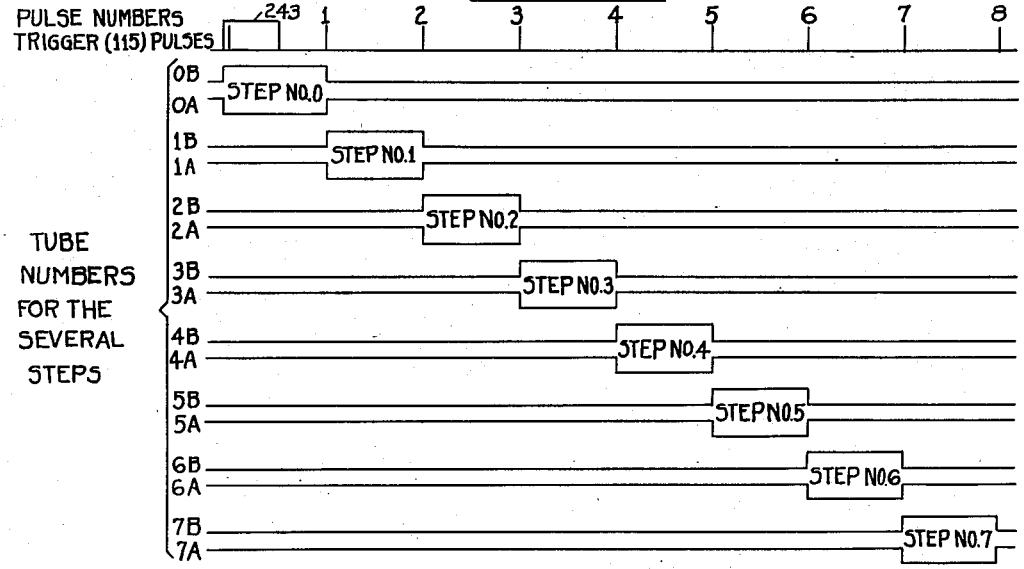
FIG.16. STEPPING CHART
INVENTORS,
F.X.Rees and
R.H.Bechtold
BY
Neil W. Palston,
THEIR ATTORNEY.

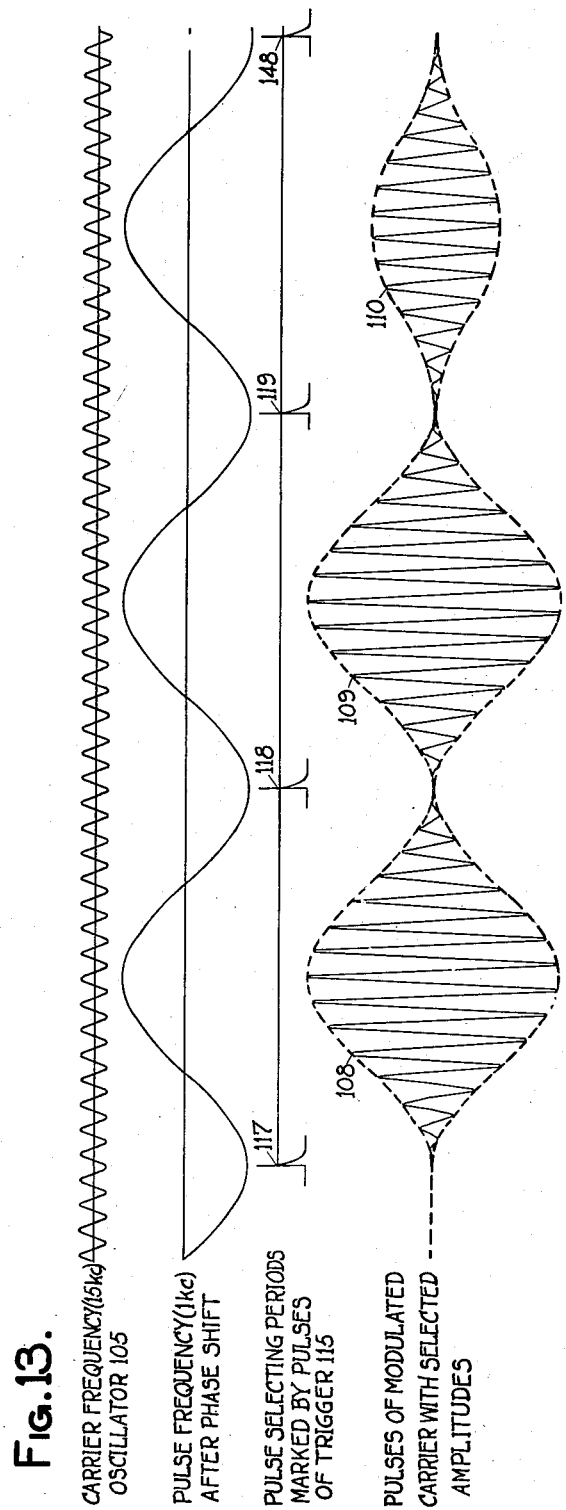
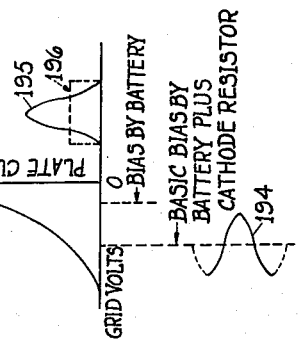
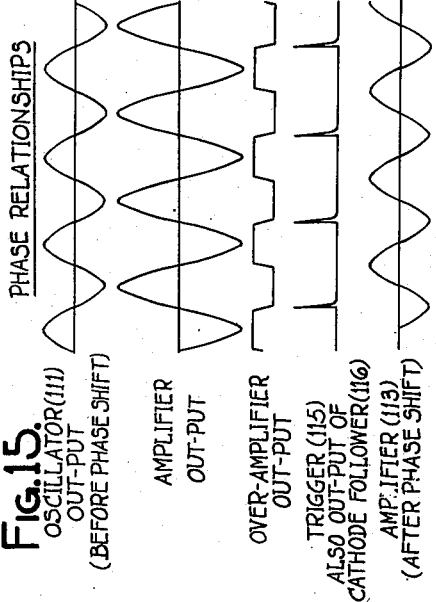
INVENTORS,
F. X. Rees and
R. H. Bechtold
BY
Neil W. Preston,
THEIR ATTORNEY.

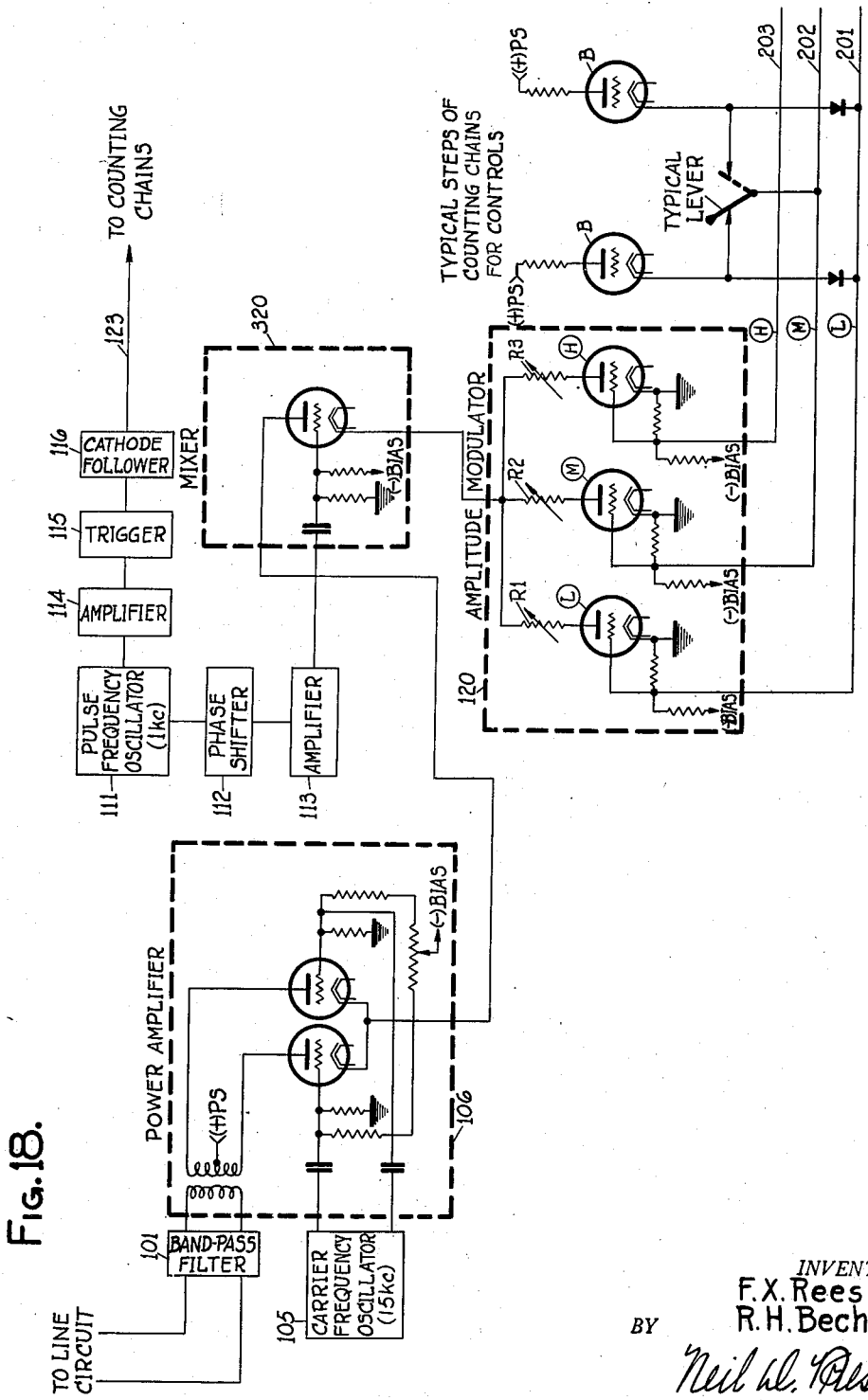

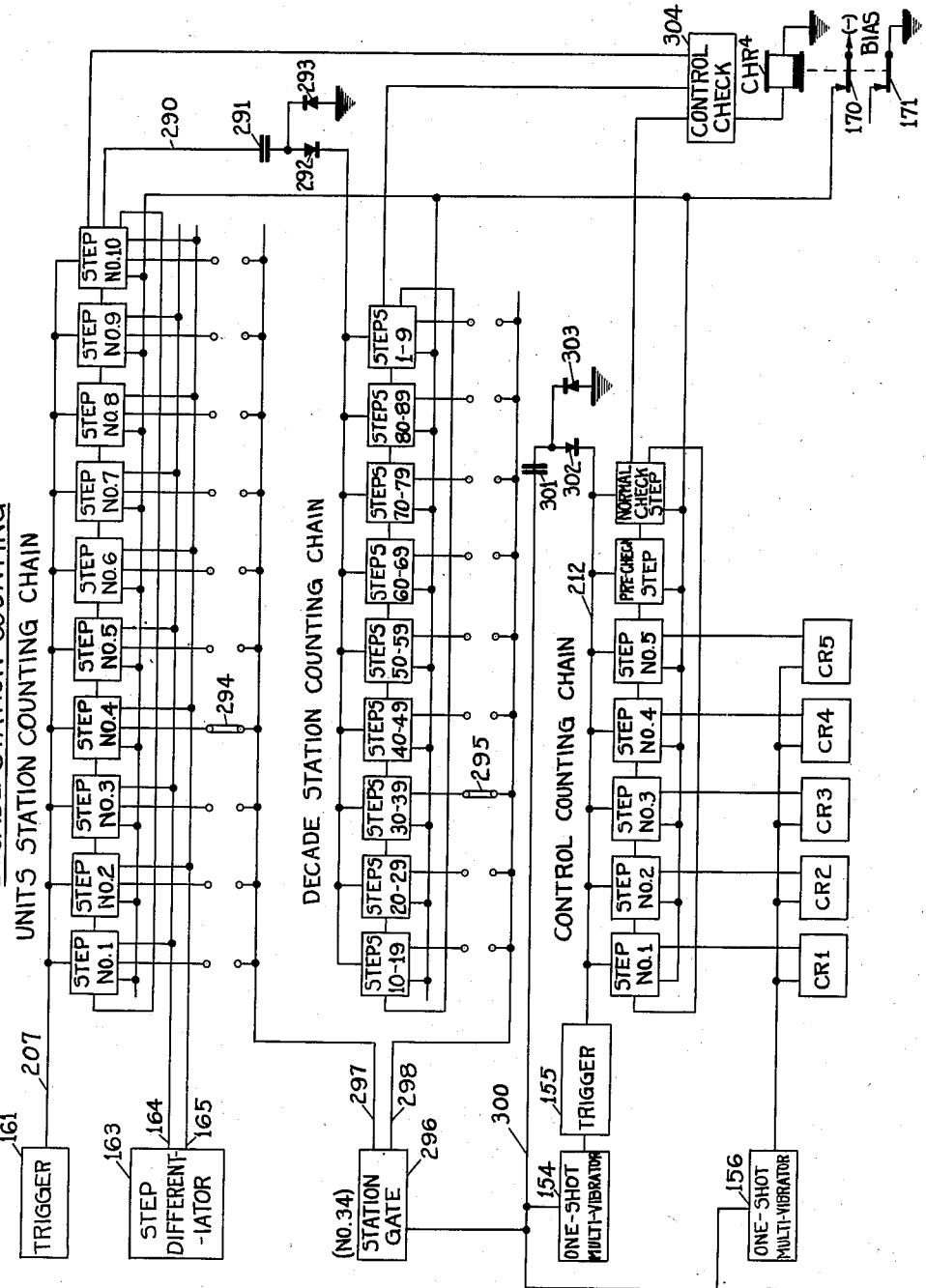

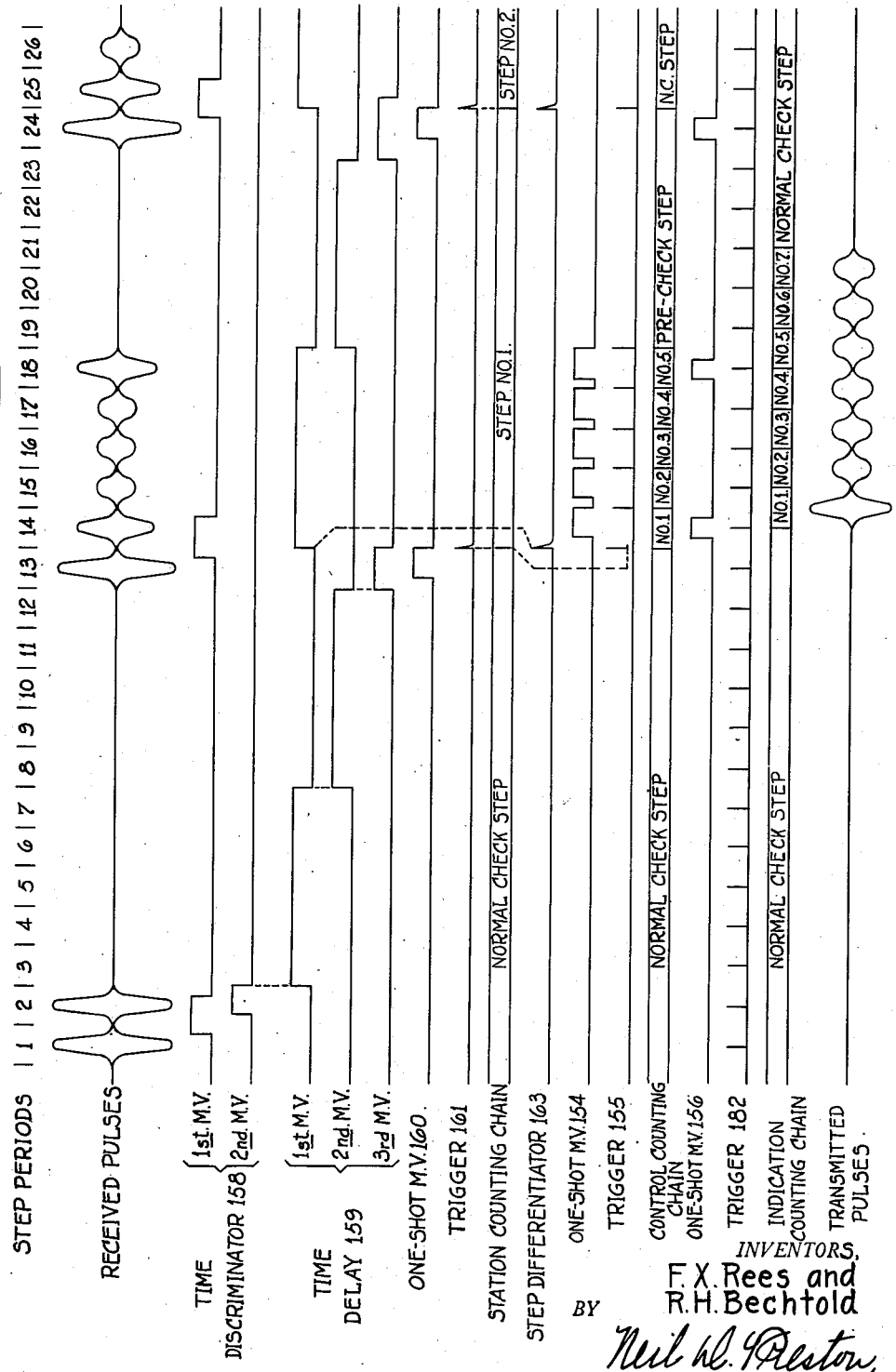

Feb. 5, 1952

F. X. REES ET AL 2,584,739

CENTRALIZED TRAFFIC CONTROLLING SYSTEM

Filed July 24, 1948

INVENTORS,
F. X. Rees and
R. H. Bechtold
BY
Neil W. Preston,
THEIR ATTORNEY.

Feb. 5, 1952 F. X. REES ET AL 2,584,739
CENTRALIZED TRAFFIC CONTROLLING SYSTEM
Filed July 24, 1948 23 Sheets-Sheet 23

INVENTORS,
F. X. Rees and
R. H. Bechtold
BY
*Neil W. Preston,*
THEIR ATTORNEY.

Patented Feb. 5, 1952

2,584,739

UNITED STATES PATENT OFFICE 2,584,739

CENTRALIZED TRAFFIC CONTROLLING SYSTEM

Frank X. Rees, Chili, and Robert H. Bechtold, Irondequoit, N. Y., assignors to General Railway Signal Company, Rochester, N. Y.

Application July 24, 1948, Serial No. 40,534

14 Claims. (Cl. 177—353)

This invention relates to a communication system adapted to be used as a part of a centralized traffic controlling system for governing traffic on railroads, and more particularly pertains to a communication system of the modulated carrier frequency type employing amplitude modulated pulses of carrier frequency.

It is desirable to place the switches and signals at various points along a railroad under the control of an operator in a central office in a manner that he may change the position of the switches subject to automatic safety circuits which prevent unsafe operation of any switch and may hold at stop any of the signals or allow them to clear dependent upon the position of their associated switches and in accordance with traffic conditions. Such control of the switches and signals by an operator is usually effected through the medium of a centralized traffic control system, conveniently termed C. T. C. system, which involves a communication system adapted to rapidly transmit controls from a central office to the various devices at the several field stations, and also to receive indications from the field stations at the central office in accordance with the different positions of the various devices and also to inform the operator of the location of trains.

In various prior systems of centralized traffic control, the controls and indications have been transmitted over communication systems of various types, such as coded type systems employing electro-magnetic relays and the like which selectively establish communication with the different field stations and operate step by step to transmit the controls and indications for the selected station. Such systems, although highly useful, have the disadvantage that communication may be held with only one field station during any one cycle of operation. Also, it is necessary in such a station selecting type of system to provide a preference between the field stations in order to prevent conflicts in the transmission of messages. All of this tends to cause delay in the transmission of messages when there is a large number of messages to be transmitted, and in some cases the most advantageous sequence of transmission of the messages is not effected.

In view of the above considerations, it is proposed in accordance with the present invention to provide a communication system of the type which is adapted to transmit all controls and all indications to and from all field stations of the system on the same operating cycle, and yet effect this operation within such a short interval of time as to effect so far as practical considerations are concerned substantially instantaneous response. It is proposed that such a system of communication be provided by employing electron tubes in such a way as to avoid the use of moving parts in the communication system proper and thus provide greater facility in the speed of transmission and response, while at the same time providing that such system is adapted to control electro-magnetic relays of the type employed in railway use to give safe and reliable control of the switches and signals.

Generally speaking, and without in any manner attempting to define the exact nature or scope of the present invention, the system of the present invention provides for the transmission of a series of pulses of carrier frequency which pulses are varied in amplitude in accordance with the controls or indications to be transmitted. In order that these pulses of carrier frequency may be transmitted at a very rapid rate and within a relatively narrow band of frequencies over a line circuit, such for example, as at the rate of one thousand pulses per second, it is proposed that these pulses be formed by apparatus causing the amplitude of the carrier frequency to rise and fall in accordance with a sine wave form for each of the different amplitudes. For example, if a carrier frequency of fifteen kilocycles per second is employed and a pulse frequency of one kilocycle per second is provided, then each pulse is constituted by fifteen cycles of the carrier frequency, but such cycles will be of varying amplitudes to form an envelope giving a shape to the pulse in accordance with a regular sine wave form.

It is proposed that the controls be transmitted from the central office to the various field stations by employing one carrier frequency, while the indications may be contemporaneously transmitted from the field stations to the central office by a different carrier frequency.

It is of course apparent that time must be allotted for the transmission of controls and indications to and from the different field stations. The present invention proposes to provide for this by successively identifying or counting the field stations in rotation during each operating cycle and allotting pulse or step periods for transmission of controls and indications following each such station identification. This successive identification or counting of the field stations is effected by the transmission of carrier pulses of a relatively high amplitude, whereas each control and indication pulse is selectively made to be of a medium or a low amplitude depending upon the character of the control or indication to be transmitted for its particular pulse period.

The system may thus be said to operate through a cycle of operation comprising a series of pulses of selected amplitudes to successively identify the field stations and the controls belonging to each of said field stations. These pulses of each cycle are counted off in the control office for the controls of each station in succession by a series of electronic devices allotted to each of the stations. Each field station has a series of electronic devices responsive to the station counting pulses and another series of electronic devices responsive to the control pulses immediately following the identification of that station. In this way, electronic devices are provided at each field station for operating step-by-step in response to pulses formed by similar devices in the central office.

The successive cycles during each of which communication is held with all of the field stations, are characteristically initiated and terminated so as to assure the proper functioning of the system in response to the various control and indication pulses as distinctive from transient and extraneous electrical disturbances which may at times appear on the line wires. This is accomplished by the transmission at the beginning of a cycle of two successive pulses of the high amplitude followed by a space or interval before the transmission of the station counting and control pulses. These characteristic pulses have conveniently been termed sync pulses since they provide for the synchronizing of the apparatus at the control office with the apparatus at the field stations. Each cycle is terminated by a cycle closing pulse which is also of the relatively high amplitude and which is effective to assure that all field station apparatus is restored to a normal non-operating condition.

The initiation of a cycle by the sync pulses is followed by a station counting pulse which is effective at the control office and at each of the field stations to cause the apparatus to take one station counting step. On this first step, the apparatus at the first field station and corresponding apparatus in the control office is rendered effective for the transmission of control pulses and indication pulses. Each control pulse is characterized by either a medium or a low amplitude depending upon the control to be transmitted for that pulse, and the succesive pulses are counted off both at the control office and at the field station. The counting of the control pulses at the field station is dependent upon the receipt of such pulses, but the indication counting at such field station, when once initiated by the station counting apparatus at that station, is effective to transmit pulses at a rate wholly dependent upon a local pulse producing organization. These indication pulses are of a characteristic carrier frequency and when received in the control office are effective to cause the successive operation of the indication counting apparatus for that station.

From the above, it will be evident that the first indication pulse received at the central office may be somewhat delayed with respect to the transmission of the first control pulse from the central office by reason of the propagation time of such pulses over the line circuit. In ordinary pulse type communication systems where the rate of transmission is relatively slow, such propagation time is relatively unimportant. However, in the present system where the pulses are transmitted at a relatively high rate, the propagation time is a material factor, and for this reason the next station counting pulse is not transmitted until ample time has elapsed, subsequent to the final indication pulse to be transmitted by the particular station with which communication is then being held, to allow for the reception of that indication pulse at the central office. This time margin must of course be determined in accordance with the distance of the field station farthest from the central office.

Following the transmission of the controls and indications for the first field station, the second station counting pulse is transmitted which renders the apparatus at the first station and corresponding apparatus at the central office ineffective and at the same time renders the apparatus at the second field station and corresponding apparatus at the central office active for the transmission and reception of controls and indications. This operation is effected the same as previously described. In this way, the various field stations are successively identified and communication is thus held with each station in turn.

Since the pulse frequency may be relatively high, for example, one kilocycle per second, it is apparent that a large number of stations with their controls and indications may be successively identified within the relatively short time of one second. For example, if we assume that eleven pulse periods may be allotted to each field station, then communication may be held with approximately ninety stations within substantially a one second period of time excluding any time delays between successive cycles. With such an organization, the controls and indications for the entire system are thus transmitted every second, so that the change of a lever in the central office for any switch or signal is effected within a second's time and in many cases within a shorter time. Similarly, any device in the field changing its position may be indicated at the central office within a second or less after it occurs. Such a system provides that there is no piling up of controls or indications since all controls and indications may be transmitted within any one cycle of operation. Also, since all controls and indications are repeated at such frequent intervals, it is apparent that should any one pulse identifying a control or indication be distorted due to extraneous electrical influences on the line circuit such as by lightning or the like, its correct transmission would be effected upon a subsequent cycle and within a relatively short interval of time.

Other objects, purposes and characteristic features of the present invention will be in part obvious from the accompanying drawings and in part pointed out as the description of the invention progresses.

In describing the invention in detail, reference will be made to the accompanying drawings in which those parts having similar features and functions are designated throughout the several figures by like reference characters, and in which:

Fig. 1 illustrates in a diagrammatic manner the line circuit organization of a system embodying the present invention, and which line circuit may have various other services associated therewith;

Figs. 2A, 2B and 2C, when placed end to end, illustrate diagrammatically in block diagram form the apparatus provided at a central office in accordance with the present invention to provide for communication with a plurality of field stations;

Fig. 3 illustrates in block diagram form the apparatus employed in a typical field station in a system of the present invention, assumed to be station No. 1;

Fig. 4 illustrates various circuits employed in connection with the oscillator and phase shifter to provide for the pulse frequency at the central office;

Fig. 5 illustrates in a diagrammatic manner the circuits and tubes employed for amplitude pulse modulation control of the carrier frequency pulse transmitted from the central office;

Fig. 6 illustrates in a diagrammatic manner the circuits and tubes employed in the initial counting chain at the central office and its relationship to the apparatus effecting the end of an operating cycle;

Fig. 7 illustrates in a diagrammatic manner the circuits and tubes employed in the repeat counting chain at the central office and its relationship to the pause counter associated with each station and typically shown for station No. 1;

Figure 9:
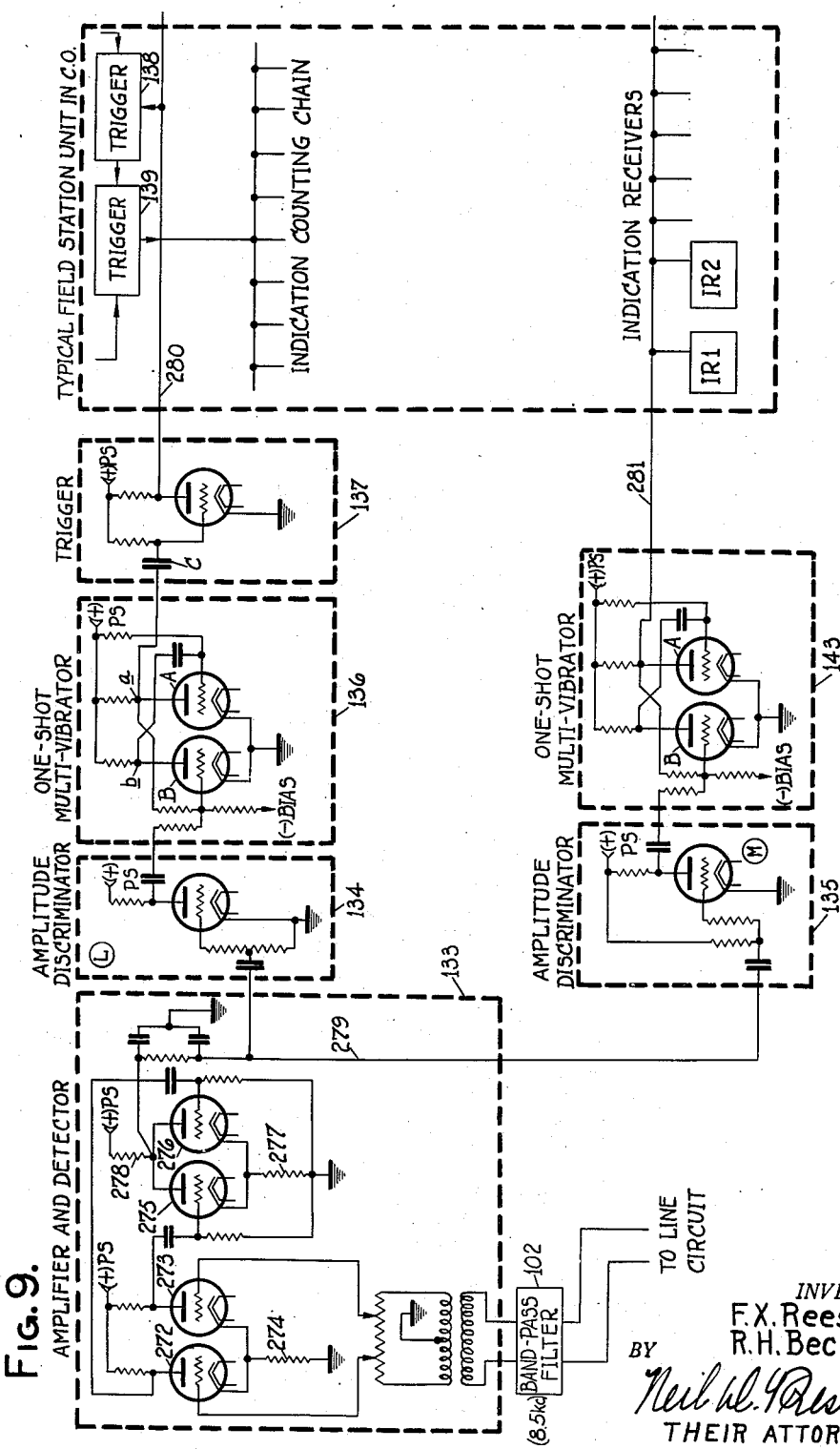
Figure 21A:
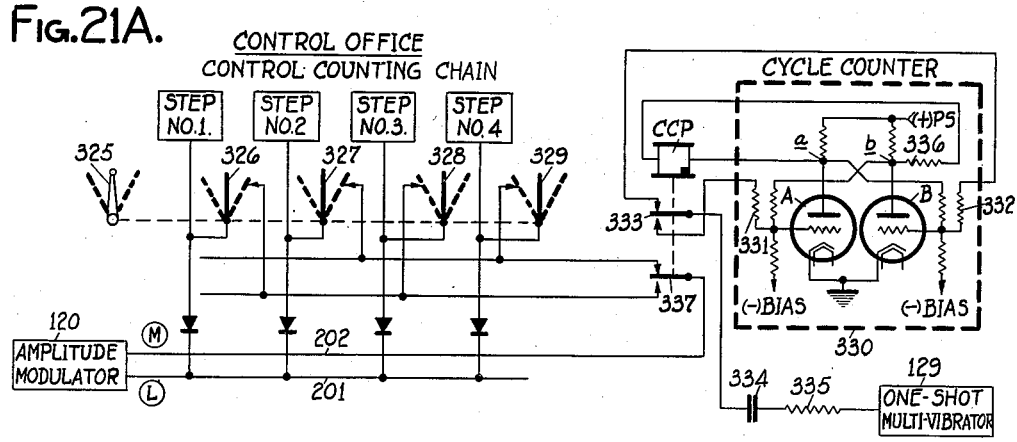
Figure 21B:
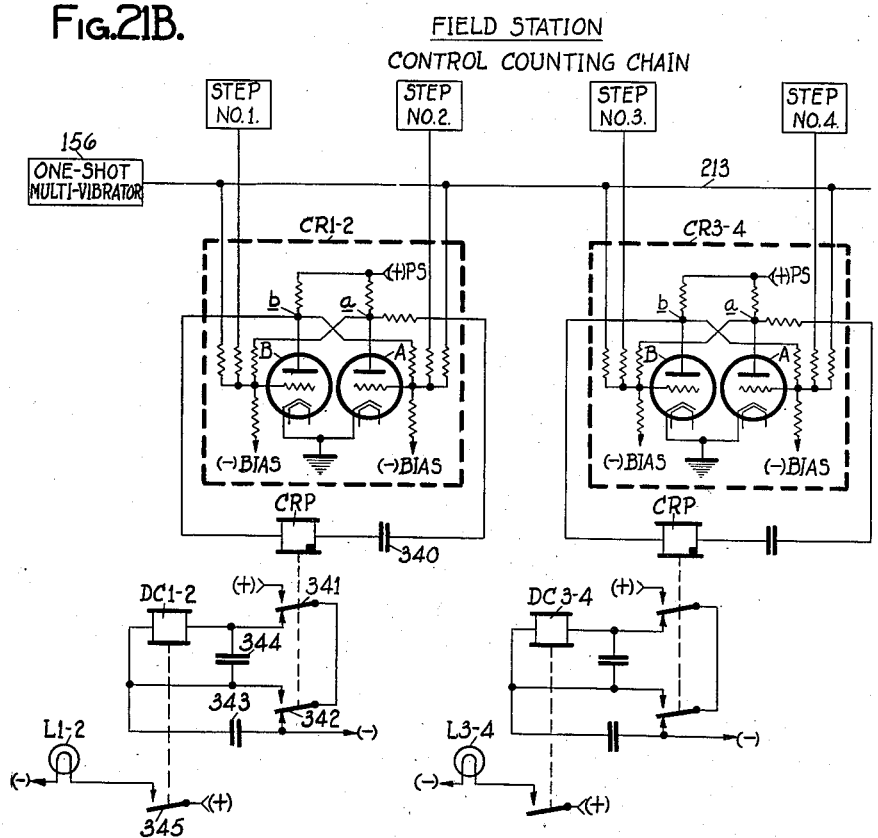
Figure 22A:
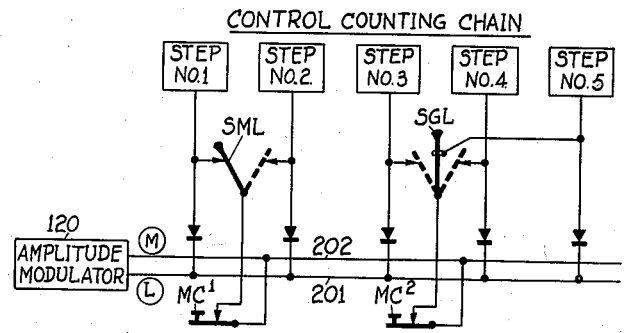
Figure 22B:
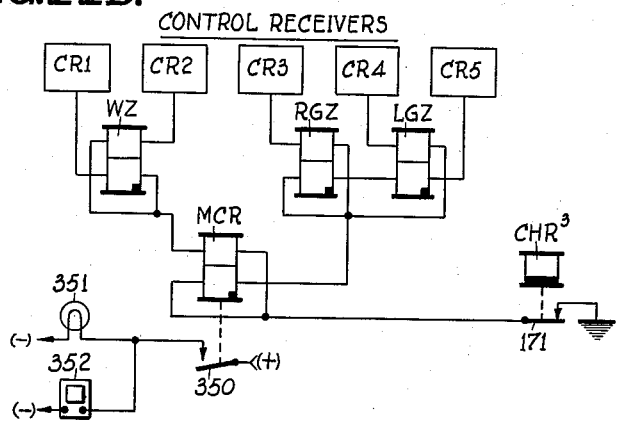
Figure 23:
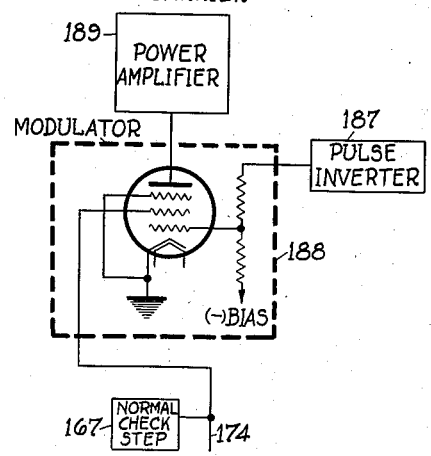

Figs. 8A and 8B, when placed one above the other, illustrate the typical control and indication counting chains and associated circuits and tubes for each field station unit in the central office, and assumed for convenience to be for station No. 1;

Fig. 9 illustrates the circuits and tubes employed in the indication pulse amplifier and discriminator at the central office which acts to govern the indication receiving apparatus in each of the field station units at the central office;

Figs. 10A, 10B, 10C and 10D when placed with Fig. 10B to the right of Fig. 10A, and Figs. 10C and 10D beneath Figs. 10A and 10B respectively, illustrate the circuits and electron tubes employed at a typical field station for identifying when that station is to receive and transmit and for registering the controls received by it and effecting the transmission of the indications to be transmitted from it;

Fig. 11 illustrates certain symbols employed in connection with the present disclosure;

Fig. 12 illustrates in a diagrammatic manner the circuits and apparatus employed at a typical field station in connection with the operation of the track switch and signals forming a part of a centralized traffic controlling system;

Fig. 13 illustrates in a graphical manner the envelope of the modulated carrier pulses and their relationship to the pulse frequency and the pulse periods;

Fig. 14 illustrates in a graphical manner the various control and indication pulses of a typical cycle of operation;

Fig. 15 illustrates the phase relationships between the pulse frequency generator, the trigger pulses produced therefrom and the modulating signal;

Fig. 16 illustrates in a graphical manner the relationship of the operation of the tubes in the stepping devices with respect to the trigger pulses controlling them;

Fig. 17 illustrates in a graphical manner certain relationships in the operation of the mixer;

Fig. 18 illustrates a modification of the circuits and tubes employed for amplitude modulation control of the carrier pulses as shown in the main form of Fig. 5;

Fig. 19 illustrates the organization provided at each field station to provide for decade counting of the station counting pulses;

Fig. 20 illustrates in a graphical manner a sequence chart for the field station No. 1;

Figs. 21A and 21B illustrate a modified arrangement of the present invention to provide for the coding of controls to assure the proper transmission and reception of such controls;

Figs. 22A and 22B illustrate a modified arrangement of the present invention to provide a maintainers call; and Fig. 23 illustrates a modified arrangement of the present invention employed at the field stations when the modulation control is adjusted to provide a residual carrier signal.

For the purpose of simplifying the illustrations and facilitating in the explanation thereof, the various parts and circuits constituting this embodiment of the present invention have been shown diagrammatically, and certain conventional illustrations have been employed, the drawings having been made more with the purpose of facilitating the disclosure of the present invention as to its principles and mode of operation, than for the purpose of illustrating the specific construction and arrangement of parts that would be employed in practice. Thus, the various electron or vacuum tubes and their elements, together with associated resistors, capacitors and other circuit elements have been shown in the conventional written circuit form. Similarly, various relays and their contacts are illustrated in a conventional manner instead of showing all of the details of such apparatus.

In order to simplify the illustrations in the drawings and facilitate in the explanation of the fundamental characteristics of the invention, the various parts and circuits have been shown diagrammatically with energizing sources of electric energy represented by conventional symbols. Arrows with associated symbols (+) and (—) are employed to indicate connections of the various circuits to the opposite terminals of a suitable source of current for the energization of the electric devices included in such circuits; and the source or sources of current may be of any suitable characteristic for the purpose intended.

In this connection, Fig. 11 illustrates some of the typical symbols employed in the drawings that are characteristic of this disclosure. More specifically the first illustration shows a suitable plate supply battery having its positive terminal designated (+)PS and having its negative terminal connected to ground. Associated with this plate supply is a biasing battery for supplying a suitable bias on the grids of various vacuum tubes shown in the drawings. This biasing battery has its negative terminal designated (—)BIAS and has its positive terminal connected to ground. This illustration of a suitable battery organization is merely for the purpose of making clear the symbols employed at various portions of the drawings to represent the connections of the circuits to such a source. However it should be understood that any suitable number of batteries may be used as required either at the control office or at the field stations in order to maintain the proper and independent energization of the circuits. Also, other types of power supplies may be employed in actual practice, and in such cases the symbols employed may be considered as merely designating the proper polarity of the potential to be applied to the circuits. The various vacuum tubes are assumed to be of the heater type with their heaters normally energized from a suitable source while the system is in service. Although such energization of the heaters is not shown in detail, it is to be understood that manual control of such energization may be provided so as to apply the energy while the system is in service but remove it during adjustment and repair of the system or while replacement units are being included in the system, or for any other reason found to require such control. Similar manual control is provided for all sources of power.

The various contacts of each relay involved in the illustrations are shown conventionally as being in a lower or inclined position when the coil or winding of the associated relay is deenergized, and in a raised or horizontal position when the relay is energized; the contacts belonging to any given relay are shown connected to its coil or winding by dotted lines, and these contacts may be either below or above the illustration of the relay winding. The front and back contacts between which the movable contacts are operated by the different relays are shown conventionally as arrowheads, and the movable contacts are ordinarily of the type which have their contacts pulled downwardly by gravity or by spring action.

In the drawings illustrating the general organization of the system with respect to the interconnection of various electron tubes, block diagrams have been employed in a conventional manner to give an over-all understanding of the organization. In these block diagrams, various conventional legends have been applied, such as "oscillator," "amplifier," "detector," "multivibrator," "trigger" and like terminology. It is to be understood that where these terms or legends have been applied, any conventional or known circuit organization including vacuum tubes may be employed to accomplish the necessary functions, although in order to provide a clear and definite disclosure of the present invention other portions of the drawings show typical circuit connections and their interrelation with the other circuit elements as broadly illustrated in the block diagrams.

General organization

It is to be understood that the system of the present invention is applicable to use in various fields where the transmission of individual controls and indications in opposite directions between a central office and a plurality of outlying stations is desirable. However, for the purpose of disclosing at least one field of utility for the present invention, this embodiment has shown the system of the present invention applied to the control of power switch machines and signals in a centralized traffic control system for railroads over a line circuit including line wires 100 extending between a control office and a plurality of field stations as illustrated in Fig. 1 of the drawings. The control office is shown as including a "control transmitter" and an "indication receiver." The control transmitter is connected to the line wires 100 through a band-pass filter 101 designed for the particular carrier frequency to be employed for the transmission of controls. In the present embodiment, it is assumed for the sake of definiteness that this control carrier frequency is fifteen kilocycles per second. Similarly, the indication receiver is illustrated as being connected to the line wires 100 through another band-pass filter 102 designed for the particular carrier frequency employed for the transmission of indications. In the present embodiment, it is assumed for the sake of definiteness that this indication carrier frequency is eight and one-half kilocycles per second.

Each of the field stations includes a "control receiver" and an "indication transmitter," as more particularly indicated in Fig. 1 with respect to field station No. 1. The "control receiver" is shown as connected to the line wires 100 through its associated band-pass filter 103, which in the present case has been assumed to be for a carrier frequency of fifteen kilocycles per second. The "indication transmitter" is likewise connected to the line wires 100 through its associated band-pass filter 104 which in the present case is assumed to be designed for a carrier frequency of eight and one half kilocycles per second.

It should be understood that the band-pass filters are designed to have their peak acceptance frequency fall on the carrier frequency, but that the band of acceptance frequency is sufficiently broad to pass all frequencies involved in the signal being transmitted or received. This band of frequencies will obviously be the carrier frequency plus and minus the modulating frequency, which for the purpose of the present disclosure has been assumed to be one kilocycle per second. However, in this connection it should be noted that this band of frequencies may be slightly broader than as just stated since the carrier frequency is also caused to have an envelope of varying amplitudes for successive pulses occurring in that modulating frequency. For this reason, these band-pass filters should be designed to handle all of the frequencies involved in such a type of signal necessary to transmit the desired controls and indications.

At the control office illustrated in Fig. 1, the "control transmitter" and "indication receiver" are shown connected by a line having the legend "Station counting for controls also used for indications." This means that the apparatus which counts off the various stations during the transmission of controls also acts to render the indication receiving apparatus for those stations respectively and successively effective. Similarly, at the field station, the "control receiver" is shown connected to the "indication transmitter" by a line having the legend "Station counting for controls also used for indications." This means that when the associated station is rendered effective for the reception of controls, it is also rendered effective through the same means for the transmission of indications.

The embodiment of the present invention contemplates that the line wires 100 will extend for a considerable distance away from the control office and that a large number of field stations will be employed. By way of an example, it is assumed that ninety field stations may be controlled and may transmit their indications during each operating cycle of the system which occurs in substantially a one second period. This is merely pointed out at this time so that it will be clearly understood that the line circuit may extend for any suitable distance and if desired repeater stations may be employed for repeating the carrier signal pulses to distant stations and indications back to the central office. Since the pulse periods are assumed to be at the one kilocycle rate, it will be appreciated that relatively small increments of time are involved and thus making it necessary to consider the propagation time of the carrier pulses along the line circuit, and especially if the field stations are any substantial distance away from the control office, such as one hundred miles or more. For this reason suitable margins have been provided in the present disclosure so that the full capacity of the system has not been taken advantage of the same as if all of the field stations were within a relatively close distance to the control office.

Also, it should be understood that the line circuit must be properly terminated and properly constructed for the transmission of the carrier pulses as provided in accordance with the present invention. Since it is contemplated that the communication system of this invention is applicable to a line circuit having other services applied thereto, it is assumed that proper construction of the line circuit with respect to the other services may also take into consideration its proper termination and in many cases may provide the devices in connection with such other services which will provide the proper termination facilities.

As above mentioned, the present embodiment of the invention is assumed to provide for the control of switches and signals, such as at the opposite ends of passing sidings along a railroad. In such systems, a control panel on a control machine is provided at the central or control office having a track diagram corresponding to the track layout with suitable control buttons or contactors for providing the distinctive controls for transmission to the various field stations involved together with suitable indication devices for displaying the indications received from the various field stations. The structure of such a control machine can be, for example, as shown in the patent to J. F. Merkel, Patent No. 2,145,798, dated January 31, 1939.

The track switches and signals at the various field stations are controlled in any suitable manner which has been diagrammatically illustrated in Fig. 12 in connection with a track switch TS at one end of a typical passing siding. The track switch TS is indicated as being operated by the usual switch machine SM in response to control from a switch control relay WZ of the polarized magnetic stick type that is controlled over the communication system as described in detail hereinafter. The power switch machine may be of the type as shown, for example, in the patent to W. K. Howe, Patent No. 1,466,903, dated September 4, 1923. It should be understood that any suitable well known type signals, such as search light, semaphore, position light and the like may be used, but for the purposes of this disclosure symbols have merely been illustrated on the track layout as being governed from the right and left signal control relays RGZ and LGZ. These relays RGZ and LGZ are of the polarized magnetic stick type relay which holds its contacts in the positions to which they were last operated. The control of such signals by these relays RGZ and LGZ as governed over the communication system in a manner presently to be described, has been shown in detail for example in the prior Patent No. 2,159,922 to R. F. Wells, dated May 23, 1939.

The switch machine SM operates the track switch TS and includes a contactor which is jointly operated by the track switch TS and the switch machine SM which through suitable circuits governs a relay N which is picked up only when the track switch TS is in a normal locked position and governs a relay R which is picked up only when the track switch TS is in a reverse locked position. Whenever the track switch TS is unlocked, both of these relays N and R are dropped away due to their polar biasing characteristics which are disclosed in detail in the prior application of G. E. Duffy, Ser. No. 542,203, filed June 26, 1944, now Patent No. 2,414,583, dated January 21, 1947. Such control of N and R switch position indicating relays of the polar biased type has been shown in the pending application of W. L. Livingston, Ser. No. 703,173, filed October 14, 1946.

When the track switch TS is normal, the front contact 80 is closed and completes a circuit through back contact 81 of relay R and step No. 1 of the indication counting chain for its station to transmit a normal indication. Similarly, on Step No. 2, the unlocked condition of the track switch is transmitted by reason of the closed condition of back contacts 82 and 83 of relays N and R respectively. When the track switch TS is in a reverse position and relay R is picked up, front contact 81 and back contact 80 connect with the step No. 3 of the indication counting chain to transmit a reverse indication. In a similar manner, indications are transmitted from the approach and detector neutral track relays WA, DT and EA. These relays are of the conventional track circuit type of relays and are indicated as associated with their respective track circuits merely by dotted lines. A seventh indication is transmitted in accordance with the energized condition of the signals at stop relay M, which relay is energized whenever all of the signals S1, S2, S3 and S4 are at stop, but whenever one of these signals is cleared, this neutral relay M is deenergized. The connections to steps Nos. 1 through 7 are shown in detail in Fig. 10D and will be described in connection with a consideration of the transmission of indications.

*Control transmitter.*—As described in connection with Fig. 1, the control office equipment includes a "control transmitter" for applying control pulses of the carrier frequency through the band-pass filter 101 to the line wires 100. This equipment for transmitting controls is illustrated in block form in Figs. 2A, 2B and 2C which may be placed end to end for the complete illustration.

Generally speaking, this control transmitting apparatus at the office comprises a unit of equipment individual to each of the different field stations and a group of equipment common to all field stations. The common equipment includes a carrier frequency oscillator 105 which supplies the basic carrier frequency for the transmission of controls, which carrier frequency is assumed to be fifteen kilocycles for the purposes of the present embodiment. The output of this carrier frequency oscillator 105 is applied to the input of a power amplifier 106 which is permitted to supply pulses of the carrier frequency to the line through band-pass filter 101 as governed by the modulator 107. These pulses of carrier frequency are preferably provided with a sine wave envelope as indicated at 108, 109 and 110 of Fig. 13. Since it is assumed in the present embodiment, that the pulse frequency is one kilocycle, each one of the carrier pulses includes substantially fifteen full cycles of the carrier frequency and the envelope of this pulse is formed by reason of the distinctive modulating control presently to be described.

A pulse frequency oscillator 111 (see Fig. 2A)

supplies a basic sine wave form which is passed through a phase shifter 112 to the input of the amplifier 113. This amplifier 113 is preferably a class A amplifier giving a true reproduction of the sine wave input.

The pulse frequency oscillator 111 also supplies suitable amplifiers 114 with energy at the pulse frequency of one kilocycle per second which is amplified and so controlled as to produce pulses of rectangular wave shape for acting upon a trigger 115 that is connected through a cathode follower 116 to supply trigger pulses for the operation of all the control counting chains within the control transmitter at the control office.

Referring to Fig. 13, it will be noted that the carrier frequency (assumed to be fifteen kilocycles) is shown at the top of the figure whereas the pulse frequency (one kilocycle) is shown immediately beneath it. This pulse frequency is the one that is present at the output of the amplifier 113 and has actually been phase shifted with respect to the output of the cathode follower 116 such that the peaks of its negative half waves occur at the same time as the trigger pulses appear at the output of the cathode follower 116 as will be described in detail later in connection with Fig. 15. The different step periods marked off by the successive trigger pulses occurring at the output of the cathode follower 116 are shown marked off in Fig. 13 at points 117, 118, 119 and 148. It can thus be seen that the proper amount of shift in the phase of the pulse frequency appearing at the output of the amplifier 113 is provided to bring the pulse limits at points where the rate of change in the amplitude of the pulse frequency is least.

Without considering the details of the circuit organization at this time, it may be stated that an amplitude modulator 120 is provided with input wires designated "H," "M" and "L" which are indicated on the drawings in circles and respectively designate the wires which provide control for high, medium and low amplitude pulses; and these wires are selectively energized on each step of a cycle of operation. This amplitude modulator 120 acts on the mixer 121 to determine the amplitude of the mixer output for each different step or pulse period and the amplifier 113 provides the sine wave shape or form for that pulse. Thus, the envelope of the pulse output provided by the mixer 121 is of a shape as shown at 108 in Fig. 13 by reason of the fact that the sine wave supplied by the amplifier 113 was provided with a proper phase relationship. These output pulses from the mixer 121 have a negative characteristic so that they are passed through the pulse inverter 122 before being applied to the modulator 107 that controls the output of the power amplifier 106. In this way, the carrier pulses are amplitude modulated and given a sine wave form.

The common transmitting equipment at the central office also includes an "initial counting chain" used for cycle demarcation time. This initial counting chain includes a number of step units numbered 0 through 7 and each unit is essentially an Eccles-Jordan counting circuit, the details of which are shown in Fig. 6 and will be discussed hereinafter. This initial counting chain provides for the steps to be taken to provide the sync pulses at the beginning of each cycle of operation as well as certain blank spaces associated with the beginning of each cycle, as will be discussed later in connection with Fig. 14. The initial counting chain with its steps numbered 0 through 7 only operates once for each cycle of operation, whereas a "repeat counting chain" also included in the common transmitting equipment at the office, is used to count off the spare pulse periods associated with each station and also the station counting pulse for every station of the system. This repeat counting chain includes in the present embodiment steps numbered 1 through 6. These steps receive their trigger pulses for operation from the output of the cathode follower 116, which pulses are applied to the bus 123, but the initial operation of step No. 1 of the repeat counting chain is always effected as a result of the operation of a "pause counter" associated with the next station unit to be operated. Since each pause counter is essentially a counting device which holds its last condition and does not readily provide a stepping pulse, it is desirable to provide a trigger 124 to supply the input to this No. 1 step of the repeat counting chain. Similarly, since the No. 6 step of the repeat counting chain holds its last operated condition, it is desirable to have its output pass through a trigger 125 for restoring the then operated "pause counter" of the next station unit to transmit controls as well as effecting operation of the "indication gate" for the corresponding station unit.

The control office unit for each station has been shown in Fig. 2B for station No. 1, and the Fig. 2C indicates a similar unit for station No. 2 by a dotted rectangle. The control office also includes a similar unit for each of the other stations of the system, and this has been indicated by another dotted rectangle having the legend "Control office units for other stations." For convenience in the description and reasons to be pointed out later, the last of these other stations has also been indicated by a dotted rectangle having the legend "Control office unit for last stations."

The control office unit for each station is typically shown in Fig. 2B for station No. 1 as including a "control counting chain" having steps numbered 1 through 5 each of which is essentially an Eccles-Jordan counting circuit which is shown in detail in Fig. 8A.

The control counting chain for each station unit includes a "pause counter" such as pause counter 126. This pause counter 126 is essentially another counting circuit or device provided with control later to be described which causes it to initiate the "repeat counting chain" following the transmission of controls for each station so that the counting chain for the next station will be initiated in synchronism with the proper station counting pulse.

Associated with the different steps are suitable control levers, such as switch machine lever SML and signal lever SGL that are operative to their different positions for determining the controls to be transmitted to the associated station in the field. The switch machine lever SML in the position shown causes the first control pulse for its field station to be of a medium amplitude for effecting the operation of the switch machine SM at the corresponding field station to a normal position; but when such lever SML is in its dotted line position, it causes the first control pulse to be of a low amplitude and the second control pulse to be of a medium amplitude for effecting the reverse operation of such switch machine SM at the field station. In a similar way, the signal lever SGL selects the amplitude of the last three pulses of the controls for the station for governing the indications of its signals. With the lever SGL in its middle position, the third and fourth control pulses are of the low amplitude and the fifth pulse is of the medium amplitude; but when it is in its left-hand dotted position it causes the third control pulse to be of a medium amplitude with the fourth and fifth control pulses of the low amplitude. Similarly, when the lever SGL is in its right-hand dotted position the third and fifth control pulses are of a low amplitude and the fourth control pulse is of the medium amplitude. The remaining apparatus included in the control office unit for each station relates to the reception of indications and will be generally considered later in connection with consideration of the indication receiver.

Following the step-by-step operation of the initial counting chain, the repeat counting chain and the control counting chains for the several station units interspersed by operations of the repeat counting chain, the unit for the last station causes actuation of a final pause counter 127. This final pause counter 127 acts to cause operation of the "repeat counting chain" to complete the period of transmission for the last station and cause the transmission of a cycle closing pulse. The completion of such operation causes the output of trigger 125 to restore the pause counter 127 to its normal condition which effects operation of the one-shot multivibrator 128. After a predetermined period of time this one-shot multivibrator 128 initiates operation of the one-shot multivibrator 129 which measures a similar predetermined time as the one-shot multivibrator 128 after which the trigger 130 is actuated to cause an output over wire 131 for re-starting the initial counting chain as indicated by suitable legend in Fig. 2C. The one-shot multivibrators 128 and 129 are for the purpose of providing a delay period between successive operating cycles, and this time margin between cycles may be of any suitable value depending upon the number of stations involved and the time required for certain checking features later described. However, since one-shot multivibrators are employed to provide this delay period, it is desirable that the total delay time to be consumed be divided between two such multivibrators because of the inherent characteristics of such devices.

In addition to the apparatus generally described above as constituting the control transmitter, a manually operable lever 132 is provided for governing the supply of negative biasing energy designated (—)BIAS to the various steps of the initial counting chain, the repeat counting chain and the counting chains for the respective station units as well as the several pause counters. The operation of the lever 132 to its open position removes the negative bias from the various counters in such a way as to cause them to assume normal positions. Thus, this lever provides a convenient way to initially start the system, and is also useful in re-synchronizing or resetting the devices of the system in the event of the failure in some step.

*Indication receiver.*—The indication receiver at the control office represented by the rectangle in Fig. 1 comprises a group of receiving apparatus at the control office common to all stations and a group of apparatus in the control office unit for each station (see Figs. 2A, 2B and 2C). The common group of receiving apparatus receives the amplitude modulated indication pulses of its particular carrier frequency (assumed to be eight and one-half kilocycles per second) through the band-pass filter 102, the output of which is supplied to the amplifier and detector 133. The detector acts to provide output pulses characteristic of the amplitude of the received carrier envelopes, which pulses are supplied to the amplitude discriminators 134 and 135. The amplitude discriminator 134 is so constructed as to allow the passage of impulses of the low amplitude or any of the other amplitudes; whereas the amplitude discriminator 135 is constructed to pass impulses of the medium amplitude. This has been illustrated in Fig. 2A by the "L" and the "M" included in circles adjacent the rectangles 134 and 135 respectively designating the low and medium amplitudes just mentioned. In this connection, it may be noted that since the station counting is effected by the control apparatus, it is unnecessary to have indication pulses of the high amplitude so that no amplitude discriminator is shown for acting on high amplitude pulses. However, it should be understood that, if desired, high amplitude pulses could also be used for indications to give different indications on the same steps but for the sake of simplicity in the disclosure, this has not been shown.

The output of the low amplitude discriminator, which is of course effective both for low and medium pulses, is supplied to the one-shot multivibrator 136 which acts to provide rectangularly shaped output pulses for the input of the trigger 137 for the purpose of delaying the stepping operation until the ends of the pulse periods. The trigger pulses from trigger 137 are fed to the indication receiving portion of each station unit at the control office and are effective for each station unit, when that station has been identified, to act through the trigger 138 and the trigger 139 to cause the step-by-step operation of its indication counting chain.

At the typical control office unit for station No. 1, the "indication counting chain" is shown as including steps Nos. 1 through 7 and a normal check step 140. This indication counting chain for station No. 1 is conditioned to receive indication pulses when this station No. 1 has been rendered effective for counting the control pulses. This operative condition of the indicating counting chain is established in the control office unit for station No. 1 by reason of the fact that the step No. 1 in the control counting chain has been conditioned along with the indication gate 141. The step No. 1 of the control counting chain acts on the trigger 139 through an inverter 142. From this description, it is apparent that the reception of indication pulses while station No. 1 is identified causes the step-by-step operation of the indication counting chain regardless of whether the successive pulses are of the low or the medium amplitudes.

On each step of the indication counting chain, an indication receiver IR corresponding to that step number is rendered effective to determine whether or not the indication pulse causing that step is of the low or the medium amplitude. If the indication pulse is of the low amplitude, then the indication receiver is not activated during that step period. But if the indication pulse is of the medium amplitude as determined by the medium amplitude discriminator 135 providing an input to the one-shot multivibrator 143, then the output of this one-shot multivibrator 143 is supplied to the indication receiver IR for the particular step on which the indication counting chain is then standing rendering such indication receiver IR effective to act on the indication storing device ISD associated with that step. The registration or storing of an indication for a step renders the associated indicator lamp, such as lamp NK for example, illuminated. In this way, the indication lamps are selectively rendered active or not on each of the successive steps of the indication counting chain.

At the end of the reception of indication pulses for station No. 1 for example, the normal check step 140 is restored to its normal condition in which it remains. When the successive indication pulses are received for the second station, the indication counting chain for the control office unit for station No. 2 is rendered active in exactly the same way as just described for station No. 1.

The indication receiving apparatus for each station unit also includes an indication check 144 which is jointly controlled by the indication gate 141 and the normal check step 140 in such a way that the check relay $CHR^1$ is deenergized only while that station unit is receiving indications. Since the total time allotted to a station for the reception of indications in the present embodiment is assumed to be eleven thousand microseconds, it is apparent that the relay $CHR^1$ would have to be only silghtly slow acting to remain picked up during such a short interval of time. On the other hand, if for some reason an indication step fails to take place or the indication gate fails to close, then the check relay $CHR^1$ remains deenergized and in a short interval its contacts 145 and 146 drop away disconnecting negative energy (—) BIAS from the steps of the indication counting chain so that they are all restored to their normal conditions. Thus, if the failure has been due to the discontinuance of the indication counting chain, the indication check 144 is restored to normal which in turn reenergizes the check relay $CHR^1$. During the time that the check relay $CHR^1$ is dropped away, the opening of front contact 146 deenergizes all of the indicator lamps for the corresponding station, so that no false indication may be given.

Referring to Fig. 2B, it will be noted that the indication gate 141 receives trigger pulses from the bus 147 which also supplies trigger pulses to the pause counter 126 for initiating the control counting chain for that station. In addition, the operation of the step No. 1 of the control counting chain for the corresponding station is also required to render the indication gate effective to identify the corresponding station for the reception of indication pulses. For this reason, it can be seen that the indication receiver is dependent upon the station counting for controls to identify that station for the reception of indications, as broadly indicated in Fig. 1 by the line connecting the control transmitter and the indication transmitter having the legend "Station counting for controls also used for indications."

*Field station apparatus.*—The field station apparatus for station No. 1 in Fig. 1 has been indicated as including a control receiver and an indication transmitter. This apparatus has been shown in greater detail in a block form in Fig. 3. The apparatus shown in this Fig. 3 is typical of all field stations, but has been assumed for convenience as representing field station No. 1 so as to more definitely show how this station is rendered effective for the reception of control pulses following the station counting pulse No. 1, and at the same time rendered effective for the transmission of indications.

*Control receiver.*—Control pulses are received through the band-pass filter 103 by the amplifier and detector 150 which supplies the amplitude discriminators 151, 152 and 153 with pulses having a wave shape and amplitude corresponding to the envelope of the received carrier pulses (see Fig. 13). The amplitude discriminator 152 is for passing pulses of the low amplitude, as represented by the "L" in the circle adjacent the rectangle 152, but it of course is responsive to pulses of the medium and high amplitudes which is entirely proper since its output is effective through the one-shot multivibrator 154 and the trigger 155 to cause the successive steps of the "control counting chain" when the corresponding station has been counted off by the associated "station counting chain."

The medium amplitude discriminator 153, responsive to pulses of medium amplitude as indicated by the "M" in the adjacent circle, supplies an output to the one-shot multivibrator 156 which in turn acts to determine whether a control receiver CR is to be rendered effective for the corresponding step then assumed by the control counting chain. If the particular step then taken is for a medium amplitude pulse, then the correspondingly numbered control receiver CR for that step is rendered active and energizes the associated control relay, such as relay WZ for example, to actuate its contacts to a proper position. If the relay WZ is actuated to one position, then the switch machine SM causes the operation of the track switch TS to the corresponding position, but if the relay WZ is operated to the opposite position then it causes the operation of the switch machine SM to the corresponding opposite position to move the track switch TS to its other position as described more particularly in connection with Fig. 12.

Although the control pulses for all stations are received and applied to the amplitude discriminators 151, 152 and 153, such pulses cannot take effect unless the apparatus at the particular field station has been conditioned at the beginning of a cycle of operation by two sync pulses, as indicated in Fig. 14, and has received sufficient station counting pulses to identify it as the proper station to receive.

These sync pulses are of the high amplitude and are successively applied to the time discriminator 158 by the high amplitude discriminator 151. If the second sync pulse arrives at the time discriminator 158 within the proper time for the second pulse period, then an output is supplied to the time delay 159, but if such second sync pulse does not arrive within the pulse or step period allotted to it, then the time discriminator 158 fails to provide an output, and no station and control counting can take place at the station.

Referring to Fig. 14, it will be noted that there is substantially ten thousand microseconds between the second sync pulse and the first station counting pulse. This time is consumed by the time delay device 159 at each station, so that at the end of such time period an input is provided to the one-shot multivibrator 160. This one-shot multivibrator is double-gated so that it is effectively actuated only if an input is also supplied at the same time by the amplitude discriminator 151 in response to the first station counting pulse. Assuming that the first station counting pulse is properly received, then the one-shot multivibrator 160 provides an output to the trigger 161 which supplies a trigger pulse to the station counting chain. This of course occurs at each of the field stations, the field station in Fig. 3 being typical of all the others.

This trigger pulse corresponding to the first station counting pulse actuates the normal check step 162 of the station counting chain which in turn conditions the step No. 1 of the station counting chain in readiness for the first control pulse. At the station No. 1 a jumper 175 is provided to connect the step No. 1 at that station with the one-shot multivibrators 154 and 156 as shown in Fig. 3, while at station No. 2 the jumper is positioned at the next position from that shown in Fig. 3 to connect the step No. 2 of the station counting chain to the one-shot multivibrators 154 and 156. In brief, the station jumper 175 is located on the step of any field station corresponding to the number of that station, so that each station can be identified on a different step of the station counting chains at the several field stations. Thus, as the successive station counting pulses are received at a particular station, the station counting chain at that station operates step-by-step but the control counting chain and control receivers are rendered active to receive control pulses between station counting pulses only at the station then identified by the station count. In this connection, it should be noted that each field station is assumed to have a number of steps in the station counting chain corresponding to the total number of stations in the system, although only five steps have been shown. This assumption is made in this form of the disclosure for the purpose of facilitating the description. When a large number of stations are employed in a system it is of course obvious that such a station counting chain would become cumbersome and uneconomical. For this reason a modified form of station counting is shown in Fig. 19 and described hereinafter which reduces the number of stepping devices although the same number of steps are taken, i. e. one for each station.

Referring to Fig. 14, it will be noted that the period of time allotted for the station count and the controls and indications for each station is assumed to be eleven thousand microseconds. Thus, when the station step has been taken at each station by its station counting chain, the remaining ten thousand micro-seconds must be absorbed before the next station counting pulse arrives. For this reason, each station step actuates the time delay 159 through the medium of the step differentiator 163, and this time delay 159 measures off the same time period as it did between the second sync pulse and the first station counting pulse, so that it can provide an output to the one-shot multivibrator 160 at the same time that the next (second in this case) station counting pulse arrives. In this way, the one-shot multivibrator 160 is double-gated at the time intervals corresponding to the station counting pulses. But, if a pulse of high amplitude is received at any other times due to extraneous conditions on the line circuit, or for some other reason, it may be passed by the amplitude discriminator 151 but it cannot act to cause station counting because it has arrived at a time when the time delay device 159 is not giving an output. In this way, protection is provided against improper operation of the station counting chain at the several field stations.

As above mentioned, each station counting step acts upon the time delay 159, but since the transfer or shift from one step device to the next is substantially instantaneous, means must be provided to determine that a step is being taken and to differentiate as to which stepping device is to be then effective on the time delay 159. For this reason, the step differentiator 163 is provided with two input buses 164 and 165 to which the outputs of the respective steps of the station counting chain are alternately connected. This step differentiator 163 responds only to the step then being conditioned for initiating another operation of the delay device 159.

It should also be noted that the "control counting chain" besides having the devices for its respective steps Nos. 1 through 5, is also provided with a pre-check step 166 and a normal check step 167. The pre-check step 166 is provided to check against an under number of steps in a manner later to be described in detail; whereas the normal check step is provided to determine when the proper number of steps has been taken. The control check 168 is double-gated by the normal check step 162 and the normal check step 167 in such a way that when the station is identified for receiving control pulses, the relay CHR$^2$ is deenergized and is not again reenergized until the control counting chain has returned to the normal condition in which the step condition is standing on the normal check step 167 and the station counting chain has also returned to its normal step condition at 162. In this way, the failure of the two counting chains to return to normal within the proper number of steps results in the deenergization of the relay CHR$^2$ and the dropping away of its contacts; whereas, if the normal operation occurs then the relay CHR$^2$ is reenergized before its contacts have had time to drop away. Since the operating cycle is of such a short duration (i. e. approximately one second) the relay CHR$^2$ is sufficiently slow in its release time to bridge such a period, and so long as proper operation occurs it never drops away. However, if the relay CHR$^2$ does drop away due to some failure in the proper stepping operation, then it opens contacts 170 and 171. The opening of contact 170 removes (—)BIAS from the various steps of the station counting chain and the control counting chain so that these steps are all restored to their normal conditions in readiness for another cycle of operation. During the time that contact 171 is open, no changes can be made in the position of the relays WZ, RGZ and LGZ because their circuits are open. This assures that no erroneous control of these relays will take place while the steps of the counting chains are out of their normal positions.

*Indication transmitter.*—The indication transmitting apparatus at the field stations, as represented by the rectangle in Fig. 1 for station No. 2, is shown in block form in Fig. 3, and includes an indication counting chain together with a group of common transmitting apparatus. The indication counting chain is shown as having steps Nos. 1 through 7 and a normal check step 172. The normal check step 172 governs an indication check 173 in much the same way as described in connection with the control check 168, but in this case the indication check 173 is only single-gated.

The "indication counting chain" is rendered active when the field station is identified for the reception of controls and this is accomplished over wire 174 when the normal check step 167 of the control counting chain is actuated by the identification of this station. This sets the indication counting chain into operation to respond to the trigger pulses supplied from its local pulse frequency oscillator 180. This pulse frequency oscillator 180 is assumed to provide a sine wave form signal at the frequency of one kilocycle per second having its output connected to the amplifiers 181 which are in turn connected to the trigger 182. The frequency output of the oscillator 180 is also supplied through the phase shifter 183 to the amplifier 184 which in turn acts upon the mixer 185. The pulses from the trigger 182 cause the stepping operation of the indication counting chain which successively renders effective on successive pulse periods the indication contacts which act through the amplitude modulator 186 on the mixer 185 to combine to give sine wave shape to the amplitude modulated pulses which are passed through the pulse inverter 187, and modulator 188 to the power amplifier 189 for determining the form of the envelope of the carrier frequency supplied to it from the carrier frequency oscillator 190. In this way, the carrier frequency is modulated by pulses having varied amplitudes selected in accordance with the indications to be transmitted and these pulses are passed by the band-pass filter 104 to the line circuit which carries them to the control office for reception.

The operation of the apparatus provided for modulating and transmitting the indication pulses is exactly the same as described in connection with the transmission of controls from the control office. The only difference is that no cathode follower is provided between the trigger 182 and the steps of the indication counting chain which it controls. This is because the trigger 182 has sufficient output for the limited number of steps present in the indication counting chain at the field station; whereas at the control office such a large number of steps are provided that the trigger 115 would not ordinarily have sufficient output, and a cathode follower 116 is provided to provide the output required for the operation of the large number of devices.

It is believed that a further understanding of the various characteristics of the system of the present invention will be best understood by considering the detailed functions and features from the standpoint of operation of the system.

Operation

The above description points out the general relationships between the various devices in the central office and the several field stations which can be briefly stated as given below.

The control office is provided with a series of devices for counting the controls for each station in succession with certain spaces and a station counting pulse interjected between each group of control pulses by a repeat series of devices. Each field station has a series of devices for counting the station counting pulses together with another series of devices for counting the control pulses following the station counting pulse for that station. In this way, the control counting is effected at only one station at a time, but all field stations count all station counting pulses.

If the system includes ninety field stations (assumed merely as an example), then each field station has station counting devices capable of counting a corresponding number of station counting pulses. A typical cycle for such a system has been shown in Fig. 14. Since the pulse frequency is assumed to be one kilocycle and each station is allotted eleven pulse periods, the complete cycle is shown in Fig. 14 to include 1004 pulse periods.

Indication pulses are transmitted from each field station, when it is identified, by setting into operation a separate series of indication counting devices. These indication pulses are transmitted on a separate carrier frequency to operate an indication counting series of devices in the control office for the corresponding station.

The counting of the pulses, their amplitude modulation and the forming of their wave shapes together with various checking features can best be discussed in detail under separate headings. For the purpose of facilitating such individual discussion of the different features, the detailed drawings of the present disclosure have been drawn with this in mind so that the related features may be considered with reference to a minimum number of different sheets of drawings. For this reason, the block diagrams of Figs. 2A, 2B, 2C and 3 have been given reference characters which are also applied to the dotted rectangles in the detailed drawings surrounding the representation of the apparatus designated. In some cases, rather than showing certain connecting wires that might extend from one detail drawing to another, the device to which such wires may connect is shown in block form with the same reference character given both in the block diagram and in the drawing showing its details. With this integrated relationship between the drawings, it is believed that the complete organization may be readily understood by considering the detail drawings in connection with the complete block diagrams of the above mentioned Figs. 2A, 2B, 2C and 3.

For example, it will be understood from the prior description that the system involves the production of trigger pulses from a pulse frequency oscillator and that the same oscillator provides the source of energy having a sine wave form which is used to effect the modulating of the carrier frequency. The generation of the pulse frequency and the production of trigger pulses is effected by apparatus disclosed in detail in Fig. 4, while the modulation of the carrier frequency is accomplished by apparatus disclosed in detail in Fig. 5. Rather than showing the circuits of these two portions of the system connected together in detail, Fig. 5 shows the relationship to the pulse frequency oscillator by block diagram connections whereas the details for these block diagrammed portions of the system are shown in detail in Fig. 4. And in both cases the same reference numbers are given to the different blocks as found in the general block diagrams on Figs. 2A, 2B, 2C and 3.

It can also be understood that some portions of the disclosure are identical or repetitional with respect to other portions and for this reason it is believed unnecessary to show every detail of every part, but rather to consider typical portions and give their functions and mode of operations as representative of other similar portions of the system.

*Pulse frequency oscillator section.*—Referring to Fig. 4 of the drawings, the pulse frequency oscillator 111 at the control office is shown as including two triode tubes 214 and 215 connected to a suitable plate supply (+)PS with a small incandescent lamp 216 included in the cathode circuit for indicating when the oscillator is in operation, and also for stabilizing the amplitude of the oscillations since its resistance varies with changes in current flow and produces a degenerative effect. Since the oscillator circuit arrangement shown is of the well-known Wien bridge type, it will not be discussed in detail. In this connection, it should be understood that any suitable oscillator organization may be provided for generating a suitable pulse frequency having a sine wave shape. The output of this oscillator 111 is connected to the input of the amplifiers 114, which include a cathode follower, an amplifier and an over-amplifier.

The cathode follower tube 217 has its plate connected to (+)PS and its grid connected to the input and through resistor 218 to ground. The cathode circuit of course includes the cathode resistor 219 connected to ground. This resistor 219 is of such a value as to cause the tube 217 to operate on the linear portion of its characteristic curve. The purpose of the cathode follower is of course to provide a greater output without placing such a heavy load on the oscillator 111 as will cause a deviation in its frequency.

The cathode follower 217 has its output connected to the input of the amplifier tube 220 through the condenser 221 and connected to operate as a class A type amplifier. The output of this amplifier 220 is passed through the condenser 222 to the overamplifier 223. The cathode resistor of amplifier 220 is by-passed through condenser 224.

The over-amplifier 223 is also known as a "clipper" and may be of any suitable type organization for this purpose, i. e. to produce what is known as rectangular wave forms. In this connection, it is noted that there are various types of over-driven amplifiers or clipping amplifiers which employ what is known as grid circuit clipping, plate circuit clipping, cathode followers which provide clipping and the like. For the purpose of the present embodiment, the over-amplifier or clipper tube 223 is shown as being of the combined grid and plate circuit clipping type in which the application of sine wave pulses results in effect in the saturation of the tube in such a way that the output pulses have substantially perpendicular facing and trailing edges and substantially flat tops.

These pulse forms have been shown in their respective relationships diagrammatically in Fig. 15 indicating that the amplifier 220 produces pulses of greater amplitude than supplied from the oscillator 111. The cathode follower pulses have been omitted, since they are of the same amplitude and same phase relationship as provided by the oscillator 111. The output of the over-amplifier tube 223 has been indicated in the Fig. 15 as giving pulses of the rectangular type but with slightly inclined leading and trailing edges merely to indicate their dependence upon the relation of the output of the amplifier 220 as illustrated to the over-excitation of the grid of tube 223, but in practice the output of the amplifier 220 would be of sufficient amplitude to cause the output pulses of the over-amplifier tube 223 to have substantially perpendicular leading and trailing edges.

The application of the rectangular pulses to the trigger 115 through the condenser 225 provides at the end of each positive pulse of the output of the over-amplifier, a sharp pulse from the trigger 115 by reason of the circuit constants employed. These trigger circuits are sometimes known, as R-C peaker circuits, or sharpening circuits, or differentiating circuits, the purpose being in all cases to provide a pulse of very short duration and of the desired amplitude such as indicated for the trigger 115 in Fig. 15.

The tube A of trigger 115 is normally conducting by reason of positive potential from (+)PS applied through resistor 226 to its plate and through a relatively high resistor 227 to its grid. This causes a small grid current to flow through the high resistor 227 to produce a potential drop therein until the grid is only slightly positive. The plate circuit of tube A of trigger 115 is conducting sufficient current through resistor 226 to cause the potential at its point a to be relatively low.

When the over-amplifier is not conducting, its point 228 is at a relatively high potential. This causes condenser 225 to receive a charge through the plate resistor of the over-amplifier and the grid of trigger 115. This charge causes the voltage across the condenser 225 to rise to a value substantially equal to the potential drop across resistor 227. Thus, when the over-amplifier abruptly becomes conductive, the condenser 225 abruptly discharges through a circuit including resistor 227 and the over-amplifier tube. Since the potential of the condenser 225 is added to the potential of the plate supply, there is a momentary relatively high current through resistor 227, which produces a potential drop across it of sufficient value to swing the grid of trigger 115 abruptly to a negative value beyond cut-off. During this momentary negative swing of its grid, the trigger 115 ceases to conduct which causes the potential at its point a to rise abruptly for a time represented by the effective discharging time of the condenser 225. This time is very brief in view of the small size of the condenser 225 and the value of the associated resistors. After the momentary effective discharge of the condenser 225, the conduction of the tube A of trigger 115 is restored, and the potential at its point a is again reduced. In this manner, the trigger 115 provides an output of positive trigger pulses, as illustrated in Fig. 15.

The trigger pulses from trigger 115 are passed through the cathode follower 116 to supply trigger pulses with sufficient power on the bus 123 which leads to the initial counting chain of Fig. 6, the repeat counting chain of Fig. 7 and the counting chains for each of the field station units at the control office as typically shown in detail in Fig. 8A. The manner in which these trigger pulses are supplied over bus 123 to the different devices can best be seen in Figs. 2A, 2B and 2C where the general organization is shown in block form. It is because of the large number of grids connected to this bus 123 that it is desirable to use the cathode follower 116 to supply sufficient power.

The output of the cathode follower 217 is also connected to the phase shifter 112 which in turn is connected to the amplifier 113. The phase shifter 112 is a conventional network including resistors and condensers for advancing the phase to the required amount, something around ninety degrees. The amplifier 113 is provided to give sufficient power output to the mixer 121, and it also provides a 180° phase shift. In this way, the positive half-waves of the oscillator output are advanced by the phase shifting network and the amplifier 113 so as to provide an alternating frequency as shown at the bottom of Fig. 15.

It is noted that this phase shifter 112 is adjustable, so that the peaks of the negative half cycles of the output of the amplifier 113 fall exactly in line with the peaks of the trigger pulses from the trigger 115 as shown in the enlarged view of Fig. 13. It might be well to note here that the trigger pulses provided by trigger 115 are taken as the reference points for the various operations of the system. For example in Fig. 14, the trigger pulses are shown as marking off the different periods employed in the cycle of operation. Also, in Fig. 16, the trigger pulses are shown as making the different step periods to show the step-by-step operation of the counting chains. Thus, the phase relationship shown in Fig. 15 are essential for the proper functioning of the system for reasons which will be more fully understood as the description progresses.

*Pulse modulation control.*—In the above description it has been pointed out how trigger pulses are formed to effect the step-by-step operation of the counting chains. It has also been pointed out that the alternating current from the same pulse frequency oscillator is phase shifted so that the successive trigger pulses occur at the successive peaks of the negative half-waves of the alternating current supplied by the oscillator. If we consider the period between two successive trigger pulses as constituting a step period, then it will be evident that a circuit may be selectively controlled during each step period for determining the amplitude of the carrier frequency pulse for that step. Also, since the step period is assumed to be constituted by the positive half-wave of alternating current together with a portion of its preceding and succeeding negative half-waves, then the modulation of the carrier frequency by this wave shape will cause the successive pulses of carrier frequency to have a sine wave shape beginning and ending with zero values with the approach to these zero values being at a portion of the cycle where the rate of change is the smallest. The pulse modulation control provides for combining both the modulation by the sine wave pulses as just described and also the selection of the amplitude of the pulse for each step period. Before discussing how the various steps are taken by the counting chains and the manner in which they provide for the selective energization of circuits, it is believed expedient to point out how the modulation is effected and three bus wires are made available for selective energization on the different steps to provide means for selecting the particular amplitude of the pulses for the respective steps.

Referring to Fig. 5 it will be seen that the band-pass filter 101 is connected to a power amplifier through a suitable inductive coupling and has a secondary winding with a mid tap to which is connected energy from the plate supply (+)PS. The opposite terminals of this secondary winding are connected to the plates of two amplifier tubes 230 and 231 which are connected in a push-pull circuit arrangement having their control grids supplied with the carrier frequency (assumed to be 15 kilocycles per second by way of example) from the carrier frequency oscillator 105 through two suitable condensers. The carrier frequency oscillator 105 may be of any suitable type and has not been shown in detail because the structure of oscillators is well known. However, this oscillator could readily be of the Hartley type, or of the Wien bridge type as shown in Fig. 4 for the oscillator 111. If the oscillator 105 is of the latter type, then of course it would be desirable to provide an intervening cathode follower and amplifier to supply the grids of the tubes 230 and 231 of the power amplifier 106. Since such features are well known in the art, detailed explanation would appear to be unnecessary.

The power amplifier 106 is provided with a battery bias from (—)BIAS through two resistors and a variable resistor so arranged that the tubes 230 and 231 of the amplifier may be adjusted to carry equal portions of the load. Suitable grid leak resistors are also provided.

The tubes 230 and 231 of the power amplifier 106 are cathode controlled by the modulator 107 which is a pentode tube having its control grid connected through a suitable resistor to (—)BIAS and also through the plate resistor of inverter 122 to (+)PS. The composite effect is that the modulator tube is normally biased to substantially cut-off so that this tube acts to normally prevent any output from the power amplifier 106. In other words, the pentode modulator tube is of such high impedance as to prevent any flow of current through the power amplifier output circuit. However, when a pulse of a suitable wave form is applied to the control grid of the modulator tube, it will then vary the impedance of this tube in accordance with the form of such pulse which will permit the output of the power amplifier to vary in amplitude in accordance with the wave shape applied to the modulator.

In order to provide pulses with positive potential values for the input to the modulator 107, an inverter tube 122 is provided. The output of the inverter 122 includes a variable plate resistor so that the point of operation of the modulator 107 may be suitably selected. The inverter 122 has its control grid connected to the terminal (—)BIAS and also to a mid point of the variable plate resistor of the mixer 121. Since the mixer 121 is not normally conducting because of the control by the amplitude modulator 120, in a manner later explained, a positive potential is applied to the control grid of the inverter 122 to counteract the negative bias supplied from terminal (—)BIAS to the required degree to permit the inverter to transform or invert the negative output pulses of the mixer 121 to proper positive pulse values for controlling the modulator 107.

In this connection, the terminal (—)BIAS supplies a potential of several times the value required to bias the tubes to their cut-off points. For example, when tubes, such as the RCA tube 6SN7, are employed, only about twenty volts negative are required, but the terminal (—)BIAS is connected to a suitable source which provides approximately a 105 volt negative bias. This multiple cut-off value biasing voltage is then employed in a voltage dividing organization to give the desired biasing voltage for the different tubes. This arrangement permits more than the cut-off values to be used in some cases and assures positive cut-off of the various tubes used for the stepping operations and the like. In any case, the positive pulses applied to the tubes must be of sufficient values to overcome the particular bias potential to that degree required to give a proper output. It is assumed that the plate supply (+)PS provides a potential of 300 volts when the above mentioned type of tube is employed.

Although the full biasing potential of the terminal (—)BIAS is not desired for the inverter 122, it is convenient to employ the same source for its biasing potential and determine that the actual potential applied to it is a lower value by adjusting the variable connection to the plate resistor of the mixer 121. This voltage dividing organization is preferably adjusted to provide a bias such that the input voltage swing during a high amplitude pulse will at its peak be just to cut-off on the inverter 122. Obviously, other methods of biasing this inverter 122 could be employed.

The input to the inverter 122 is supplied from the mixer 121 in the form of pulses of negative potential values having the proper wave shape and phase relationship as will be presently described, it being sufficient for the time being to know that these pulses have a sine wave shape and conform to that portion of an alternating current wave occurring between any two successive trigger pulses as shown in Fig. 13, the amplitudes being controlled through the medium of the mixer 121 and the amplitude modulator 120 as presently to be described.

The mixer 121 includes a triode tube which is biased by a voltage supplied from the source including terminal (—)BIAS by the voltage dividing resistors 232 and 233. These circuit connections provide a battery bias which is of a limited amount to give approximately class "A" amplifier operation as indicated in the diagram of Fig. 17. The sine wave form input signal to the grid of the mixer 121 is supplied from the amplifier 113 through a condenser 234 and the return circuit for this input includes the resistor 232 connected to ground.

The amplitude modulator 120 includes three triode tubes "L," "M" and "H" which have their control grids normally biased beyond cut-off by being connected through suitable resistors to the terminal (—)BIAS. Each of these tubes "L," "M" and "H" includes a variable resistor in its plate circuit connected by a common connection to the cathode of the mixer 121 including resistors R1, R2 and R3. Resistors 235, 236, and 237 are respectively connected between the grids of tubes "L," "M" and "H" and ground to provide a voltage dividing network for a normal negative bias on these tubes of about twice the value required for cut-off. Thus, when a connection is made from (+)PS through a tube for some step of a counting chain to any one of the buses 201, 202, and 203, multiple circuit conditions are established to reduce the negative potential on the grid of the corresponding tube "L," "M" or "H" to a point, such as zero, where that amplitude modulator tube conducts and reduces its impedance to a relatively low value. By selective energization of the buses 201, 202, and 203, the resistors R1, R2 and R3 may thus be selectively inserted as cathode bias resistors in the cathode circuit of the mixer 121.

The resistor R1 is of the proper value to provide for a low amplitude modulation control and effects a bias which combines with the normal battery bias on the mixer 121 to provide a basic bias as indicated in the diagram of Fig. 17. With such a basic bias on the mixer 121, the application of an alternating current frequency to its control grid from amplifier 113 then causes a swing in the actual grid potential as indicated by the wave form 194 in the diagram of Fig. 17. But energy is applied to bus 201 only from the peak of one negative half-wave to the peak of the next negative half-wave of the alternating frequency put out by amplifier 113 (i. e. a rectangular pulse is applied to the bus 201 by reason of the trigger 115 and the counting chains as later explained), as indicated in the diagram adjacent the mixer 121 in Fig. 5. This means that the alternating current wave is only effective on the output of the mixer 121 for that portion of time during which the rectangular pulse is present. For this reason, the wave 194 of Fig. 17 is shown solid only for a corresponding portion of time to constitute a modulating pulse. This pulse is reproduced in the output of the mixer 121 and supplied to the inverter 122. The output pulse of the mixer 121 is of course amplified in accordance with the position of the basic bias and appears as at 195 in the diagram of Fig. 17.

If there were no pulse frequency applied to the control grid of the mixer 121, the rendering conductive of the low tube "L" of the amplitude modulator 120 would cause a rectangular wave shape represented by the dotted line 196 in the diagram of Fig. 17 to be the output of the mixer. This is because basic bias of the mixer 121 is normally such as to allow plate current to flow. Thus, as soon as one of these tubes, such as the low tube "L," would become conductive, current would immediately rise in the mixer 121 until it reaches a value corresponding to the value at which current can flow in the plate circuit of such tube, the normal battery bias and a resistor, such as resistor R1, included in its cathode circuit. This plate current would continue to flow in the mixer 121 until the tube "L" was rendered non-conductive. Obviously, under such an assumed condition, the output of the mixer would be a rectangular wave form.

However, since the rectangular wave form is provided by the amplitude modulator 120 and since it is controlled by the steps which occur at the trigger points, as previously explained, then at the instant the tube "L," for example, becomes conductive, the amplifier 113 is actually supplying a peak negative signal to the control grid of the mixer 121 which swings its actual potential to the negative cut-off point of the mixer tube so that no current flows at exactly that instant, but as the signal supplied by the amplifier 113 begins to swing towards its positive values, the grid of the mixer 121 becomes less negative so that the tube becomes conductive and gives an output which follows that wave shape as indicated at 195 in Fig. 17. In this way, the mixer 121 is effective to amplify and provide an output of the wave shape supplied from the amplifier 113 between the successive negative peaks of such alternating current supplied from the amplifier because the resistor R1 is cut in at the beginning of the pulse period and is removed at the end of the pulse period. This is illustrated in Fig. 13 where the pulse or step period is marked off between the trigger points 119 and 148 for example, determining the portion of the pulse frequency which is to act upon the output of the mixer tube. This output of the mixer 121, after passing through the inverter 122 acts upon the modulator to allow it to be effective to cause the power amplifier 106 to have a varying output to produce a carrier envelope as shown in Fig. 13, for example at 110. This represents a low amplitude modulated carrier pulse, and includes substantially fifteen cycles of the carrier frequency because the pulse period is assumed to be one complete cycle of the thousand cycle pulse frequency, or one thousand microseconds.

The low tube "L" of the amplitude modulator 120 is rendered conductive during a step period of the control counting chain by reason of a cathode output connection to the bus 201 so that the plate-cathode current of the B tube of the then active step passes through the resistor 235 to ground. This operation will be explained in greater detail hereinafter, it being sufficient for the moment to know that on every step transmitting a low or medium amplitude pulse, the low modulator tube "L" is rendered effective by a permanent connection, while the medium amplitude tube "M" is selectively rendered effective, by suitable levers, as typically illustrated in Fig. 5 by a "typical lever." This typical lever may be operated to the right or to the left to selectively connect the medium bus 202 to the same B tube of the then active step of the counting chain. If the lever is in its left-hand position to connect the left-hand B tube to the bus 202, then the medium tube M of the amplitude modulator 120 is also rendered active so that for the particular step the resistors R1 and R2 are included in the plate-cathode circuit of the mixer tube 121. This means that the resistors R1 and R2 are in multiple to provide a reduced basic bias on the mixer 121 around which the alternating current signal supplied from the amplifier 113 may swing. This increases the amplification factor of the mixer 121. In other words, the mixer 121 has a dynamic characteristic somewhat as shown in the accompanying diagram of Fig. 17 so that a decrease in bias increases the amplification of the mixer. The increase in amplification of the mixer then causes the output of the mixer 121 as supplied to the inverter 122 and modulator 107 to be greater so that the actual output of the power amplifier for such pulse or step period is greater to provide a medium amplitude pulse, as for example the pulse 109 between the trigger pulses represented at 118 and 119 of Fig. 13. Thus, it is seen that the circuit control is effective to provide a low amplitude pulse on each step period and this low amplitude may be selectively changed to a medium amplitude pulse depending upon the circuit connections for that step.

Insofar as the controls are concerned, as typically illustrated in Fig. 5, each step may be either low or medium, but for the counting of the stations and to provide the sync pulses and the cycle closing pulse, a high amplitude pulse is used. This is accomplished by energizing the bus 203 during a pulse or step period which renders the high tube "H" of the amplitude modulator 120 active without the low tube "L." This causes R3 to be inserted in the cathode circuit of the mixer 121 with such a reduced value of resistance as to further reduce the basic bias on the mixer 121 so that its gain is sufficient to produce a high amplitude pulse for the pulse wave form supplied to its control grid by the amplifier 113 for that pulse or step period then being marked off by the counting chain. Since the high amplitude pulses in the present embodiment are employed only for station counting and cycle demarkation purposes, a typical connection has not been shown in Fig. 5 to the bus 203. However, the high amplitude circuit connections are shown in Figs. 6 and 7. It should be understood that although only three different amplitudes of pulses are shown, other additional amplitudes might just as well be employed, and these additional amplitudes be used for providing for the additional transmission of controls on any step as may be desired.

In Fig. 13, two adjacent pulses 108 and 109 are shown of the same amplitude. In the above description, the pulse 109 was assumed to represent a medium amplitude pulse, but since this Fig. 13 is to be considered only diagrammatic, the pulses 108 and 109 might just as well represent pulses of the high amplitude. In either case, it is desired to point out that when two adjacent pulses are of the same amplitude, their adjacent envelopes form a true sine wave; but, when two adjacent pulses are of different amplitudes, the respective pulses rise and decrease in amplitude in accordance with a true sine wave form, but the composite of the two pulses is distorted from the true sine wave and represents a transient frequency in the spectrum of frequencies employed in the system. This is mentioned merely to show that the band-pass filters may require a wider band of acceptance than just the carrier frequency plus or minus the pulse frequency.

*Stepping operation at control office.*—Although the electronic units constituting the various counting chains are all the same, and the step-by-step operation in response to successive trigger pulses is the same for all counting chains, it is believed expedient to consider the counting operations in the control office separate from the counting operations at the field stations in view of the different relationships between the counting chains at such locations and the other apparatus with which they are associated. However, an understanding of the operation of the counting chains in the control office will make it easy to understand the counting operation at the field stations, and a discussion of such counting operation at the field stations may then be limited to its relationship to the related apparatus.

With reference to Figs. 2A, 2B and 2C, it may be observed that the initial counting chain operates first during the operating cycle followed by the repeat counting chain. The control counting chain for the first station then operates followed by the repeat counting chain. The control counting chain for the second station then operates followed by the repeat counting chain. Such a succession of operations occurs for the counting chains for the successive stations interspersed by operations of the repeat counting chain until the counting chain for the last station completes its operation at which time the repeat counting chain is again operated to transmit the cycle closing pulse and restore final pause counter, thereby initiating the end of the cycle apparatus.

Referring to Fig. 14 it will be seen that the control office trigger pulses are numbered sequentially to furnish the reference points for the different steps and pulses transmitted during the typical cycle of operation. These trigger pulses are supplied over bus 123 to all of the counting chains in the control office and determine the rate of stepping. Since the electronic stepping devices respond practically instantaneously, the trigger pulses may be considered as marking the beginning and end of each step perid.

Before considering the general characteristics of the stepping with respect to the interrelationships of the different counting chains and control devices including the pause counters and the like, it is believed expedient to first consider the structure of a single step and the interrelationships of several steps. Referring to Fig. 6, it will be seen that three steps of the initial counting chain are shown in detail within the dotted rectangles respectively identified as step No. 0, step No. 1 and step No. 2; while the remaining steps of the initial counting chain are represented in block form but with the same connections as shown in detail for the first three steps.

The apparatus for each step includes two triodes, each of which has its plate supplied with energy through a suitable resistor from the terminal (+)PS. These tubes have been designated as the A and B tubes for each step. The A tube for each step is so controlled as to be normally conductive, whereas the B tube for each step is so controlled as to be normally non-conductive. More specifically, the A tube for each step has its control grid connected through a resistor to the bus 149 which is connected to the terminal (—)BIAS through the manually operable lever 132. On the other hand, the B tube for each step has its control grid connected through a suitable resistor directly to the terminal (—)BIAS. It should also be noted that the control grid of the tube A is connected through a resistor to the point *b* at the lower end of the plate resistor for the tube B, which resistor has its upper end connected to the terminal (+)PS. Similarly, the control grid of the tube B is connected through a resistor to the point *a* at the lower end of the plate resistor for tube A, which resistor has its upper end connected to the terminal (+)PS. In this way, a voltage dividing organization is used to provide a bias for each tube of each step which is about twice the value required to bias it to cut-off.

When the system is to be initially placed in service, the manually operable lever 132 is opened so that the tubes A have no bias and the tubes B are supplied with a negative bias beyond cut-off, in this way determining that the tubes A become conductive while the tubes B are non-conductive. With this condition established, the manually operable lever 132 is closed. Since each of the step devices is essentially an Eccles-Jordan counting circuit, it has stable characteristics causing it to remain in the last position to which it is set.

Referring to Fig. 6 and more particularly to step No. 1 for an example, it will be noted that with the tube A of such step conducting, its plate current flows through a resistor causing the point *a* to have a potential somewhat lower than the plate supply, which low potential is insufficient to counteract the normal negative bias on the tube B. The point *b* of this step No. 1 is at a relatively high potential corresponding to the plate supply, because the tube B of this step is not conducting. This means that a high positive potential is applied to the grid of the tube A through a suitable resistor and counteracts the negative bias supplied from bus 149 to the tube A to maintain it conductive. For this reason the electronic stepping device may be said to be stable tending to remain in its normal condition.

Let us assume that the tube B of the step No. 0 is conducting, disregarding for the moment just how this came about, then its point *b* is at a relatively low potential, whereas the point *a* for such step No. 0 is at a relatively high potential. For this reason the tube A for step No. 0 is non-conductive, but all that is necessary to render it conductive is to apply a positive pulse of sufficient amplitude to counteract the normal negative bias of such tube and render it conductive. This is effected upon the application of a trigger pulse on the bus 123. This trigger pulse in rendering the tube A of step No. 0 conductive causes the point *a* to fall in potential allowing the negative bias on the tube B to become dominant rendering such tube B non-conductive. Immediately the potential at the point *b* of step No. 0 rises charging the condenser C associated with step No. 1 and impressing a short pulse of positive potential on the control grid of the tube B of step No. 1 sufficient to counteract the negative bias of such tube and render it conductive. This decreases the potential at the point *b* of step No. 1 allowing the negative bias on the tube A of step No. 1 to predominate and render such tube non-conductive.

From the above description, it can be seen that the trigger pulse which acted upon the control grid of tube A of step No. 0 actually causes all four tubes of both steps to change conditions with the result that the combination of conditions assumed to be present in step No. 0 has now been transferred to step No. 1, i. e. the tube B is conductive instead of the tube A. This has been illustrated in the stepping chart of Fig. 16 where the trigger pulses are shown along the top horizontal line and are numbered from zero through 8 as exemplary of all trigger pulses. The tube numbers for the steps are shown in a vertical column with the tubes A and B distinguished by the numeral representative of its corresponding step. Each tube is represented as being non-conductive by a horizontal line on a level with the base of its numerals while a horizontal line on a level with the top of its numerals represents that such tube is conductive.

In the above assumption, it was brought out that tube B for step No. 0 was conducting while tube A for step No. 0 was non-conducting which is evident on the chart. The occurrence of the trigger pulse 1 obviously causes a shift in the conditions of all four tubes for steps Nos. 0 and 1. The tubes 0B and 0A are thus restored to a normal condition which continues to persist, whereas the tubes 1B and 1A are in what may be termed a stepped condition which remains until the trigger pulse No. 2 acts on the control grid of tube A for step No. 1 rendering it conductive and its associated tube B non-conductive. This raises the potential at the point *b* for step No. 1 charging the condenser C associated with step No. 2 thus placing a positive pulse of short duration on the control grid of the B tube for step No. 2. Such positive pulse counteracts the negative bias on this tube B of step No. 2 so that it is rendered conductive and its associated tube A non-conductive. In this same way, the successive trigger pulses act to render successive electronic stepping devices effective to represent a step condition. In order to coordinate the different steps of the initial counting chain with the trigger pulses shown in Fig. 14, the connections to the bus 123, as shown in Fig. 6, have numbers associated therewith corresponding to the number of the trigger pulse which is effective over that connection to render the associated tube A for that step conductive. These same numbers have also been shown associated with the same connections illustrated in Figs. 2A, 2B and 2C. In this way, it is easy to note from Fig. 2A that the counting begins with the initial counting chain and then proceeds through the repeat counting chain followed by the control counting chain for the station No. 1 which is then followed by another operation of the repeat counting chain and so on. The numbering has been applied to the connections to bus 123 for the control office unit for station No. 2 shown in Fig. 2C, but the connections for the remaining station units have not been numbered because all of them are not shown. However, it is believed that these numbers of the trigger pulses indicated in Figs. 2A, 2B, and 2C and 6 are sufficient to make it easy to understand the successive operation of the different steps in the counting chains.

For convenience in the description, a step is said to be "conditioned" when the tube B for that step is conductive and the tube A is non-conductive. In other words, this condition of a step represents the off-normal or stepped condition which marks the duration of the step as illustrated in Fig. 16. Since all of the steps, except one, are in normal conditions upon the occurrence of a trigger pulse, when the trigger pulse can only actuate that one step which has been conditioned or is off-normal. Such application of the trigger pulse to the conditioned step restores it to a normal condition, but it is obvious that such trigger pulse is also applied to the control grid of the tube A for the next step and for all the other steps. However, the next step becomes conditioned even though the trigger pulse is applied to the control grid of the tube A for such next step, because the time constants including the output resistor of a step connected to the point $b$ for that step and the condenser C for the next step is such that the pulse supplied to the control grid of the tube B of such next step is of longer duration than the trigger pulse. For this reason, the conditioning pulse predominates and conditions the next step in spite of the application of the trigger pulse to the control grid of the tube A for that next step.

When an electronic step device is rendered active (or conditioned) for that step, i. e. when the tube B for that step is rendered conductive and the tube A non-conductive, the plate-cathode circuit for that tube B may provide an input for the particular amplitude controlling device which is to be rendered active on that step. More specifically, when the tube B for step No. 1 of the initial counting chain in Figs. 5 and 6 is rendered conductive, (+)PS is then connected to the bus 203 through such tube which results in applying the plate source in multiple with resistor 237 and also in multiple with the grid bias source in such a way as to reduce the negative potential on the grid of tube "H" of the amplitude modulator 120 to substantially zero, or some other suitable value rendering it conductive. Thus, the rendering conductive of the tube B for step No. 1 of the initial counting chain effects the proper control of the grid potential of tube "H" as to render it conductive so that the resistor R3 is the effective cathode resistor for the mixer 121 during such pulse or step period. In this particular case, only the resistor R3 is rendered active to cause or determine that the pulse is of the high amplitude "H." This type of control is shown for steps Nos. 1 and 2 of the initial counting chain and step No. 6 of the repeat counting chain for effecting the transmission of the sync pulses (see Fig. 14) and the successive station pulses. However, it should be understood that the resistor R3 could be used in combination with the resistor R1 to determine the high amplitude pulse in a similar manner as the resistor R2 is employed in multiple with the resistor R1 to determine the medium amplitude pulse, but since the high amplitude pulses are used independently of the control conditions for the sync and station pulses, it is convenient to employ only the resistor R3 for this purpose.

Referring to Figs. 6 and 16, it will be noted that the step No. 0 is conditioned on the broad trigger pulse 243 from trigger 130 occurring just prior to the No. 1 trigger pulse of the cycle of operation illustrated in Figs. 14 and 16. The manner in which this is accomplished will be discussed specifically in connection with the consideration of the end of cycle apparatus, but it is sufficient for the present to know that the step No. 0 is conditioned just prior to the initiation of the cycle of operation.

The first trigger pulse No. 1 of the cycle indicated in Fig. 14 acts through the control of tube A of step No. 0 to condition step No. 1 to mark off the first step of the operating cycle, as above described. This first step causes the transmission of the first sync pulse, as above described. The second trigger pulse No. 2 acts upon the control grid of tube A of step No. 1 to restore that step which in turn conditions the tubes of step No. 2, as previously described. During this condition of step No. 2, the tube B acts over bus 203 to cause the transmission of the second sync pulse. Following the restoration of the step No. 2, steps Nos. 3, 4, 5, 6 and 7 are operated (i. e. conditioned and restored) in sequence in response to the successive trigger pulses. Since there is no output from the steps Nos. 3 through 7, there are no pulses transmitted and these steps may be considered idle or blank steps.

Upon the restoration of step No. 7 of the initial counting chain, the pause counter 126 is operated by the conditioning of its tube B, as shown in detail in Fig. 7. This pause counter 126 is more particularly what might be termed an intermediate or by-passing step between the initial counting chain and the control counting chain for the control office unit for station No. 1, as can best be appreciated from Figs. 2A and 2B. The pause counter 126 includes tubes A and B which are connected to operate in the same way as the various steps of the counting chains, with the tube A of this pause counter 126 normally conducting.

More specifically, when the step No. 7 of the initial counting chain is restored to its normal condition by trigger pulse No. 8, the point $b$ of this step No. 7 is raised in potential charging the condenser C of the pause counter 126 causing a positive pulse to be applied to the control grid of tube B of the pause counter to render it conductive (see Fig. 7). This lowers the potential of the point $b$ of such pause counter 126 and raises the potential of the point $a$ to maintain its tube B conductive. Thus, the pause counter 126 remains in such condition until after the operation of the repeat counting chain. The rendering conductive of tube B of the pause counter 126 causes the terminal (+)PS to be connected over the bus 205 and through resistor 238 of trigger 124 to ground. This results in the trigger 124 transmitting a conditioning pulse to the control grid of the tube B of step No. 1 of the repeat counting chain in a manner presently to be explained.

The operation of this trigger 124 is typical of the other triggers in the system. It has a trigger tube A and a control tube B. This control tube B has its control grid connected through a resistor 239 to the terminal (—)BIAS and through another resistor 238 to ground. This provides a voltage dividing circuit preferably adjusted to give a bias of approximately twice the cut-off value required for the tube (see Fig. 7).

When the terminal (+)PS is connected to the bus 205 through the pause counter 126, the plate supply is connected in multiple with resistor 238 in such a way as to reduce the negative bias on the control grid of tube B of the trigger 124 so that it is rendered conductive. In this connection, the tube A of trigger 124 is normally conducting because the grid of such tube is held at substantially zero or ground potential since it is biased by the potential drop across resistor 240 due to the grid current which flows from the plate supply (+)PS through resistor 240 of the trigger 124. Since the grid of tube A of trigger 124 provides a conducting path to ground, the associated condenser C is charged from (+)PS through resistor 229, so that upon the rendering conductive of the tube B of trigger 124, this condenser C discharges through such tube B to ground. This in effect places the charged condenser C across the grid and cathode of tube A of trigger 124 with such a connection as to have its negative terminal on the grid which acts to swing the potential of the grid with respect to its cathode to a negative value beyond the cutoff value of the tube. Since the condenser C of this trigger 124 is of relatively small capacity and discharges through resistor 240, this swing is abrupt and of brief duration during which time the tube A is non-conductive. Thus, the point $a$ of the trigger 124 abruptly rises in potenial and then abruptly falls to produce a positive trigger pulse supplied to the step No. 1 of the repeat counting chain.

In this way, the response of step No. 7 of the initial counting chain to trigger pulse No. 8 acts through the pause counter 126 and the trigger 124 to condition the tube B of the step No. 1 of the repeat counting chain. This condition persists until the trigger pulse No. 9 appears on the bus 123 which then restores the step No. 1 of the repeat counting chain to normal and conditions the tube B for step No. 2 of the same counting chain. The steps of the repeat counting chain are thus operated successively in response to the trigger pulses 9, 10, 11, 12, 13 and 14 in the same manner as described in connection with the initial counting chain shown in Fig. 6.

When the step No. 6 of the repeat counting chain is restored to its normal condition, the point $a$ of this step falls in potential to a relatively low value which discharges the condenser C of trigger 125, the charge having been built up in a manner similar to that described for condenser C of trigger 124. This causes the condenser C of trigger 125 to be in effect placed across the grid-cathode of tube A of this trigger 125 to swing its grid to a negative potential beyond cut-off. This causes abrupt cessation of conduction through the tube A of this trigger 125 which of course persists only momentarily in view of the small capacity of the condenser. Such abrupt and brief cessation of conduction of the tube A of the trigger 125 results in an abrupt and brief potential rise at its point $a$ so that a trigger pulse is placed upon the bus 147. This trigger pulse on bus 147, which follows the operation of the repeat counting chain, is passed to the pause counter 126 associated with the control office unit for station No. 1 (see Fig. 2B), and acts on the control grid of tube A of pause counter 126 (see Fig. 7) to overcome its negative bias and render the tube A conductive, which drops the potential at its point $a$ and causes the cessation of conduction of the associated tube B because there is insufficient potential to counteract the negative bias of the tube B. In this way, the pause counter 126 is restored to its normal condition, but in so doing the point $b$ of the pause counter rises in potential and supplies a positive pulse to the step No. 1 of the control counting chain for station No. 1 as shown in detail in Fig. 8A. Thus, the step No. 1 of the control counting chain for station No. 1 is in readiness (with its tube B conditioned) for the trigger pulse No. 15 next to occur on bus 123.

It should be noted that during the time that step No. 6 of the repeat counting chain has its tube B conditioned, i. e. rendered conductive, the plate-cathode circuit current renders the tube "H" of the amplitude modulator 120 effective because this cathode of tube B of step No. 6 is connected to the bus 203. For this reason during the pulse or step period No. 13, the first station counting pulse of the high amplitude "H" is transmitted as indicated in Fig. 14 by suitable legend. This station counting pulse conditions the apparatus at the field station No. 1 for the reception of controls as will be later described. It is sufficient at this point to know that both the step No. 1 of the control counting chain of the control office unit for station No. 1 and the step No. 1 of the control counting chain at the field station are respectively conditioned for the transmission and reception of a control pulse.

It should be noted that any trigger pulse applied to bus 147 goes to the control grids of the tubes A of all pause counters, as can best be seen in Figs. 2A, 2B and 2C. But since only one of these pause counters is conditioned at any one time, it is that particular one which is restored to normal in response to such a trigger pulse. In the particular case being considered, only the pause counter 126 is conditioned, so that it is the one to be restored at this time. All of this has taken place in response to the trigger pulse No. 14 on the bus 123, and since the electronic devices respond almost instantaneously the step No. 1 of the control counting chain is conditioned throughout the 14th step period. The trigger pulse No. 15 applied to the bus 123 acts to render the tube A of the step No. 1 (see Fig. 8A) conductive and its tube B non-conductive. The rise in the potential at point $b$ causes a positive pulse to be applied to the control grid of the B tube of step No. 2 which conditions it for transmitting a control, as will be presently described. In a similar manner, the various steps of the control counting chain of this unit operate in response to the successive trigger pulses.

When the step No. 5 of the control counting chain (see Fig. 8A) is restored to its normal condition by trigger pulse No. 19, then a positive pulse is transmitted to the pause counter "For next station" which in the present instance would be station No. 2. This pause counter for this station No. 2, as well as the pause counters for the other station units in the control office, are exactly the same as the pause counter 126. When the tube B of this pause counter for the next station is conditioned, its plate-cathode current flows over the bus 205 and through resistor 238 of trigger 124 which causes a potential drop therein to counteract the negative bias of the tube B of this trigger 124 and render it conductive. In a similar manner as previously described, the tube A of this trigger 124 acts to produce a positive trigger pulse which is supplied to the step No. 1 of the repeat counting chain to render its tube B conditioned. In this way, the repeat counting chain is rendered effective to respond to trigger pulses 20, 21, 22, 23, 24 and 25.

In brief, following the operation of the control counting chain for the control office unit of a station, the pause counter for the next station unit is operated which is effective to initiate another operation of the repeat counting chain which results in the marking off of the spare control pulse periods for the corresponding station, as indicated by a suitable legend in Fig. 14. On each 6th step of the repeat counting chain, the station counting pulse for the next station to be identified is transmitted. In this way, the station pulses and control pulses are counted off for the successive stations up to and including the last station, which in the embodiment of the present invention is assumed to be the 90th station. The repeat counting chain is again operated after the control counting chain for such 90th station which results in the transmission of a station counting pulse on its 6th step in response to the trigger pulse No. 1003 as indicated in Fig. 14. This pulse has been termed the cycle closing pulse in Fig. 14 rather than a station counting pulse since all of the stations have been counted and this cycle closing pulse is for the purpose of closing or completing the station counting operation at all stations by conditioning the normal check steps (such as 162° of Fig. 3) of the station counting chains. In this connection, it is assumed that each of the stations is capable of counting all of the station counting pulses either by reason of having one long station counting chain or by reason of some form of decade counting later to be considered. The purpose of stepping to the normal check step at each station will be discussed later in connection with a consideration of the checking organization.

For the present discussion of the stepping operation in the control office, it should be noted that since the restoration of the step No. 5 of the control counting chain for the last station, indicated by the dotted rectangle in Fig. 2C, conditioned the final pause counter 127, then the trigger pulse No. 1004 results in the restoration of the final pause counter 127 to its normal condition by rendering its tube A conductive and its tube B non-conductive in the same manner trigger pulse No. 14 acted through the step No. 6 of the repeat counting chain and trigger 125 to restore the pause counter 126 to normal. This of course results in a rise in potential at the point $b$ of the final pause counter 127 causing a positive pulse to be applied to the one-shot multi-vibrator 128.

A one-shot multi-vibrator is basically similar to a trigger circuit organization but for the purposes of this disclosure, it is termed a one-shot multi-vibrator to distinguish from the trigger devices, such as trigger 124 of Fig. 7, which triggers are used for the purpose of measuring a relatively short interval of time as compared to the substantial interval of time measured by the multivibrators of this case. Since the control grid of the tube A of the one-shot multivibrator 128 (see Fig. 6) is connected through a suitable resistor to the plate supply terminal (+)PS, the tube A is normally conductive because the grid is drawing a small grid current producing a potential drop across resistor 242 to make the grid substantially at ground potential. This means that the point $a$ of this one-shot multivibrator 128 is at a relatively low potential so that the negative bias on the tube B is sufficient to maintain such tube B non-conductive. Thus, the condenser C1 of this multivibrator 128 is charged through the plate resistor of tube B and the grid circuit of tube A to a potential equal to the potential drop across the resistor 242 connected to the control grid of tube A. Upon the application of the positive pulse to the control grid of the tube B from the final pause counter 127 through its condenser C, this tube B of the multivibrator 128 is rendered conductive because its negative bias is overcome by this positive pulse. The potential at the point $b$ of the multivibrator 128 instantly drops, and the condenser C1 discharges through the tube B and the resistor 242 connected to the control grid of the tube A, which causes such control grid of tube A to swing abruptly to a negative value rendering the tube A non-conductive. This condition is maintained during the effective discharge time of the condenser C1, which of course is determined by the value of its capacity and the resistance of its discharge circuit, and determines the time during which the tube A is maintained non-conductive and the tube B is maintained conductive. At the end of this time (which is suitably selected), the bias on the tube A is restored to its normal value and the tube A becomes conductive lowering the potential at the point $a$ so that the negative bias of the tube B restores it to a non-conductive condition. This causes an abrupt rise in the potential at the point $b$ which transmits a positive pulse through the condenser C2 to the one-shot multivibrator 129.

This one-shot multivibrator 129 operates in exactly the same way as the one-shot multivibrator 128 so that its operation will not be described in detail. The two one-shot multivibrators 128 and 129 are provided because it is desirable whenever a time delay is to be measured by one-shot multivibrators, to allot half of such time to each of two multivibrators so that each multivibrator is assured of sufficient restoration time. This is especially true if the total time involved during a cycle is less than the time between cycles; but if the time between cycles is shorter than the time required for a cycle of operation one of these multivibrators may be omitted.

These two one-shot multivibrators 128 and 129 are included in the end of cycle apparatus indicated in Fig. 2C and shown in detail in Fig. 6 for the purpose of measuring off the time margin between successive cycles of the system, as indicated at the end of the cycle in the chart of Fig. 14. This time may be any suitable time period as required in accordance with the conditions of practice. In the main form of the invention now being considered, this time margin between cycles could be relatively short. However, when decade counting is employed as later described, it is necessary that the time delay measuring apparatus at each field station be set into operation following each step of the units station counting chain, and for this reason the time measuring apparatus at that station is continued even after the cycle closing pulse so that a time margin between cycles would of necessity have to be greater than the usual time for each station, i. e. 11,000 microseconds in the present instance. Also, in those cases where a relatively small number of field stations are employed in the system, it might be desirable for the purpose of more economically using the apparatus to provide a substantial delay between successive cycles of operation. In any event, the one-shot multivibrators 128 and 129 may be used to measure that particular time margin required between cycles of operation whatever time that may be in accordance with the requirements of practice.

The restoration of one-shot multivibrator 129 to its normal condition causes an abrupt rise in the potential at its point $b$ which transmits a positive pulse through its condenser C2 to the control grid of tube B of the broad trigger 130. This trigger 130 is similar in construction and operation to the trigger 124 of Fig. 7 except that this trigger has its negative bias overcome by a positive pulse applied to its grid rather than by a conductive circuit through a resistor to ground as in the case of trigger 124. Also, this trigger 130 may be considered as a "broad" trigger since its condenser C is of slightly higher capacity in order to provide that its output pulse 243 to the step No. 0 of the initial counting chain shall have a substantial time period of 500 microseconds, for example, as represented in Fig. 6; whereas the triggers 124 and 125, for example, provide pulses which have sharp peaks and practically no base.

The reason this trigger 130 is required to give an output pulse broader than the other triggers, such as 115, for example, is because its output trigger pulse is not synchronized with respect to the trigger pulses applied to the bus 123 by trigger 115. If the two trigger pulses should occur simultaneously, it is desired that the trigger pulse 243 from trigger 130 should predominate in its control of step No. 0 of the initial counting chain. This is illustrated in Fig. 16 where the pulse 243 from trigger 130 covers or masks the trigger pulse No. 0 from the trigger 115 as occurring on bus 123. In other words, when these pulses occur simultaneously, the broader pulse 243 persists longer and causes the step No. 0 to be conditioned for the next trigger pulse or bus 123. However, if they do not occur at the same time, then the pulse 243 conditions the step No. 0 and the next pulse on bus 123 becomes the pulse No. 1 of the cycle. For this reason, the period of time during which the step No. 0 is conditioned may vary for different operating cycles, but this is not objectionable since such step No. 0 is only a preliminary step used solely for conditioning the step No. 1 upon the occurrence of the first trigger pulse of the cycle on bus 123.

The output of the trigger 130 is connected directly to the control grid of the tube B of step No. 0 without any intervening condenser as provided for the other steps. In the present case, the output of the trigger 130 is taken from the point $a$ so that the trigger pulse is formed by a rise and fall in potential at this point. If this pulse were passed through a condenser, it would cause a positive pulse followed by a negative pulse. This positive pulse would cause the tube B of step No. 0 to become conductive; whereas, the immediately following negative pulse would cause it to become non-conductive rather than waiting for a trigger pulse from the bus 123 as applied to the tube A of this step No. 0. Thus, exact synchronization would not be obtained. For this reason, no condenser is provided for the step No. 0.

From this description it will be apparent that the end of cycle apparatus conditions the step No. 0 when the time margin between cycles has elapsed, and the next trigger pulse occurring on the bus 123 restores step No. 0 and conditions step No. 1 marking the beginning of the new cycle of operation. This first pulse is designated trigger pulse No. 1 both in the diagram of Fig. 14 and adjacent the step connections in Figs. 2A, 2B, 2C and 6.

*Transmission of controls.*—Referring to Fig. 8A, it will be noted that the cathode of the tube B of each step of the control counting chain is connected to the bus 201 leading to the amplitude modulator 120 for causing the transmission of pulses of the low amplitude. Each one of these steps is conditioned in response to the trigger pulse applied to the prior step, so that it will be apparent that step No. 1 of the control counting chain in Fig. 8A is conditioned during the 14th step in response to trigger pulse No. 14.

As explained above, in connection with the modulation of the carrier pulses, if the bus 202 is also energized so as to render the medium tube "M" of the amplitude modulator 120 active, both the tubes "L" and "M" are active causing both the resistors R1 and R2 to be effective for that pulse period which produces a carrier frequency pulse of the medium amplitude. As shown, the switch machine control lever SML is in its left-hand normal position (see Figs. 2B and 8A) connecting the cathode of tube B of step No. 1 to the bus 202 to cause a medium amplitude pulse for the first control step for the first station, as can be observed in the diagram of Fig. 14. If this lever SML were operated to the right-hand position, then it is apparent that the medium bus 202 would be energized together with the low bus 201 on the 15th step of the system.

Similarly, the signal control lever SGL is used to determine the amplitude of the pulses transmitted on the sixteenth, seventeenth and eighteenth steps. When such lever SGL is in its normal "on center" position for holding the associated signals at "stop," the step No. 5 has its cathode connected to the bus 202 as well as to the bus 201, so that the eighteenth pulse of the cycle is caused to be of the medium amplitude as indicated in the diagram of Fig. 14. When the lever SGL is operated to the left, it connects the medium bus 202 to the cathode of the step No. 3 to cause the pulse transmitted for the sixteenth step of the cycle to be of medium amplitude, while the pulses for the seventeenth and eighteenth steps will be of the low amplitude. On the other hand, if the lever SGL is moved to a right-hand position, the medium bus 202 is connected to the cathode of step No. 4 so that the seventeenth pulse transmitted will be of the medium amplitude while the sixteenth and eighteenth pulses will be of the low amplitude.

In this way, the amplitude of the pulse transmitted for any step may be selected in accordance with the position of a control lever, that is, a pulse of the low amplitude is usually transmitted for each step, but each such pulse may be selectively caused to be a pulse of the medium amplitude and thus transmit the desired control. If additional steps are employed for any field station, it will be obvious that additional control levers may be provided and act upon such steps in exactly the same way.

The bus 201 is provided with energy from each step of the control counting chain because every step period of the cycle must have a pulse of at least the low amplitude in order to cause the counting operation at the associated field station. Because all of these steps have the cathodes of their tubes B connected to this bus 201, it is necessary to provide the rectifier units in their circuits so that the position of any lever to connect the buses 201 and 202 for a step will not also be effective during the other steps. Obviously, if the rectifier unit 244 were omitted, the lever SML in its left-hand position would provide a short circuit between the buses 201 and 202 and the different steps could not selectively energize these buses. In a similar manner, the controls for each station are transmitted when that station has been identified and its corresponding control counting chain is operated.

*Cycle demarcation at the field station.*—Referring to Fig. 3, it will be noted that the station counting pulses and control pulses are received over the line circuit at the field station and pass through the band-pass filter 103 and the amplifier-detector 150. This amplifier and detector 150 is constructed the same as the amplifier and detector 133 described in Fig. 9 for the indication receiver in the control office. With reference to such Fig. 9, it is noted that the double wave plate detector, including tubes 275 and 276, is provided with a common cathode resistor 277 which causes these tubes to be normally biased to substantially cut-off. A common load resistor 278 is included in the plate circuit of the tubes 275 and 276 to provide an output to wire 279 for the discriminators 134 and 135 through a filter network to smooth the output pulses. Thus, the potential normally applied to the output wire 279 is at a relatively high value and the maximum that it will ordinarily reach. When a carrier frequency pulse is received, the detector tubes act in effect to rectify the pulse. Since the carrier frequency pulse includes a series of carrier frequency cycles of varying amplitudes as indicated in the chart of Fig. 13, this detector produces an output pulse having a wave shape corresponding to the envelope of the received carrier pulse, but this output pulse is in the form of a negative or inverted pulse applied to the wire 279 of Fig. 9.

The reception of a carrier pulse at the field station from the central office results in a similar operation of its detector to apply an output pulse to the wire 206 at the field station shown in Fig. 10A. It is believed that further description of this plate detector at the field station will be unnecessary, since it is sufficient to know for the present that the plate detector acts to produce from each received carrier frequency pulse a negative output pulse having a wave shape corresponding to the envelope of the carrier pulse and having a relatively high, medium or low amplitude depending upon the amplitude of the carrier pulse received. These negative control pulses are applied to the bus 206 extending to all three amplitude discriminators 151, 152 and 153 shown in detail in Figs. 10A and 10C.

The amplitude discriminators 151, 152 and 153 have their control grids normally biased to substantially zero potential with respect to their associated cathodes. The low discriminator 152 accomplishes this by connecting its control grid through resistors 249 and 250 directly to its associated cathode. However, each of the amplitude discriminators 151 and 153 is thus biased to zero by having its grid connected to the plate supply (+)PS through suitable resistors which allow a grid current to flow and cause a potential drop to maintain the grid at substantially zero. More specifically, the resistors 245 and 246 are used for the high amplitude discriminator, and the resistors 247 and 248 are used for the medium amplitude discriminator 153. It should be noted that the reasons these discriminators respond to pulses of different amplitudes is due to the relative values of these different resistors as will be discussed following a consideration of the operation of the high discriminator 151.

Referring to Fig. 10A, it will be noted that the condenser C of the high discriminator 151 is charged, while there is no output of the plate detector, to a value substantially equal to the potential drop across the resistor 245. The charging current for the condenser C can flow from the terminal (+)PS of the plate supply through the plate resistors of the detector 150 (not shown in detail), condenser C of the amplitude discriminator 151, resistor 246, from the grid of the discriminator 151 to the cathode, and to the negative terminal of the plate supply by the way of ground. The grid of course may have a small current since it is assumed to have a self-adjusting bias falling at about zero potential. Because the charging circuit just pointed out includes the load resistor in the plate circuit of the detector tubes, it will be obvious that any potential drop in such load resistor due to its not being fully cut-off, will prevent the condenser from assuming the full potential drop across the resistor 245. However, for practical purposes, the condenser may be assumed to have substantially the same potential as the drop across this resistor 245.

Although in one sense the plate detector gives what may be considered as negative output pulses, in another sense the plate detector tubes may be considered as a variable impedance which has a maximum value and which decreases and increases in accordance with the variation in the potential on the grids of the detector. When a pulse is received by the plate detector, the tubes become more conductive allowing the potential of the wire 206 to drop below the value to which the condenser C of the high discriminator (and also the condensers of the other discriminators) is charged so that this condenser C may be considered as in effect discharging through the impedance of the plate detector.

Assuming that a pulse of the high amplitude is received by the plate detector, a discharge path for the condenser C of the high amplitude discriminator 151 is completed from the positive terminal of the plate supply (+)PS through resistor 245, condenser C, detector tubes of the plate detector, to ground and thence to the negative terminal of the plate supply. This condenser C is of such a capacity relative to the resistance of this discharging circuit that it does not appreciably lose its charge during the time of the usual pulse. Thus, its fully charged potential may be assumed to be effective throughout a pulse period to supply a potential to determine the potential of the grid of the associated discriminator under conditions as will be presently described.

During the reception of a carrier frequency pulse, the potential of the bus 206 drops to a value such as to allow the potential of the charged condenser C of discriminator 151 to cause current flow through the above noted discharge circuit. This current is of such a value that a potential drop is produced across resistor 245 which swings the control grid of the amplitude discriminator 151 negative to or slightly beyond the cut-off value of the tube.

However, since the potential drop across the resistor 246 due to grid current flow is normally present, the current flow due to the condenser must first supply sufficient current through resistor 245 to eliminate this potential drop across resistor 246 before the grid can begin to go negative. Thus, the grid of the discriminator tube remains at zero potential until the amplitude of the pulse becomes sufficient to compensate for the normal potential drop across resistor 246, and thereafter the additional amplitude of the pulse can then swing the grid negative.

For this reason, the output connection at the point a of the discriminator 151 rises in potential only during the negative swing of the grid and returns to its original value upon the restoration of the grid to its normal zero bias. In this way a positive output pulse is supplied over the wire 251 to the one-shot multivibrator 160 and the time discriminator 158 each time a pulse of the high amplitude is supplied to the wire 206 by the amplifier and detector 150. If the control grid of the discriminator 151 swings slightly beyond the cut-off value of the tube, then obviously the output of this discriminator 151 will have a flat-topped wave shape. In any event, any regular output pulse on the wire 251 acts on the one-shot multivibrator 160 and the time discriminator 158 in a manner later described.

But it should be noted that the application of a medium or a low pulse to the wire 206 does not cause an output pulse on the wire 251 by the high amplitude discriminator 151 because either amplitude is insufficient to allow sufficient current to flow through the resistor 246 to produce a potential drop across it great enough to swing the control grid negative below its normal zero bias.

Referring to Figs. 10A and 10C, it will be observed that the condenser C of the low amplitude discriminator 152 receives a charge of substantially the full potential drop between the wire 206 and ground, whereas the condenser C of the medium amplitude discriminator 153 receives a charge of a lower potential representing substantially the voltage drop across the resistor 247. Similarly, the condenser C of the high amplitude discriminator 151 receives a charge having a potential of a still lower value and corresponding substantially to the potential drop across resistor 245. This is because the resistors 245 and 246 of the discriminator 151 act as a voltage divider with the values so chosen as to cause a charge of a lower potential to be applied to its condenser C than is applied to the condenser C for the medium amplitude discriminator 153 in view of the values of the resistors 247 and 248 providing the voltage divider for that discriminator.

Since these condensers C for the three different discriminators have charges of different potentials, due to the relative values of the voltage dividing resistors, when a pulse of any particular amplitude is applied to bus 206 (i. e. when that bus is lowered in potential due to the plate detector becoming more conductive), these different condensers are rendered respectively effective for their different discharge circuits to a degree dependent upon the amplitude of the pulse and their respective charge potentials.

Assuming that a carrier frequency pulse of the low amplitude is received and the bus 206 is correspondingly controlled, this condition acts to allow the condenser C of the low discriminator 152 to swing its control grid to a suitable negative value to cause a sufficient output of the discriminator 152 to operate the one-shot multivibrator 154, assuming that it is already receiving gating energy over the wire 211. This negative swing of the control grid of the low amplitude discriminator 152 is preferably just to the cut-off value of the discriminator tube, although this is not an essential to proper operation. In such a case, the application of a low amplitude pulse causes the same output of the low amplitude discriminator 152 as is caused by the application of pulses of the medium and high amplitudes, since these latter pulses in swinging the control grid of the low amplitude discriminator 152 further negative beyond cut-off cannot cause any greater change in the conductivity of the discriminator.

The application of a low amplitude pulse to the bus 206 is of insufficient value to cause the control grids of the medium and high amplitude discriminators 153 and 151 to go below their normal zero bias. For example, assuming that each discriminator tube is cut-off by a 20 volt negative swing of its grid, the change in potential of the bus 206 for a low pulse is just enough to allow the condenser C of the low discriminator 152 with its relatively high potential charge to effect such a 20 volt negative swing of its grid. But the same change in potential of the bus 206 is not sufficient to allow the condenser C of the medium discriminator 153 with its relatively lower potential charge to swing its grid negative. Whatever current flow takes place in the discharge circuit for the condenser C of the medium discriminator 153 for such a change in the potential of the bus 206 merely causes a potential drop across resistor 247 of an increased value to compensate for the normal potential drop across resistor 248 which is now eliminated. In other words, the current through the resistor 247 merely compensates for the current flow through the grid circuit which has now ceased, because as the potential drop across the resistor 247 increases, the grid current decreases since the grid tends to allow only the proper current flow to keep it at substantially zero bias.

Similarly, this same change in potential of the bus 206 is not sufficient to allow the condenser C of the high discriminator 151 with its relatively low potential charge to swing its grid negative. Whatever current flow takes place in the discharge circuit for the high discriminator 151 for such a change in the potential of bus 206 merely replaces a part of the current flowing through the grid circuit, since any increased drop in potential across resistor 245 causes a decrease in the grid current because the grid tends to maintain the proper current value to keep it at substantially a zero bias potential.

Assuming a pulse of the medium amplitude is received by the plate detector, then the potential of bus 206 drops a correspondingly greater value. This allows the condenser C of the medium amplitude discriminator 153 to be effective, to cause sufficient current flow through resistor 247 as to produce a potential drop to momentarily swing its grid negative to or slightly beyond cut-off. Since the potential drop across resistor 248, due to grid current flow, is normally of a particular value (somewhat less than the normal potential drop across resistor 246 of the high amplitude discriminator 151), it must be compensated for before the grid can actually be caused to swing negative for reasons above explained. Thus, the grid of the discriminator 153 remains at zero until the amplitude of the medium pulse becomes sufficient to effect such compensation and swing it negative. For this reason, the output connection at the point $a$ of the discriminator 153 rises in potential only during the negative swing of its grid and returns to its original value upon the restoration of the grid to its normal zero bias. In this way, a positive output pulse is supplied to the one-shot multivibrator 156 each time a pulse of the medium amplitude is received by the amplifier and detector 150. If the control grid of the discriminator 153 swings beyond the cut-off value of the discriminator tube, then the output of this discriminator will of course have a flat-topped wave shape. In any event, a regular output pulse of the discriminator 153 acts on the one-shot multivibrator 156 in a manner later to be described.

However, it should be noted that the reception of a medium amplitude pulse results in the swinging of the control grid of the low amplitude discriminator 152 to a negative value well beyond cut-off and to a greater degree than the negative swing effected by the reception of a low amplitude pulse, but for reasons above explained an output of the same amplitude is provided for the one-shot multivibrator 154.

Also, it should be noted that the reception of the medium amplitude pulse does not allow the condenser C of the high amplitude discriminator 151 to effect sufficient current flow through its resistor 245 to cause the negative swing of its control grid for reasons above pointed out.

Again assuming a high amplitude pulse to be applied to the bus 206, it will act on the high discriminator 151 as previously described. However, it should be noted that it is effective to cause both the medium amplitude discriminator 153 and the low amplitude discriminator 152 to provide output pulses. This is because the pulse of the high amplitude is able to swing the control grids of both the medium and low amplitude discriminators negative well beyond cut-off. In other words, since the low amplitude discriminator 152 is connected to have the full potential of each pulse on the bus 206 applied across the resistor 250, and since each pulse is of sufficient amplitude to swing its control grid negative to cut-off or slightly beyond cut-off, input pulses of all three amplitudes are effective to cause such low amplitude discriminator 152 to provide output pulses.

In brief, the different amplitudes of the carrier pulses are so proportioned as to provide a suitable margin of distinction between them. For example, the medium amplitude pulse may be made twice the value of the low amplitude pulse; and the high amplitude pulse may be made twice the value of the medium amplitude pulse. With this ratio between the different pulses, the corresponding ratios may be employed in the selection of resistors 245, 246, 247 and 248 to render their respective discriminators selectively responsive to the medium and high amplitudes. This means that the low amplitude is the basic value, and may be so selected as to provide that the control grid of the low amplitude discriminator 152 is swung negative to its cut-off value for a low amplitude pulse. Since this low amplitude pulse is the basic pulse value, then it is not necessary to provide a voltage divider arrangement for the low amplitude discriminator 152 the same as for the other amplitude discriminators 151 and 153. However, it is to be understood that a similar connection might be employed if desired. Referring to Fig. 10C, the resistor 249 acts as a current limiter in the grid circuit of the low amplitude discriminator 152. Also, it should be understood that various other values of pulses, resistors and negative grid swing for the tubes, and the like, may be selected as found expedient, but the above relationships are selected merely to make the disclosure of this embodiment clear and definite.

Before considering how the low and medium amplitude pulses cause the counting operation at the field station and the registration of controls, it is thought desirable to consider the manner in which the field station is conditioned by the sync pulses at the beginning of a cycle of operation for the reception of subsequent station counting pulses and the control pulses for the particular station in question.

Referring to Fig. 14 it will be noted that the sync pulses at the beginning of the cycle of operation are of the high amplitude and are on adjacent pulse or step periods. Let us assume that the first sync pulse is received at the field station (see Figs. 10A, 10B, 10C and 10D). Although the low and medium discriminators 152 and 153 pass pulses in response to this high sync pulse, their associated one-shot multivibrators 154 and 156 do not respond because they are double-gated and require energy on both gates, as will be later described. Since the first sync pulse is of the high amplitude, it is passed by the high amplitude discriminator 151 to place a positive pulse on the wire 251 leading to both the one-shot multivibrator 160 and the time discriminator 158. The multivibrator 160 is double-gated and since there is no energy on its other gate control, the pulse on the wire 251 does not initiate it. On the other hand, the pulse on the wire 251 is effective to act on the time discriminator 158 which is so arranged as to give an effective output only if two pulses of the high amplitude are received within the proper time periods.

This time discriminator 158 is essentially two multivibrators; the first of which includes tubes A and B; and second of which includes tubes A2 and B2. Both of the tubes A and A2 are conducting since their control grids are connected to the terminals (+)PS through suitable resistors. The second multivibrator of the time discriminator is double-gated, one gate of which is connected to wire 251 and the other of which is connected to the output of its first multivibrator, which in turn has its input connected through condenser C3 to the wire 251.

With this organization, the application of a positive pulse on the wire 251 energizes only one gate for the tube B2 of the time discriminator 158 because the point $a$ is at a relatively low potential while the tube A is conducting. However, the application of this positive pulse on the wire 251 to the condenser C3 causes a positive pulse followed by a negative pulse to be applied to the control grid of the tube A of this time discriminator 158. The positive pulse is ineffective because the control grid of the tube A is already sufficiently above cut-off to maintain the conduction of the tube, but the following negative pulse is effective to cause the grid to have a sufficient negative potential beyond cut-off as to render the tube A non-conductive. This raises the potential at the point $a$ which places a positive potential on the grid of tube B counteracting its negative bias to render such tube B conductive. This lowers the potential at point $b$ which allows the condenser C to discharge and cause a greater current flow through the resistor 252 to maintain the control grid of tube A negative beyond cut-off until the condenser C is effectively discharged. This discharge time is of sufficient duration to maintain the point $a$ at a relatively high potential as to in part overcome the negative bias on the control grid of tube B2 so that upon the reception of the second sync pulse (which is also of the high amplitude) sufficient positive potential is applied from wire 251 to the control grid of the tube B2 to render it conductive.

With tube B2 of the time discriminator conductive, decrease of the potential at the point $b2$ allows the condenser C2 to discharge through resistor 253 to reduce the potential on the grid of tube A2 to such a negative value beyond cut-off as to cause it to cease to conduct. The potential therefore rises at the point $a2$ to such a value as to maintain the conductivity of the tube B2 for a short interval of time after which the tube A2 again conducts and the tube B2 ceases conduction because the point $a2$ drops in potential. From this description, it can be seen that the time discriminator 158 effectively operates in response to the second sync pulse only providing it occurs within a limited time after the first sync pulse. If the second sync pulse fails to arrive within the limited time allowed (i. e. while the tube B is conducting and the tube A is nonconducting), then the second sync pulse is unable to render the tube B2 conductive. This means that the resistors must be of such values that the tube B2 is in effect double-gated and requires a positive pulse through each of its gating resistors in order to cause the tube B2 to become conductive.

When the tube B2 of the time discriminator 158 ceases conduction, the point b2 rises in potential causing a positive pulse to be transmitted through the condenser C4 and rectifier 254 to the control grid of the tube B of the time delay device 159. The negative pulse occurring prior to this positive pulse and upon the reduction in potential at the point b2 of the time discriminator 158, is shunted to ground by the rectifier unit 255.

A positive pulse on the grid of tube B of the time delay 159 renders it conductive and the tube A non-conductive because upon the reduction in potential at the point b the condenser C is discharged through resistor 256 and lowers the potential on the control grid of the tube A beyond cut-off so that it becomes non-conductive and remains in this condition during the effective discharge time of the condenser. Following the discharge of the condenser C of the time delay 159, the tube A again becomes conductive and the tube B non-conductive which causes a positive pulse to be transmitted through its coupling condenser C2 to the control grid of the tube B2. The same operation occurs with respect to this second one-shot multivibrator of the time delay 159, and after its operation the third one-shot multivibrator, including tubes B3 and A3, is operated in a similar manner. The total effect is that this time delay group of one-shot multivibrators 159 is effective to measure off a time period equal to 11,000 microseconds (with a slight margin). While the tube B3 of the time delay 159 is conducting, the point a3 is at a relatively high potential to supply a positive gating potential for the one-shot multivibrator 160, which might aptly be termed a station gate. While this gating potential is applied to the control grid of the multivibrator 160, the first station counting pulse arrives, is passed by the high amplitude discriminator 151, and applied to the control grid of the tube B of the multivibrator 160. This application of double gating potential is effective to cause this double-gating multivibrator 160 to operate and cause a negative pulse to be passed to the trigger 161 through its condenser C which in turn puts out a positive trigger pulse on the bus 207. This of course occurs when the one-shot multivibrator 160 is restored to its normal condition.

This operation has been indicated in the sequence chart of Fig. 20 where the time discriminator 158 is indicated as having its first multivibrator operated near the end of the first sync pulse by reason of the negative pulse applied to its tube A upon the dropping in potential at the point a of the amplitude discriminator 150. This first multivibrator of the time discriminator is preferably adapted to measure approximately 1000 micro-seconds. The second multivibrator of the time discriminator 158 is operated upon the rise in potential at the point a of the amplitude discriminator 151 near the beginning of the second sync pulse. This multivibrator is preferably effective to measure a time interval of approximately 750 microseconds. The termination of the operated condition of the second multivibrator of time discriminator 158 initiates the first multivibrator of the time delay 159, which preferably measures a time period of approximately 5000 micro-seconds at the end of which it initiates its associated second multivibrator, which also preferably measures a time period of approximately 5000 microseconds. As above described, and as indicated in Fig. 20, the termination of the operation of this second multivibrator of the time delay 159 initiates the third one-shot multivibrator which preferably measures a period of 1000 microseconds.

In this way, the two sync pulses at the beginning of a cycle of operation are effective to initiate a time measuring organization which is sufficiently accurately set to provide a partial gating of the multivibrator 160 only during the time allotted for the reception of the first station counting pulse. A time margin is not required on the multivibrator measuring the 1000 microseconds, since it is only necessary to receive the effective peak value of the station pulse somewhere within such time in order to register it.

Although the total time period measured by the time delay 159 is equal to 11,000 microseconds, the gate for the station pulse is open only approximately 1000 microseconds, i. e. during the 13th pulse or step period as measured by the third one-shot multivibrator of the time delay 159. This measurement of a time between the second sync pulse and the first station pulse to open a gate for such station pulse at the proper time, is repeated after the reception of each station pulse to open the station gate for the next station pulse to be received. Thus, the reception of a high amplitude station counting pulse at any time other than when the station gate 160 is open, does not result in the operation of the station counting chain.

Without considering in detail how the stepping operation occurs, it should be pointed out here that the successive steps of the station counting chain also initiates the time delay 159 so that the one-shot multivibrator 160 is gated for each successive station counting pulse. If for some reason the station counting chain at a particular station ceases operation, then the time delay 159 is not initiated following the reception of a station pulse so that further station counting pulses can not be received because the multivibrator 160 is not then prepared for the reception of other pulses.

Since the electronic stepping devices operate so quickly and in fact substantially at the same time as between any two steps, there must be means provided to differentiate between the operation of the successive steps in order to determine the proper initiation of the time delay device 159. In order to do this the step differentiator 163 is provided. This step differentiator 163 comprises two tubes B1 and B2 both of which are negatively biased by connection to the terminal (—) BIAS. Two buses 208 and 209 are connected to the grids of the respective tubes through condensers C1 and C2 of the step differentiator 163, and are respectively connected to ground through suitable resistors 257 and 258. When the B tube for any step of the station counting chain is rendered conductive, its plate-cathode current flows through the appropriate bus 208 or 209 and the corresponding resistor 257 or 258 to ground. The initiation of this current for either the bus 208 or the bus 209 causes a positive pulse to pass through the associated condenser C1 or C2 to the control grid of the corresponding tube B1 or B2. This renders that tube of the step differentiator 163 conductive lowering the potential at its point $b$ which allows the condenser C3 to discharge through the resistor 256 and the rectifier 260 of the time delay 159, which causes the control grid of the tube A of the time delay 159 to swing sufficiently negative to render it non-conductive. This increases the potential at its point $a$ so that the potential on the grid of the associated tube B is raised sufficiently toward positive as to render such tube B conductive. This allows the discharge of its condenser C through the tube B and resistor 256 which maintains the grid of tube A negative beyond cut-off for a sufficient time to maintain this operated condition of the one-shot multivibrator for its regular time period.

Since the application of energy to either the bus 208 or the bus 209 merely gives a momentary positive pulse to its associated tube B1 or B2 of the step differentiator 163, such tube is conductive only momentarily. This means that the potential at the point $b$ of the step differentiator 163 is reduced to a relatively low value only momentarily. As above pointed out the discharge of condenser C3 of the step differentiator 163 in effect supplies a negative pulse through the rectifier unit 260 to the control grid of the tube A of the time delay 159, but when the potential again rises at the point $b$ of the step differentiator 163 this condenser C3 again charges. This would tend to apply a positive pulse to the control grid of the tube A of the time delay 159 if it were not for the blocking rectifier unit 260. If such positive pulse of an effective value were actually applied, it might restore the tube A to its conductive condition prematurely. However, it should be noted that the condenser C3 of the step differentiator 163 must have a charging circuit, and this is provided by the connection to ground through rectifier unit 259. For this reason, the condenser C3 of the step differentiator can be recharged immediately without affecting the relatively long timing operation of the first multivibrator of the time delay 159.

Upon the cessation of current flow through the conditioned step of the station counting chain removing energy from the appropriate bus 208 or 209, the corresponding condenser C1 or C2 of the step differentiator 162 is discharged which tends to cause a negative pulse to be applied to the control grid of the corresponding tube B1 or B2. Since both tubes are normally negatively biased, such negative pulse is ineffective. In other words, it is only the establishment of current flow in one of the buses 208 or 209 that is effective to produce a control for initiating the time delay 159. This means that the time delay 159 is initiated only when an electronic stepping device becomes conditioned, i. e. when the next step is taken in the station counting chain. In this way the first one-shot multivibrator of the time delay 159 is set into operation at the end of each station counting pulse to cause the measurement of the proper time period for gating the multivibrator 160 for the reception of the next station counting pulse.

*Station stepping operation.*—With reference to Figs. 10A and 10B let us assume that the cycle demarking organization for the field stations has been conditioned by the sync pulses in a manner to allow each successive station counting pulse to effect the application of a trigger pulse to the bus 207. The successive trigger pulses on bus 207 cause the successive operation of the station counting chain as shown in Fig. 10B. This station counting chain is shown as including step Nos. 1 through 5 and a "normal check step." This is merely typical of the complete counting chain which would be used at each field station having a number of steps in accordance with the number of field stations (with a normal check step in addition) which in the present case is assumed to be 90 stations. The additional steps have been indicated in the block diagram of Fig. 3 by the block "Other steps," but such steps are not indicated in Fig. 10B for the sake of simplicity in the disclosure. The manner in which this number of stepping devices may be reduced by employing decade counting will be discussed later.

The tubes A and B of each step are connected in a similar manner as specifically described in connection with the initial counting chain of Fig. 6 and the interrelation between the steps is exactly the same. The only difference in the circuit connections is in this instance the grids of the tubes A are connected to a bus 210 which is connected to $(-)$ BIAS through a front contact of the check relay $CHR^2$, as will be later described. This is the equivalent of the manual control of the corresponding bias control bus in the control office. The normal check step 162 is the same as the other steps but with the A and B tubes in reversed positions so that it will be apparent from the disclosure that this normal check step 162 is the one in which the stepping chain stops its effective rotation. Also, instead of the station counting chain being initiated from some other means, it is so arranged that the first trigger pulse applied to the bus 207 causes the conditioning of the tube B of the normal check step 162 which renders the associated tube A non-conductive and the application of a positive pulse to the input of the step No. 1 to condition its tube B. The second trigger pulse on the bus 207 thus acts to oppose the negative bias of the tube A of step No. 1 restoring it to its normal conductive condition which in turn renders the tube B non-conductive to give an output of a positive pulse to the tube B of the step No. 2 thereby conditioning it and rendering the tube A of that step non-conductive.

With this operation of the station counting chain in mind, it should be noted with reference to Fig. 20 and the previous description of the station gating, that the one-shot multivibrator 160 is partially gated at just the right time for a station counting pulse to be received. But the high amplitude discriminator 151 does not give an effective output until the station counting pulse being received has risen to a value above the maximum value of a medium amplitude pulse and yet somewhat before the station counting pulse reaches its maximum. This has been illustrated for the one-shot multivibrator 160 in Fig. 20 in an approximate manner, but when the discriminator's point in the pulse period has once been determined, the multivibrator 160 is so constructed as to measure the remaining time of that pulse period and render the trigger 161 effective to produce a trigger pulse on the bus 207 at the point where the station counting pulse terminates and the first control pulse begins. This is indicated in Fig. 20 for the trigger 161. A dotted line is shown extending from the first trigger pulse of trigger 161 to the point in the diagram where the station counting chain steps from the normal check step to the step No. 1.

From this it can be seen that the step No. 1 is in effect taken in response to the rising front of the station counting pulse when it has reached a proper amplitude, the effect of which is time delayed so as to cause the step to actually take place at the proper time to mark the boundary between two successive pulse periods. Each successive station counting pulse acts to produce a trigger pulse in exactly the same way and cause the next step of the station counting chain to be taken.

In this way, the step-by-step operation of this station counting chain occurs in response to successive station counting pulses of the high amplitude received over the line circuit until the last or final cycle closing pulse is received which then returns the last step, such as step No. 5, to its normal condition which transmits a positive pulse to the normal check step for conditioning its A tube in readiness for a subsequent cycle of operation. In this connection, it is apparent that it would be most difficult to illustrate the large number of steps required for 90 stations, and that step No. 5 shown in Fig. 10B will have exactly the same action on the normal check step 162 as if it were the 90th step of a station counting chain.

Since only the station counting pulses of the high amplitude are passed by the discriminator 151, then the trigger pulses on the bus 291 are separated by time periods sufficient for the reception of the control pulses and with the spare pulse periods (no actual pulses as shown in Fig. 14) inserted before the next trigger pulse occurs. For example, let us assume that two station counting pulses have been received, then the step No. 2 of the station counting chain is conditioned by having its tube B rendered conductive. This causes the point a of this step No. 2 to be at a relatively high potential which is supplied through the station jumper 175 for station No. 2 to the bus 211. This energy on bus 211 provides partial gating energy both for the one-shot multivibrator 154 and the one-shot multivibrator 156. Thus, upon the reception of a carrier pulse of either a low or medium amplitude, the low amplitude discriminator 152 will be effective to energize the second gate of the one-shot multivibrator 154 and cause it to give an output to the trigger 155 to apply a trigger pulse to the bus 212 for causing the control counting chain to operate one step. Also, upon the reception of a carrier pulse of the medium amplitude, discriminator 153 will provide energization for the second gate of the one-shot multivibrator 156 which in turn provides an output on the bus 213 for the corresponding pulse or step period. This energization of the bus 213 by a pulse for any step period renders the control receiver for that step effective.

Before considering how the control counting chain operates step-by-step, it may be desirable to note that the one-shot multivibrator 154 has its tube A normally conducting and its tube B normally non-conducting for the same reasons as pointed out in connection with the one-shot multivibrator 128 of Fig. 6. The negative bias on the tube B is sufficiently beyond cut-off that when the bus 211 is energized, the tube B still remains cut-off but sufficient positive potential has been applied to the control grid to in part oppose this negative bias so that upon the application of a positive pulse from the amplitude discriminator 152, the actual potential on the control grid of the tube B of the one-shot multivibrator 154 is substantially above the cut-off value rendering this tube B conductive. This allows the condenser C of the multivibrator 154 to discharge and increase the current through the associated resistor 305 and swing the control grid of tube A negative to a sufficient extent to maintain the tube A non-conductive for the effective discharging interval, after which the potential on the control grid of the tube A rises to again render it conductive. This again lowers the potential of the point a to again allow the negative bias of the tube B to render it non-conductive.

During the time that the one-shot multivibrator 154 is operated with its point a at a relatively high potential, the condenser C of the trigger 155 accumulates a charge equal to the potential drop across the associated resistor 306. This charging current does not in any way affect the operation of the tube A of the trigger 155. But when the tube A of the one-shot multivibrator 154 again becomes conductive, the charge on the condenser C of the trigger 155 is dissipated through the tube A of the multivibrator 154. This discharge circuit is through the resistor 306 which causes a potential drop that swings the actual potential on the grid of the tube A of trigger 155 to such a negative value as to prevent its conduction. This is only momentary during the discharge of the condenser C of the trigger 155 and is relatively abrupt. Thus, the point a of the trigger 155 abruptly rises in potential and immediately falls again to form a trigger pulse on the bus 212. In this way each pulse passed by the low amplitude discriminator 152 is effective to produce a trigger pulse on the bus 212. This discussion may also be applied to the one-shot multivibrator 160 and its associated trigger 161.

With reference to Fig. 20, it can be seen that the one-shot multivibrator 154 is operated a short time after the beginning of each control pulse. This is because the pulse being received must rise to at least a particular value before it can be passed by the amplitude discriminator 152 to effect the operation of the one-shot multivibrator 154, as described above in connection with the response of the one-shot multivibrator 160 to the high amplitude station counting pulses. The multivibrator 154 is thus adjusted to have a time measuring factor equal to the remaining portion of the pulse period, so that it will be restored to normal at the end of the pulse period and cause a trigger pulse to be put out by the trigger 155 as shown in Fig. 20 to effect the operation of the control counting chain to take the next step in readiness for the subsequent pulse. It is because of this operation that it may be said that each pulse is detected on its leading edge and a predetermined time thereafter the next step is taken. For this reason, it is not necessary to detect the termination of a pulse, but rather detect its arrival at a predetermined amplitude.

*Control stepping operation.*—Referring to Fig. 10B, it will be seen that the "control counting chain" includes step Nos. 1 through 5 together with a "pre-check step" and a "normal check step." This electronic counting chain is organized in a similar manner to that described for the station counting chain of Fig. 10B, insofar as connection of the tubes A and B for each step is concerned. This control counting chain includes a step for each control pulse to be received together with an extra pre-check step for purposes later to be explained and a normal check step which is the step upon which the control counting chain remains during the interval between successive operations. This control counting chain operates the same as the station counting chain so that the first trigger pulse applied to the bus 212 acts to condition the tube B of the normal check step and effect an output for conditioning the tube B of the step No. 1 in readiness for the reception of the first control pulse. In view of the similarity of this control counting chain to the other counting chains, it is believed to be unnecessary to point out how these trigger pulses will cause the step-by-step operation of the several electronic devices.

However, it is desirable to note that the first trigger pulse on the bus 212 is applied upon the conditioning of the particular step identifying its station, as for example, in the present illustration the step No. 1 of the station counting chain. More specifically, the conditioning of the tube B of step No. 1 of the station counting chain in response to a station counting pulse causes the potential at point *a* of that step to rise and place a positive pulse through jumper 175 on the condenser 307 which passes through the rectifier 308 and places a positive pulse on the grid of the tube B of the normal check step 167 of the control counting chain. This conditions tube B and causes tube A to be non-conductive which in turn causes an output to the step No. 1 of the control counting chain conducting its tube B to mark the first step period in readiness for the reception of the first control pulse.

In this connection, it may be desirable to explain the relationship between the pulses so that it will be apparent why the station counting pulse for this station does not also place a trigger pulse upon the bus 212. The arrival of the station counting pulse for this station operates the multivibrator 160 but no output is supplied to the trigger 161 until subsequent to the cessation of the pulse so that the trigger pulse for station counting actually occurs after the carrier pulse has ceased. Thus, although the operation of the step No. 2 is almost simultaneous with the occurrence of the trigger pulse on bus 207 and acts to gate the multivibrators 154 and 156, such action is subsequent to the station counting carrier pulse so that it cannot be effective to operate multivibrator 154 and cause a trigger pulse from the trigger 155 to be placed on the bus 212. For this reason, the identification of the station by the energization of the bus 211 is made effective through the simple trigger action of the condenser 307 and associated rectifier 309 to apply a single pulse to the bus 212 for operation of the control counting chain from the normal check step 167 to the step No. 1 in readiness for the reception of the first control pulse.

The manner in which the reception of controls is effected with the station equipment thus conditioned will be presently explained, but it is desired to point out that when the next station counting pulse occurs the step No. 2 for the station counting chain is conditioned following the restoration to normal of the step No. 1. This causes the tube A of the step No. 1 to again be conductive and its associated point *a* drops in potential which in effect produces a negative pulse on the bus 211 by reason of the charged condition of the condenser 307, but this is drained off to ground by reason of the rectifier unit 309. For this reason, the bus 212 receives only the single positive pulse as a result of the identification of the station by the station counting chain. This protection for the control counting chain is essential because the bus 212 is connected to the control grids of the tubes A for the various steps of this control counting chain; and if a substantial negative pulse were applied to the bus 212 it might erroneously cause the operation of one or more of the steps.

This initial operation of the control counting chain is shown in the sequence chart for field station No. 1 of Fig. 20. In this chart, it can readily be seen that the one-shot multivibrator 160 terminates its timing operation at the end of the 13th pulse period which in turn causes the trigger 161 to produce a pulse that is effective to cause the operation of the station counting chain. Thus, a dotted line is shown from the trigger pulse caused by trigger 161 to the shift in the station step of the station counting and thence to a trigger pulse on the line of the trigger 155 but slightly off-set to indicate that there is an effective trigger at this time which is not produced by the trigger 155. The control counting chain is indicated as taking a step at the instant of this off-set trigger pulse located immediately above its indicated step shift. From this description, the manner in which the control counting chain is initiated into operation will be apparent. The successive steps of the control counting chain occur as trigger pulses are placed upon the bus 212 in response to the reception of control pulses. This latter operation will be described in detail presently in connection with the description of the reception of controls. It is merely desired to point out here, that the chart of Fig. 20 shows the trigger 155 as causing six trigger pulses in addition to the off-set trigger pulse from the identifying station step making seven trigger pulses on the bus 212. Thus, it will be apparent that the seven steps of the control counting chain (including five control receiving steps and the two check steps 166 and 167) are provided with the seven pulses required to operate them through a complete series or cycle of operation to bring the counting chain back to its normal condition.

*Reception of controls.*—The first control pulse is received and conditions only the multivibrator 154 if such pulse is of the low amplitude, but conditions both the multivibrators 154 and 156 if the pulse is of the medium amplitude. Let us assume the control pulse to be of the medium amplitude. The medium amplitude discriminator 153 is so set as to provide an output that causes the conditioning of the multivibrator 156, providing gating energy is applied to the bus 211, only if the control pulse then being received is of an amplitude substantially higher than the maximum amplitude of low control pulse. For this reason, the multivibrator 156 is conditioned just prior to the control pulse reaching its maximum value, as illustrated in Fig. 20 of the drawings. This multivibrator 156 is then provided with such timing characteristics by reason of the value of its condenser and resistors that it is restored to its normal condition with tube A conducting and tube B non-conducting just prior to the termination of the pulse period upon which it has been conditioned. While the multivibrator 156 is in an operated condition with its tube B conducting, its associated point *a* is at a high potential which places a positive pulse on the bus 213 to complete gating potential required to operate the control receiver CR1 since the step No. 1 of the control counting chain is conditioned at this time, and supplies a partial gating potential from its point *a* which is at a high potential.

With both gating potentials applied to the control grid of this tube B1 of the control receiver CR1, the negative bias is overcome and the tube B1 becomes conductive. This lowers the potential at the point b1 of the control receiver CR1 allowing its condenser C to discharge through the rectifier 310 and the tube B1 without affecting the condition of the associated tube B2. This occurs during the operating time of the one-shot multivibrator 156, but upon the restoration of this one-shot multivibrator 156 to its normal condition the potential at the point b1 of the control receiver CR1 rises and causes the charging of its condenser C through the rectifier unit 311 to apply a positive pulse upon the control grid of the tube B2. Such positive pulse has a duration in accordance with the R-C constants of the circuit, which are made sufficiently great to cause the tube B2 to conduct for a substantial period of time sufficient to effect the energization and operation of the relay WZ by reason of the current flowing from (+)PS through the tube B2 and the lower winding of relay WZ through the front contact 171 of relay CHR², to ground.

This energization of the relay WZ may occur during the time that the step No. 1 of the control counting chain is conditioned and may continue for some time following that step period, but this is immaterial so long as such prolonged time of energization of this control of the relay WZ does not overlap with the corresponding pulse period of the next succeeding cycle of operation. It must be realized in this connection that the relay WZ is a relay having a substantial magnetic circuit and would not ordinarily respond to a short pulse of energy occurring only during a step or pulse period.

Upon the effective discharge of the condenser C of the control receiver CR1, the tube B2 is of course restored to its normal non-conducting condition because of its normal bias.

It should be readily apparent that, if this first control pulse for this first step were not of the medium amplitude but rather of the low amplitude, the control receiver CR1 would not be double-gated, and the relay WZ would not have its lower winding energized to effect its operation.

However, this first control pulse, regardless of whether it is of a low or medium amplitude, effects the double-gating of the one-shot multivibrator 154 which is conditioned near the beginning of this control pulse and has such a time constant as to be restored to normal at the termination of the step or pulse period. In this connection, it will be observed that this one-shot multivibrator 154 must be active for every control pulse intended for this field station in order to effect the stepping operation of the control counting chain. Thus, the amplitude discriminator 152 can be set to provide an adequate output to effect the conditioning of the multivibrator 154 near the beginning of any control pulse, because it does not have to wait to distinguish as to the actual amplitude of the pulse.

More specifically, the first control pulse, regardless of whether it is of a low or medium amplitude, causes the amplitude discriminator 152 to give an output which completes the gating of the multivibrator 154 which is already partially gated over bus 211. Upon the conditioning of the tube B of the one-shot multivibrator 154, its point a rises in potential because the tube A ceases conduction, and the condenser C of trigger 155 is charged from (+)PS, through the plate resistor of tube A of multivibrator 154 and the grid of trigger 155 until the potential of its charge corresponds with the potential drop across its resistor 306. Upon the completion of the step period as marked off by the restoration of multivibrator 154 to its normal condition, the condenser C of trigger 155 is discharged through the resistor 306 of the trigger 155, which causes the control grid to tube A of trigger 155 to momentarily go negative to a point beyond cut-off. Thus, the point a of this trigger 155 sharply rises in potential to create a sharp trigger pulse to effect the restoration of the step No. 1 of the control counting chain to its normal condition and condition the step No. 2 in a similar manner as previously explained in connection with the other counting chains in the system. This removes the partial gating potential for the control receiver CR1 as supplied to it from the step No. 1 of the control counting chain.

Assuming that the first control pulse is of the medium amplitude, as shown for example in the typical cycle of Fig. 14, then the second control pulse will be of the low amplitude. On the other hand, if the first control pulse is of the low amplitude, then the second control pulse will be of the medium amplitude and would effect operation of the control receiver CR2 in the same way as described for CR1. This would effect the energization of the upper winding of the relay WZ and cause the actuation of its contacts to their opposite positions, since this relay is of the polar magnetic stick type. In brief, the control lever SML in the control office (shown in Figs. 2B and 8A) acts to determine in accordance with its right or left-hand position which of the first two control pulses shall be of the medium amplitude, and thus determines the selective energization of the upper or lower winding of the relay WZ at the corresponding field station. The energization of its upper winding is assumed to actuate its contacts to upper positions and the energization of its lower winding to actuate its contacts to lower positions. This is because this relay WZ is of the polarized magnetic type in which the contacts remain in their last actuated positions because of permanent magnets associated therewith, which also act to polarize the armature so that the relay will respond to the different polarities or directions of energization.

The second control pulse likewise acts upon the one-shot multivibrator 154 and trigger 155 to effect the second step of the control counting chain. More specifically, the application of the trigger pulse on the bus 212 in response to the first control pulse occurring during the 14th step period acts to swing the control grid of the tube A of step No. 1 positive to render that tube conductive. This lowers the potential at the associated point a and allows the tube B for that step No. 1 to become non-conductive by reason of its negative biasing potential. This causes a raising of the potential at the point B of this step No. 1 which acts to pass a positive pulse to the control grid of tube B of step No. 2 to render it conductive and its associated tube A non-conductive. The raising of the potential at the point a of the step No. 2 provides a partial gating potential for the control receiver CR2, in a manner previously described for the control receiver CR1. In this same manner, the reception of the successive control pulses is effective to cause the counting of such pulses and the operation of the respective control receivers in accordance with the amplitudes of such pulses.

From the above description, it will be observed that the trigger pulse on bus 212, which effects the conditioning of the tube B of the normal check step 167 of the control counting chain, is caused by the triggering condenser 307 and rectifier 308. This trigger pulse occurs upon the conditioning of the particular step in the station counting chain identifying this station, so that the step No. 1 is conditioned for the first control pulse. Referring to Fig. 20 it will be noted that the control counting chain then has its step No. 2 marked by a trigger pulse occurring at the end of the first control pulse; its step No. 3 marked by a trigger pulse occurring at the end of the second control pulse, and so on for each control pulse until the trigger occurring at the end of the fifth control pulse acts through the step No. 5 of the control counting chain to condition the pre-check step 166 of such counting chain. But, since the next station counting pulse occurs before the next step is taken by the station counting chain which removes gating energy from the multivibrators 154 and 156, the next station counting pulse is received by the one-shot multivibrator 154 and causes a trigger pulse to be placed on the bus 212. This pulse acts to restore the pre-check step 166 which in turn acts to restore the normal check step 167 to its normal condition. In effect, the reception of the next succeeding station counting pulse acts to close the gate for the reception of control pulses at this station No. 1 and to restore the control counting chain to its normal condition.

*Control check.*—From the above description, it will be observed that the normal check step 162 of the station counting chain is caused to have its tube B conditioned at the beginning of a cycle of operation; and this normal check step 162 is not restored to normal with its tube A conducting until the end of the cycle of operation. Also, the normal check step 167 of the control counting chain has its tube B conditioned at the beginning of the counting of the controls for this station; and it is not restored to its normal condition with the tube A conducting until the next station counting pulse is received following the reception of the control pulses for this station (see Fig. 20). However, it is obvious that these counting chains for each station must be in their normal conditions at the beginning of each cycle of operation in order to assure the proper reception of the controls for that new cycle of operation. In order to provide a check upon this proper synchronization, a control check 168 is provided with a normally conducting triode tube A. This tube is biased beyond cut-off by having its grid connected to (—)BIAS through a suitable resistor. But the point b of the normal check step 162 of the station counting chain and the point b of the normal check step 167 of the control counting chain both normally stand at a relatively high potential which is applied through double-gating to the control grid of the tube A of the control check 168 to cause it to be conductive. This allows energy to flow from (+)PS through the tube A of the control check 168 and the winding of the slow release relay CHR$^2$ to ground. Thus, the relay CHR$^2$ is normally energized but is deenergized at the beginning of each cycle of operation as soon as the normal check step 162 of the station counting chain is first operated because at such time its point b is reduced in potential because its tube B becomes conductive. This removes partial gating potential from the control grid of the control check 168 so that it becomes non-conductive. The remaining gating potential is removed from the control grid of the control check 168 when the normal check step 167 of the control counting chain is operated, i. e. when its tube B becomes conductive and the potential at its point b falls to a relatively low value. This condition exists from the end of the station pulse identifying its station until the end of the station pulse identifying the next station. This can be seen in the chart of Fig. 20 where the control counting chain is operated away from its normal check step throughout the time allotted to the station No. 1 for receiving controls and includes the step periods 14 through 24.

From this it will be apparent that, upon the completion of the cycle of operation, the normal check step 167 of the control counting chain will ordinarily be properly conditioned with its tube A conducting and the normal check step 162 of the station counting chain will likewise be restored to its normal condition. This means that the relay CHR$^2$ is energized during the period between successive cycles of operation and also during the first 13,000 microseconds of the operating cycle. This is because the normal check step 162 of the station counting chain is not operated from its normal condition until the end of the first station counting pulse and is restored to its normal condition at the end of the cycle closing pulse. While the control check 168 is double-gated, it energizes the relay CHR$^2$ to a sufficient degree that it will remain picked up during a cycle of operation although deenergized. This is because it is a slow release slow pick up relay. However, if for some reason the control counting chain or the station counting chain or both do not restore to normal at the end of a cycle of operation, then the relay CHR$^2$ releases and removes the (—)BIAS energy from the grids of the tubes A of the different steps of the counting chains so that all of the steps are restored to their normal conditions, because when there is no bias on these tubes, they become conductive which automatically conditions the B tubes of the associated steps to become non-conductive in accordance with their negative bias. As soon as the restoration of the counting chains occur and the normal check steps 162 and 167 of the two chains are restored to normal, the control check 168 is again rendered conductive and the relay CHR$^2$ is again energized. This restores the station to a condition for the reception of a subsequent cycle of operation. This resetting or resynchronizing at a field station may require a time equivalent to one or more cycles of operation of the system, and in such an event the intervening cycles are not received because the bias is removed from the steps of the counting chains and they cannot operate. In this way, the system of the present invention is constructed to automatically reset itself upon the occurrence of a failure in the stepping operation at a field station.

The type of failures against which this organization checks includes any failure which might interrupt the step-by-step operation of the counting chains. For example, some trigger pulse might fail to be properly formed and thus be omitted from the series in such a way as to cause an under-step of one of the counting chains. Obviously such a condition would result in the failure of the normal check stop for that chain to be restored which would in turn drop the relay CHR$^2$. Likewise, if some transient condition should cause an extra trigger pulse which in turn would cause the stepping chain to operate beyond its normal check step, the check relay CHR² would not be properly energized at the end of a cycle of operation and hence would drop away. In both cases the dropping of the check relay CHR² effects resynchronization as above explained.

*Transmission of indications.*—As previously mentioned, when a station is identified for the reception of controls, it is also rendered effective for the transmission of indications. Each field station includes its own source of carrier frequency for indications and also its own source for the pulse frequency. Since only one station is transmitting at a time, it is obvious that these sources individual to the different stations do not have to be synchronized with each other and need only be operable for the selected frequencies within the usual practical limits usually encountered in different oscillators set to operate on the same frequency.

Each field station has its own indication counting chain which is placed in readiness for operation to transmit indication pulses upon the reception of the station counting pulse identifying that station. Once this indication counting chain is set into operation it continues in operation until it has restored to its normal condition although control pulses may cease to be received before the transmission of the indications is completed. However, the transmission of the indications must be completed during the time allotted to them and before the next station is identified so as to avoid the transmission of indications from two field stations at the same time.

More specifically with reference to the typical field station of Figs. 10A, 10B, 10C and 10D, it was pointed out in connection with the reception of controls that the trigger pulse from the trigger 161 acting over bus 207 causes the station counting chain to be responsive to shift from its normal check step 162 to the first step No. 1 conditioning that station for the reception of controls. Regardless of whether it is the first station as shown, or some subsequent station, the particular station counting step which identifies a particular station is taken exactly at the end of the station counting pulse for that station. This is illustrated in Fig. 20 where the station counting chain is shown as shifting from the normal check step 162 to the first station step No. 1 at the end of the 13th step period. This chart of Fig. 20 could be continued station by station until the end of the cycle, but this is believed to be unnecessary in view of the fact that all subsequent stations operate in exactly the same way as station No. 1 but merely upon a different step of the station counting chain.

Upon the particular station count identifying a station, the control counting chain receives a trigger pulse through the condenser 307 and rectifier 308 over the bus 212 causing the normal check step 167 to be operated conditioning the step No. 1 of the control counting chain. This conditioning of the step No. 1 renders the station available for the reception of controls, and the operation of the normal check step 167 causes the indication counting chain to be initiated. In other words, the point *a* of the normal check step 167 is at a relatively low potential when its tube A is conductive, but this point *a* rises to a relatively high potential when tube A becomes non-conductive, which potential is applied over wire 174, to condenser 261. This causes a relatively long pulse to be applied through rectifier 262 to one gate of the normal check step 172 of the indication counting chain (see Fig. 10D).

This relatively long pulse is of slightly longer duration than the time between two trigger pulses placed on bus 263 by trigger 182. For this reason, it is effective to provide partial gating potential for the tube B of the normal check step 172 of the indication counting chain until after the application of the next trigger pulse on the bus 263 which applies a potential to the other gate of the normal check step 172. Thus, its tube B is rendered conductive. This reduces the potential at its point *b* so that the tube A ceases conduction raising the potential at point *a* which conditions the tube B of step No. 1 of the indication counting chain in a manner analogous to the operation of other counting stations.

As above described, each field station has its own pulse frequency oscillator 180 which acts through the amplifiers 181 to act on the trigger 182 exactly as described in connection with the oscillator section of Fig. 4 in the control office. The over-amplifier of the amplifiers 181 acts on the trigger 182, which applies its trigger pulses directly to the bus 263 without the cathode follower shown in the control office in Fig. 4. This is possible at the field station since the number of electronic stepping devices connected to the bus 263 is considerably less than the number provided in the control office to be governed by trigger pulses produced by the trigger 115. Also, the phase shifter 183 and amplifier 184 provide the frequency in the proper phase relationship to the mixer 185 which is amplitude modulated by the amplitude modulator 186. These devices 185 and 186 act through the pulse inverter 187, modulator 188, and power amplifier 189 to transmit modulated carrier pulses exactly as described for the control transmitter in the control office and more particularly poined out in connection with Fig. 5. For these reasons it is believed unnecessary to describe their operation in detail. It is sufficient for the purposes of understanding the transmission of indications to know that the operation of the indication counting chain renders the amplitude modulator effective on each step in accordance with the indication to be transmitted. When the indication counting chain ceases its operation then there are no further indication pulses transmitted.

More specifically, on step No. 1 of the indication counting chain, its tube B is connected to the bus 264 through a rectifier 266 so as to render the amplitude modulator 186 effective to transmit a low amplitude carrier pulse for that step. With reference to Fig. 10D, it can be seen that each of the indication counting steps are connected to this bus 264 through similar rectifier units. This is so that at least a carrier pulse of the low amplitude will be transmitted for each step.

If on a particular step, the tube B for that step is connected to the bus 265, then a carrier pulse of the medium amplitude is caused to be transmitted. For example, with the track switch in the normal position, the relay N is picked up and the relay R is deenergized (see Figs. 10D and 12). This completes a circuit from the cathode of the tube B for step No. 1 through front contact 267 of relay N, back contact 268 of relay R to the bus 265 so that both of these buses 264 and 265 receive energy from the tube B for step No. 1 for acting upon the amplitude modulator 186 to cause the transmission of a pulse of the medium amplitude. This is illustrated in the chart of Fig. 14 for the station No. 1.

The successive trigger pulses from the trigger 182 are illustrated in Fig. 20 as occurring sequentially and determining the stepping operation of the indication counting chain. In this chart, these trigger pulses are shown as not being in synchronism with the control pulses received over the line. This may or may not be true, since the time phase of the pulses transmitted from the field station are independent from the pulses from the central office. The particular point in this connection is that the initial reception of a station counting pulse and the identification of the particular station renders the next trigger pulse occurring on the bus 263 effective to step the indication counting chain from its normal condition rendering the step No. 1 active. Then the next trigger pulse on the bus 263 acts to restore the normal condition of step No. 1 by rendering its tube A conductive and its tube B non-conductive which in turn conditions the step No. 2. It can thus be understood that the step No. 1 is active for a complete step period from one trigger pulse to the next for transmitting an indication as above described. When step No. 2 is rendered active, it is capable of transmitting a pulse of the low amplitude unless the track switch TS (see Fig. 12) is in an unlocked position with both the relays N and R deenergized, in which case the back contacts 312 and 313 are closed also connecting the output of step No. 2 to the bus 265. As shown in the drawings, the track switch TS is in the normal position so that a carrier pulse of the medium amplitude is transmitted on the first step as indicated in Figs. 14 and 20, but if the switch is in an unlocked position and a carrier pulse of the medium amplitude is transmitted on the second step, the carrier pulse for the first step will have been of the low amplitude. The same is true when the track switch is in a reverse position and transmits a carrier pulse of the medium amplitude on the third step.

Successive trigger pulses on the bus 263 cause the successive operation of the respective steps of the indication counting chain. Since this operation is exactly the same as described for the other counting chains, it is believed unnecessary to again describe the detail operations and the selective transmission on the several steps.

When the last step of the indication counting chain is taken, it acts to condition the tube A for the normal check step 172 which in turn renders the tube B non-conductive for reasons previously explained in connection with other steps, i. e. the potential at the point b drops to a relatively low value. The reason that this can take place regardless of successively continuing pulses on the bus 263 is because only a singe broad gating pulse is applied over the wire 262 to the control grid of the tube B of the normal check step 172. This is because the condenser and rectifier combination allows only a positive pulse to pass and the condenser 261 has sufficient capacity to produce a broad pulse that will effectively span slightly more than the time between two trigger pulses occurring on bus 263. Thus, when the conditioning pulse from the step No. 7 is applied to the tube A of the normal check step 172, there is no gating potential supplied from the normal check step 167 and trigger pulses then occurring on bus 263 cannot be effective to condition the tube B of the normal check step 172.

It is noted that the connection between the step No. 7 and the normal check step 172 of the indication counting chain includes in addition to the usual condenser C (as does step 162 of the station counting chain of Fig. 10B), two rectifiers 314 and 315. The rectifier 314 allows a positive pulse to be applied to the control grid of the tube A of the normal check step 172 but blocks the application of a negative pulse, while the rectifier unit 315 provides means for draining off a negative pulse to ground. These rectifier units 314 and 315 are provided to prevent the possibility of the erroneous operation of the indication counting chain from accidentally placing a negative pulse on the tube A of the normal check step 172 when there is no identification of that station with partial gating energy being supplied from the control counting chain.

Under the proper operation of the indication counting chain, the step No. 7 has its tube B conditioned at a time when the tube A of the normal check step 172 is non-conductive, so that any negative pulse supplied to the tube A of the normal check step 172 cannot change its condition. This is the same relationship that exists between each of the steps of a counting chain, such for example as the station counting chain of Fig. 10B. Referring for a moment to the station counting chain of Fig. 10B, it will be observed that when the tube B of the step No. 1 is conditioned, the associated point b falls in potential which would tend to place a negative pulse on the tube B of step No. 2. This tube B of step No. 2 is already non-conducting under such conditions and such negative pulse cannot affect it. However, referring to the indication counting chain of Fig. 10D, and assuming that for some reason a failure occurs with the normal check step 172 in its normal condition so that the step No. 7 becomes conditioned and applies a negative pulse at that time to the tube A of the normal check step 172, it would initiate the normal check step 172 into an operative condition for causing a following undesired stepping cycle of the indication counting chain. Since any transmission of indication carrier pulses from this station at a time when such station is not properly identified would interfere with the proper transmission of indications from another field station, such erroneous operation of the indication counting chain would be highly undesirable. For this reason, the rectifiers 314 and 315 are provided to further assure that even under certain abnormal conditions, the indication counting chain will not be initiated into a subsequent cycle of operation until the corresponding field station is again identified for the reception of controls and the transmission of its indications.

*Indication check.*—As above described, the normal check step 172 is operated, i. e. tube B conductive and tube A non-conductive, throughout the time that the indication counting chain is operating step-by-step to transmit indications. During this time, the point b of the normal check step 172 is at a relatively low potential which reduces the positive potential on the control grid of tube A of the indication check 173 so that its grid is caused to swing negative well beyond cut-off to stop current flow in its plate-cathode circuit including the relay $CHR^3$. This relay $CHR^3$ is a slow-release slow-pick up relay which is normally energized because the positive potential applied to the control grid of the tube A is present continuously except during the transmission of indications as just pointed out. This relay CHR³ is sufficiently slow-releasing so as to remain picked up during the period that it is deenergized while indications are being transmitted. This maintains the front contact 270 closed so that the indication counting chain operates in a proper manner. However, if for some reason the indication counting chain should stall in its operation, then the normal check step 172 is not restored within the proper and usual period of time so that the relay CHR³ drops away. This immediately disconnects the negative bias from each tube A of each step of the indication counting chain by the opening of front contact 270, which causes them to become conductive and their associated tubes B non-conductive. As soon as this condition is established, more particularly for the normal check step 172, a relatively high positive potential from its point b is applied to the indication check 173 and restores its normal conductive condition. This reenergizes the relay CHR³ and restores the negative bias to the various tubes A of the counting chain so that it is in readiness for another cycle of operation.

*Reception of indications.*—As previously pointed out in connection with Fig. 14, the period of time marked off in the control office between successive station counting pulses is allotted to the reception of indications as well as the transmission of controls. Since the time of propagation of pulses along the line circuit is a factor in a system of this character, a suitable time margin is provided between the last indication pulse transmitted and the next station counting pulse to be transmitted so that there will be penty of time for the indication pulses to be received from distant field stations before the next station counting pulse occurs. In this connection it might be noted that the indication counting chain in the control office is operated step-by-step in response to the received indication pulses and independent from the control stepping operation at the control office for the particular field station then identified. This organization provides that there is no need for synchronizing the frequencies at the control office with the different pulse frequencies at the field stations.

More specifically, in Fig. 2A, a block diagram illustrates the indication receiving apparatus which has been previously discussed in general, and which has been shown in greater detail in Fig. 9 of the drawings. The indication pulses arrive over the line circuit and are passed by the band-pass filter 102 to the amplifier and detector 133 which includes the usual push-pull type of amplifier and a full wave balanced plate detector. The push-full amplifier includes tubes 272 and 273. This amplifier also includes a common cathode resistor 274 which has the characteristic of maintaining a balanced output for the amplifier due to its degenerative characteristics. The push-pull output is applied to the plate detector including tubes 275 and 276. This plate detector also has a common cathode resistor 277 and a plate resistor 278. The cathode resistor 277 tends to keep the output balanced, which output is taken from the plate resistor 278 and passed through a filter circuit for eliminating any carrier frequency and then to the bus 279 which feeds both the low amplitude discriminator 134 and the medium amplitude discriminator 135.

The low amplitude discriminator 134 is connected and operated in exactly the same way as the low amplitude discriminator 152 described in connection with the field station with reference to Fig. 10C. The output of this discriminator is supplied to the one-shot multivibrator 136 including tubes A and B. This one-shot multivibrator 136 is of course operated in response to a positive pulse applied to the control grid of its tube B at the beginning of each indication carrier pulse received over the line circuit. This is because the low discriminator 134 provides an output for every impulse whether it is of low or medium amplitude. The one-shot multivibrator 136 in being thus conditioned at the beginning of each pulse is so constructed as to remain conditioned for a time equal to the remainder of that particular pulse period. Since each pulse period is assumed to be 1,000 microseconds long, then if the amplitude discriminator provides an output after 250 microseconds, then the one-shot multivibrator 136 will act to measure 750 microseconds after which it restores to its normal condition and the associated point a drops in potential to its normal value which allows the discharge of the condenser C of trigger 137. This in effect produces a negative pulse on the control grid of the trigger 137 rendering it non-conductive abruptly and momentarily to produce a trigger pulse which is applied to the bus 280. This bus 280 extends to the units for all field stations in the control office which has been illustrated in block form in Figs. 2A, 2B and 2C; but merely indicated in Fig. 9. The action of these trigger pulses will be described presently.

Each indication pulse is also applied to the medium amplitude discriminator 135 over the wire 279. This medium amplitude discriminator 135 is constructed and operates in exactly the same way as the medium amplitude discriminator shown in Fig. 10C and described in connection therewith. The effect is that when an impulse of the medium amplitude is received, this discriminator 135 supplies a positive pulse to the one-shot multivibrator 143 which in turn is connected to the indication receivers IR of each station unit in the control office. This one-shot multivibrator 143 operates in a very similar manner to the one-shot multivibrator described in connection with the reception of controls at the field station in that its time of operation is such that it restores to its normal condition prior to the next pulse period. For example, if the amplitude discriminator 135 is effective to provide an output at approximately 250 microseconds after the beginning of a particular pulse period then being received, then the one-shot multivibrator 143 may be effective for 500 microseconds thereafter and still leave a margin of 250 microseconds before the beginning of the next pulse period. This is desirable so that the one-shot multivibrator 143 will not be in an operated condition upon the taking of the next step by an indication counting chain and thus erroneously operate an indication receiver on a step which was not intended to have been operated. The output of this one-shot multivibrator 143 is supplied over the bus 281 to the indication receivers IR for all of the control office units for the field stations, but it is of course energized only on those pulse periods during which the pulse rises to a medium amplitude.

Referring to Fig. 8A, it will be recalled that the typical control office unit for a field station has its step No. 1 conditioned by the pause counter for that station unit. For the first station, for example, the pause counter 126 (see Figs. 2B and 7) receives its restoration pulse from the bus 147 and at that time conditions the step No. 1 of the control counting chain for station No. 1. This conditioning of the first step of the control counting chain for the station also acts to condition the indication counting chain for the corresponding station unit (see Figs. 8A and 8B). This is effected more particularly because the point a of the step No. 1 for the control counting chain rises in potential and supplies over the wire 282 potential to both the indication gate 141 and the pulse inverter 142. This potential conditions the tube B of the indication gate 141 so that it is conductive. This renders the associated tube A of the indication gate 141 non-conductive so that the potential at its point a rises and acts to apply energy to one gate of the special trigger 138. This special trigger 138 is so named because it is more particularly a trigger pulse repeater when energy is applied to one of its gates from the indication gate 141 and trigger pulses are applied to its other gate over the bus 280 in accordance with the indication pulses then being received from the field station. This will be described in due course, it being sufficient for the present to appreciate that the conditioning of the step No. 1 of the control counting chain prepares for the reception of indication trigger pulses over bus 280.

The conditioning of the step No. 1 of the control counting chain in applying a relative high potential pulse to the inverter 142 over the wire 282 causes its tube B to become conductive allowing the discharge of the condenser C of the trigger 139. This trigger 139 operates in the same way as previously described triggers so that its tube A will become momentarily and abruptly non-conductive. This causes an output trigger pulse from the point a of the trigger 139 over wire 283 to the bus 284 of Fig. 8B. This initial trigger pulse placed on this bus 284 acts to condition the tube B of the normal check step 140 in the same manner as described for other counting chains. In this connection it should be appreciated that the indication counting chain of Fig. 8B is exactly the same as provided for the indication counting chain at the field station, except that its normal check step 140 does not include rectifiers 314 and 315. This conditioning of the tube B of the normal check step 140 causes an output to condition the tube B of the step No. 1 of the indication counting chain. Thus, this step No. 1 is in condition for receiving an indication pulse.

Since the control counting chain for a field station unit in the control office is conditioned in response to a trigger pulse generated by the trigger 115 which determines the step periods in the control office, it will be conditioned and in turn effect the conditioning of the step No. 1 of the associated indication counting chain before the first indication carrier pulse can be received from a field station. This delay in the reception of an indication carrier pulse may be due to a delay in propagation time, or to the lack of synchronism between the pulse frequency at the field station and the pulse frequency at the control office. Regardless of whether either or both of these causes of delay are present, the indication counting chain is in a condition for the reception of indication pulses when the first indication carrier pulse is received. If the first carrier pulse is of the low amplitude, then the indication receiver IR1 for that step is not activated and the indication light NK is not illuminated. On the other hand, if the first indication pulse received from the field station is of the medium amplitude, then the one-shot multi-vibrator 143 puts out a pulse on the bus 281 to activate the indication receiver IR1 to keep the indication light NK illuminated.

Since the indication receiver IR1 has one of its gates energized from the point a of the step No. 1 of the indication counting chain, the presence of a pulse on the bus 281 provides a potential for its second gate and causes its tube B to be conditioned. This indication receiver IR1, as well as the other indication receivers, is in substance a one-shot multivibrator and the rendering active of its tube B causes it to begin measuring a time period which is of any suitable time which will elapse considerably prior to the next cycle of operation so that it will be able to be governed on each cycle of operation in accordance with the distinctive indication condition of its step for that cycle. In the present embodiment when a cycle is assumed to be about one second long, this time of operation of the indication receivers IR might be of one-third or one-half second duration, for example.

Assuming that an indication pulse of the medium amplitude is received, and that the tube B of the indication receiver IR1 becomes conductive and the associated tube A becomes non-conductive, then its point a rises in potential and supplies a positive pulse to the indication storing device ISD1 associated with that step.

The indication storing devices ISD include a gas-filled tube which is normally biased from (—)BIAS so that it is non-conductive. The plate-cathode circuit of this gas-filled tube is connected through a suitable indicator lamp to a bus 285 which is supplied with alternating current through front contact 146 of the relay CHR$^1$. Thus, if the tube of an indication storing device ISD becomes conductive by reason of the application of positive potential to its control grid, the associated indicator lamp such as NK is illuminated by energy from the alternating current supply; but, if the positive potential is removed from the control grid of the gas tube, it becomes non-conductive by reason of the reversal in polarity of the alternating current potential on its plate-cathode circuit.

Each indication storing device such as ISD1 includes rectifier units 286 and 287 together with condensers 288 and 316. The application of a positive potential on condenser 316 from point a of IR1 causes a positive pulse to pass through the rectifier 286 and to the control grid of the associated gas tube of the indication storage device ISD1. This renders the gas tube conductive and at the same time a charge is built up on the condenser 288 which will continue to maintain the gas tube conductive for a substantial period of time after the positive pulse from IR1 has ceased. This time may be of any suitable length found expedient in practice so long as it is longer than a single cycle of operation plus the time between successive cycles so that the application of pulses on successive cycles from the indication receiver IR1 acts to maintain the indication storage device ISD1 continuously active. Thus, when an indication carrier pulse of the medium amplitude is received on successive cycles of operation, a positive pulse is supplied to the indication storage device ISD1 on each cycle which maintains the associated indicator lamp NK steadily illuminated. On the other hand, when an indication carrier pulse of the medium amplitude fails to be received, the associated indication storing device ISD1 shortly becomes non-conductive and remains in that condition until a subsequent cycle when a medium amplitude pulse is received for the corresponding step. The rectifier unit 287 is provided so as to prevent a negative pulse from being applied to the control grid of the gas tube upon the restoration of the indication receiver devices IR1 to a normal condition. Also, it should be noted that the relative size of the condensers 316 and 288 are selected in accordance with the time period over which the indication storage device ISD1 is to be effective in response to any particular pulse and also dependent upon the relative voltages involved. The potential supplied from the point $a$ of the indication receiver IR1 is relatively high as compared to the potential usually supplied to a control grid of a gas tube. For this reason, the condenser 316 may be relatively small compared to the capacity of the condenser 288. It should also be noted that the condenser 316 acts as a blocking condenser in the event that the tube A of the indication receiver IR1 is burned out, i. e. after the initial pulse is applied to the indication storage device ISD1 as a result of the tube burning out and its time period has elapsed, the associated indicator NK becomes unilluminated even though the point $a$ of the associated indication receiver IR remains continuously at a relatively high potential.

The reception of the next indication carrier pulse results in the application of another trigger pulse on bus 280 by the trigger 137 which effects the application of a trigger pulse on the bus 284 of Fig. 8B to cause the next step of the indication counting chain to be taken, which in the present instance is step No. 2. As previously mentioned, the one-shot multivibrator 143, if operated for a step, restores to its normal condition and removes potential from the bus 281 just prior to the taking of the next step of the indication counting chain. This provides that there is no overlap between steps when an indication carrier pulse of the medium amplitude is received. The taking of the second step renders the indication receiver IR2 responsive to control in accordance with whether or not the carrier pulse for that step is of the medium amplitude. If such indication carrier pulse is of the medium amplitude then this fact is stored in the indication storing device ISD2.

In a similar manner each of the remaining steps of the indication counting chain are taken in response to the reception of indication pulses, and on the respective steps the indication receivers and storage devices are rendered subject to selective control. It might be well to note that each of these indication steps is taken in response to the reception of an indication pulse rising to a properly detectable amplitude, but the actual stepping in response thereto is performed only after a time (measured by suitable electronic devices) which coincides with the end of the pulse period, i. e. the boundary between two successive indication carrier pulses. From this standpoint, the operation of the indication receiving apparatus at the control office is very similar to the operation of the control receiving apparatus at the field stations.

The signalling devices shown in Fig. 12 are illustrated in their normal positions which results in the transmission from the station No. 1 a series of indication pulses such as shown in Figs. 14 and 20. Obviously, if these devices were in different positions, the resulting character of the indication pulses would be different, such for example, as illustrated in Fig. 14 with respect to the last station where the indication series of pulses is shown as having its third pulse of the medium amplitude representing the associated track switch as being in its reverse position. In connection with station No. 1 the track switch TS in a normal position results in the normal illumination of the indication lamp NK but the other indication lamps are unilluminated. If the signals were cleared, the relay M (see Fig. 12) would be deenergized resulting in the last indication pulse for that station being made of a medium amplitude which would result in the illumination of the indication lamp SK in the office (see Fig. 8B). In a similar way, each of the devices controls its respective indication lamp by selecting the amplitude of the carrier pulse to be transmitted.

*Control office indication check.*—The indication counting chain operates only during the reception of indication pulses and its normal check step 140 is conditioned as soon as the step No. 1 of the control counting chain is conditioned following the restoration of the associated pause counter 126 for that station. Thus, the indication check 144 has one gate connected to the point $b$ of the normal check step 140 and another gate is connected over wire 289 to the point $b$ of the indication gate 141. While the indication gate 141 and the normal check step 140 are in the normal condition shown, sufficient potential is applied to the two gates of the indication check 144 to cause the associated tube B to be conductive and maintain the relay $CHR^1$ energized. This maintains a negative bias on the tubes A of the steps of the indication counting chain; but, if during the time that indications are being received, a failure occurs in the indication counting chain, the energy is removed from the gates of the indication check 144 for a sufficient period of time to allow the slow-release slow-pickup relay $CHR^1$ to release. This removes the negative bias from the different steps of the indication counting chain so that their tubes A are all rendered conductive restoring the conditions of the counting chain in readiness for a subsequent cycle of operation. In this connection, the indication gate 141 has the negative bias of its tube A governed in accordance with the manual control 132 because this indication gate 141 is conditioned dependent upon the condition of the step No. 1 of the control counting chain. It will also be noted that during any time that the indication counting chain responds improperly so that the relay $CHR^1$ is released, the alternating current is removed from the indicator lamps by the opening of front contact 146 so that if there are any erroneous indications, they will not be displayed.

*Modified pulse modulation control.*—In connection with Fig. 5, one form of circuit organization is shown for providing modulated pulses of carrier frequency varied in accordance with amplitude and so controlled as to be formed in accordance with a sine wave shape. These pulses are formed by combining a sine wave form with an amplitude control in the proper phase relationship to properly govern a power amplifier to render it effective to have an output thus varied only for the time periods that are successively measured off. Another form of accomplishing the same results but in a simplified manner has been shown in Fig. 18.

This form of the invention shown in Fig. 18 provides a power amplifier 106, the same mixer 320, and the same amplitude modulator 120. These devices are so connected in series with the mixer 320 as to be able to eliminate the modulator 107 and inverter 122 of Fig. 5. Referring to Fig. 5, it will be noted that the modulator 107 is rendered variably conductive in accordance with the amplitude of pulse to be transmitted via the inverter 122 as governed by the mixer 121 and amplitude modulator 120. But it will be apparent that since the mixer 121 is rendered selectively conductive and varies in the amplitude of its output in accordance with a sine wave shape, it may be serially connected in the cathode circuit of the power amplifier as shown for mixer 320 in Fig. 18. The various functions of the devices shown in Fig. 18 are exactly the same except that the amplitude modulator 120 directly controls the rendering effective of the power amplifier 106 for the different pulse periods while the selective insertion of the resistances R1, R2 and R3 determines the amplitude in accordance with its effect on the mixer 320 the same as described in connection with Fig. 5. These resistors R1, R2 and R3 also provide a balancing effect on the amplifier 106. The sine wave shape of the pulses is determined in exactly the same way by applying the alternating current signal output of the amplifier 113 to the grid of the mixer 320.

Since the functional operation of the arrangement shown in Fig. 18 is so similar to that described in connection with Fig. 5, it is believed that further discussion will be unnecessary.

*Modified cycle start.*—Referring to Fig. 6, it is noted that the one-shot multivibrator 129 measures off a period of time which may terminate at variable points with respect to the trigger pulses appearing on the bus 123 and that for this reason the trigger 130 of Fig. 6 is provided to give relatively broad trigger pulses so as to effect a synchronizing action in the control of the step No. 0 of the initial counting chain. More specifically, the broad trigger pulse from the trigger 130 is capable of dominating the short trigger pulse applied to the step No. 0 from the bus 123.

A modified form of organization may be provided to accomplish this synchronization in a slightly different manner. This is done by omitting the trigger 130, and providing a connection from the bus 123 through a suitable resistor to the control grid of the tube A of the multivibrator 129 removing the condenser C². The output of the multivibrator 129 is then connected from the point *a* of the multivibrator through a resistor and condenser in series to the control grid of the tube B of the step No. 0.

When the multivibrator 129 has been conditioned so that its tube B is conducting and its tube A is non-conducting, the control grid of the tube A is gradually returning towards a positive value rising in potential at an exponential rate. This time which is elapsing for the restoration of the positive value on this control grid of the multivibrator 129 is of a substantial duration insofar as the occurrence of trigger pulses on the bus 123 is concerned, i. e. a plurality of trigger pulses will occur during this time. Thus, at some point in the gradual rise in potential of the control grid of the tube A of the multivibrator 129, there will be a value at which the occurrence of a trigger pulse will abruptly cause the control grid to be placed sufficiently above its negative cut-off value as to render the tube A conductive and the tube B non-conductive. At such time there will be an output of the one-shot multivibrator 129 by reason of the rise in potential at its point *b* which will be applied to the step No. 0 and condition it. This operation occurs exactly on a point in the cycle marked by a trigger pulse on the bus 123. This step No. 0 of the initial counting chain is then in readiness for the next succeeding trigger pulse on bus 123 to start the step-by-step operation of the initial counting chain.

Although this modified form of control is believed to be entirely operative and is described as an alternative structure, it is to be understood that the form shown in connection with Fig. 6 is considered as the preferred form since its operation is very positive acting.

*Decade station counting.*—As previously described in the main form of the present embodiment, it has been assumed for the purposes of the present disclosure that a large number of station counting devices are employed in series to count off the different station pulses, with the present embodiment of the invention being considered adaptable for as high as ninety stations to be operated within the brief interval of approximately one second. Obviously, this would necessitate such a large number of steps at each of the stations, that it would be desirable to provide some form of station counting means to more economically effect the counting operation.

As was pointed out above in connection with the main form, the cycle closing pulse is required in order to restore the station counting chains at the various field stations to their normal conditions. This final cycle closing pulse is effective to restore the normal check step of the station counting chain and in so doing provides a time period in which the time delay device at each field station runs out in its operation because the final check step does not act through the step differentiator to again initiate the time delay device. In this way, it is possible to positively require two sync pulses at the beginning of a cycle of operation in order to initiate it for the purpose of receiving station counting pulses and control pulses.

This same problem is involved in the provision of a decade station counting organization; and, for similar reasons which can be better discussed later after a consideration of the structure of the decade counter, the decade counting organization must employ a number of station counting pulses including the cycle closing pulse corresponding to the actual number of counts which the decade counter is adapted to count.

For example, referring to Fig. 19, the decade counter of this organization is shown as having a "units station counting chain" and a "decade counting chain." The units counting chain includes ten steps correspondingly designated. Although this units counting chain might be a different number, such number must also be even because of the control required for the step differentiator 163. The decade counting chain includes nine steps which have been given designations corresponding to the number of steps which they represent, and which are counted off by the units counting chain. Obviously, an organization with this number of steps in the units and the tens digits, ninety counts may be made. But, since these ninety counts must include the cycle closing pulse (see Fig. 14), then the organization may be employed for only eighty-nine actual field stations. For this reason, the typical cycle illustrated by Fig. 14 is modified only to the extent of having eleven less pulse periods than shown.

The stepping devices of Fig. 19 are exactly the same as the stepping devices shown in connection with the typical field station of Figs. 10A, 10B, 10C and 10D, and for this reason have not been shown in detail. The final step No. 10 of the units counting chain is the same as the normal check step of the station counting chain of Fig. 10B, but has not been so named because it performs the same counting function as do the other steps in this form of the invention. The same applies to the steps Nos. 1-9 of the decade station counting chain.

It should be noted that the output wire 299 of the step No. 10 of the unit station counting chain is connected to the point b of that step so that a positive pulse is transmitted through the condenser 291 and rectifier 292 only when the tube A of that step No. 10 becomes conductive. The rectifier unit 293 is provided so as to prevent a negative pulse from being applied to the decade counting chain when the point b of step No. 10 drops in potential. In this way, the decade counting chain remains on steps Nos. 1-9 during the first operation through the units station counting chain. Then when the step No. 9 of the units station counting chain is restored to its normal condition in response to a trigger pulse on the bus 207, the step No. 10 is restored to its normal condition and in turn over the wire 299 provides a pulse for conditioning the steps Nos. 1-9 so that its tube B is conductive which in turn conditions the steps Nos. 10-19. By following through the complete succession of steps, it will be evident that the 89th step finds the step No. 9 of the units counting chain conditioned with its tube B conductive and the steps Nos. 80-89 conditioned. The 90th trigger pulse, resulting from the station counting pulses, is applied to the bus 207 which restores the step No. 9 to normal and in turn the step No. 10. This causes a pulse to be transmitted over the wire 290 to restore the steps Nos. 80-89 to normal.

With this organization, if the station is No. 34 for example, the connectors 294 and 295 are placed in the positions shown. A station gate 296 is governed in accordance with the position of the jumpers 294 and 295 and consists of a tube B being double-gated to be conductive only when potential is applied to both of the buses 297 and 298. An associated tube A is rendered non-conductive and thus provides an output to the one-shot multivibrator 154 and the one-shot multivibrator 156 conditioning the control counting chain and the control receiver for the reception of control pulses for that station. The first step is taken by the control counting chain by reason of the initial conditioning of the station gate 296 which causes the application of a positive potential to the wire 300 which charges the condenser 301 and causes a positive pulse to pass through rectifier 302 to the bus 212 to cause the initial step of the control counting chain in the same way that the station counting chain of Fig. 10B supplies an initial trigger pulse to the bus 212. The rectifier unit 303 is provided to drain off any negative pulses that may appear on this wire 300.

The station gate 296 has not been shown in detail, but it may be in the nature of a quick-acting, one-shot multivibrator which is held in its operated condition so long as both the gate connections 297 and 298 are supplied with potential. The particular details of this station gate 296 may vary in accordance with the requirements of practice. For example, this might be a single tube with two grids respectively connected to the buses 297 and 298, or any other suitable expedient arranged to provide an output only when both of these buses are supplied with potential at the same time.

The control check 304 is constructed in the same way as the control check 168 of Fig. 10D except in this case it is triple-gated so as to have the relay CHR⁴ energized only when all three stepping chains are in their normal conditions.

The relation of this decade station counting chain to the control counting chain and control receivers is exactly the same as previously described in connection with Figs. 10A, 10B, 10C and 10D.

It is noted that the step differentiator 163 is connected to the step No. 10 of the unit station counting chain the same as the other steps because the unit station counting chain operates a number of times for each cycle of operation and during this cycle of operation every step must be effective to initiate the operation of the associated time delay device 159 of Fig. 10A. However, it should be noted in this connection that the tube A of this step No. 10 is the one that has its cathode connected to the bus wire 165 instead of the tubes B as in the other steps. For this reason, the final cycle closing pulse, previously discussed in connection with Fig. 14 and this modification, is effective to initiate another operation of the time delay device 159. This means that each station will have its station gate opened to a subsequent high amplitude pulse 11,000 microseconds following the final cycle closing pulse. In order to preclude the erroneous operation of a station, and instead have all stations initiated only in respond to the proper transmission of two sync pulses at the beginning of a cycle of operation, it is necessary that the two sync pulses for a subsequent cycle of operation be delayed for a time greater than the 11,000 microseconds following the cycle closing pulse. In other words, the time between successive cycles must be greater than 11,000 microseconds.

*Control coding.*—In the main form of the invention above described, controls are transmitted by selectively determining whether the carrier pulse transmitted for each step is of a low or medium amplitude. This means that a control relay such as the relay WZ of Fig. 10D may be caused to assume one position or the other depending upon whether the pulse for one step or another step is of the medium amplitude, and the relay WZ is caused to remain in the last operated position by reason of its magnetic stick characteristics rather than because of the repeated continuance of the control which actually occurs.

In connection with the transmission and reception of indications, an indicator light such as lamp NK of Fig. 8B is caused to be steadily illuminated or steadily extinguished dependent upon the selective control of the amplitude of a carrier pulse for a particular step. The control of this lamp NK to give a steady indication is dependent upon the repeated reception of medium amplitude carrier pulses for the particular step with the time between the reception of such a pulse on successive cycles bridged by reason of a time delay or storage device. The lamp NK is extinguished when successive carrier pulses for that particular step are of the low amplitude.

In both cases, the actual control effected as a result of any one cycle of operation is dependent upon the selected amplitude for a pulse on any particular step. Although this type of control is sufficiently dependable for the usual communication system, and especially one that is employed in a centralized traffic control system where the application circuits in the field provide the safety characteristics of the complete organization, there may be some circumstances in practice where it is desirable to have the communication of controls fully checked. For example, there may be manual block signals which should be cleared only if it is entirely proper to do so, and in such a case the occurrence of a transient condition on a line circuit causing a single pulse to vary in amplitude might cause an improper control of such signal.

In view of the above, it is proposed in accordance with the present invention to provide means for transmitting checked controls which are protected against transient conditions on the line circuit. Since the system of the present invention is of the type that continuously operates and at such a rapid rate that presence of a distinctive condition may be required on successive cycles of operation in order to effect a control, it is proposed that such a repeated control be made distinctive in a manner which is independent from transient conditions that might arise on the line circuit. In other words, it is proposed to make the distinctive condition repetitional and of such a character that it would not be likely to be reproduced by transient conditions on the line circuit.

In accordance with this form of the present invention, it is proposed that one control condition be characterized by a medium amplitude carrier pulse occuring on two successive steps alternately on alternate cycles of operation, and that another control condition be characterized by the presence of carrier pulses of the low amplitude on both of such steps of each successive cycle. The reception of said one distinctive controlling condition at a field station is then decoded in such a way that the failure of the presence of a medium amplitude pulse on the two steps alternately on alternate cycles results in no control, i. e. a continuance in the condition corresponding to that existing with a low amplitude carrier pulse on each of such steps on successive cycles.

This modified form of the invention has been illustrated diagrammatically in Figs 21A and 21B which shows merely that apparatus which is necessary to be associated with the main form of the invention in connection with the transmission of controls for a particular field station as typical of the transmission of other controls for other stations. The apparatus of Fig. 21A is that which may be used in the control office, while the apparatus of Fig 21B is that which may be used at a field station.

Referring to Fig. 21A, four steps of a typical control counting chain have been indicated in block form, and may be four steps shown in Fig. 8A for transmitting controls. Associated with these steps is a control lever 325 which may be manually operated from its normal central position to its right or left hand positions for operating associated contacts 326, 327, 328 and 329. These contacts are for the purpose of providing selective energization of the bus 202 on each step in a similar manner as described in connection with the lever SML of Fig. 8A, but are arranged to cooperate with additional control as presently to be described. Each step of the control counting chain is associated with the low amplitude bus 201 in the same manner as described in connection with Fig. 8A including the rectifier units in each of these connections as shown.

The end of the cycle apparatus of Fig. 6 has added thereto a cycle counter 330 and a magnetic stick type cycle counting repeater relay CCP which repeats the cycle counter 330 (as shown in Fig. 21A).

The cycle counter 330 is essentially the same as the electronic device of each step of the counting chains and includes two electronic tubes A and B. These tubes are so controlled as to remain in their last controlled condition rather than having a normal condition to which they might return. For convenience in the illustration, it is assumed that the last cycle of operation resulted in rendering the tube A conductive and the tube B non-conductive; but this condition only exists at the end of alternate cycles of operation; whereas the tube B is left conductive and the tube A non-conductive on the opposite alternate cycles.

More specifically, the tubes A and B have their control grids respectively connected through resistors 331 and 332, through front and back points respectively of contact 333 of cycle counting repeating relay CCP, through condenser 334, and resistor 335 to the point $a$ of the one-shot multivibrator 129 of Fig. 6. The tubes A and B also have their control grids connected to the terminal (−)BIAS so that the tube A being conductive lowers the potential at its associated point $a$ and allows the normal negative bias on the tube B to be effective to swing the potential on the control grid of the tube B well beyond cut-off. Under this condition, the potential at the point $b$ of the cycle counter 330 is relatively high causing the negative bias on the control grid of tube A to be counteracted to such a potential on this control grid as to keep the tube A conductive.

With this organization, it is apparent that the potential at the point $a$ of the one-shot multivibrator 129 normally stands at a relatively low value but is caused to rise to a relatively high value once for each cycle of operation during the time between two successive cycles of operation.

With the tubes A and B of the cycle counter 330 being conditioned as shown, current flows from (+)PS through the point $b$, output resistor 336, windings of relay CCP, point $a$, anode-cathode circuit of tube A, to ground. Current flowing in this circuit renders the relay CCP energized in such a direction as to cause its contacts to be in picked-up position, but with the tube B rendered conductive and the tube A non-conductive the current obviously would flow in an opposite direction through this relay and cause its contacts to be actuated to their opposite positions.

With the contact 333 of the relay CCP in its present position, the rising of the potential at the point $a$ of the one-shot multivibrator 129 causes a positive pulse to be applied to the control grid of the tube B of the cycle counter 330. This causes the control grid of this tube to rise sufficiently positive to render it conductive which results in the potential at the point $b$ changing to a relatively low value so that the bias on the tube A predominates and renders that tube non-conductive. This causes the relay CCP to be quickly actuated to its opposite position so that upon the subsequent dropping in the potential at the point $a$ of the one-shot multivibrator 129 any negative pulse occurring will be applied through the resistor 331 to the control grid of the tube A of the cycle counter 330 but this is ineffective since the tube A is already non-conductive.

Since the contact 333 of the relay CCP has shifted, it is evident that the positive pulse caused by the one-shot multivibrator 129 at the end of the next cycle will be routed to the control grid of the tube A of the cycle counter 330 and cause its condition to be again shifted in a manner similar to that just described. In this way, the successive positive pulses put out by the one-shot multivibrator 129 causes the cycle counter 330 to operate the relay CCP to opposite positions for successive cycles of operation.

Thus, during one cycle of operation, if the lever 325 is moved to a right-hand position, the contact 327 connects the output of step No. 2 to the bus 202 through front contact 337 of relay CCP but on the alternate cycle of operation the output of the step No. 1 is connected to the bus 202 through back contact 337 of this relay CCP. In this way, the carrier pulses for steps Nos. 1 and 2 of each cycle are alternately caused to be of the medium amplitude.

It will be obvious that if the lever 325 is moved to its left-hand position the contacts 326 and 327 will remain open and the contacts 328 and 329 will be moved to the left to their closed positions. Thus, the pulses for the steps Nos. 1 and 2 will remain at the low amplitude but the pulses for steps Nos. 3 and 4 will alternately be of the medium and low amplitudes for alternate cycles of operation the same as just described in connection with steps Nos. 1 and 2.

At the field station, the control counting chain of Fig. 10B is connected in exactly the same way as shown therein but the output for each pair of steps is connected to a control receiver which includes tubes A and B connected in a similar manner as the step itself. For example, this has been shown in detail in Fig. 21B as including a control receiver CR1-2 for steps Nos. 1 and 2 and another control receiver CR3-4 for steps Nos. 3 and 4. It is assumed for convenience that the last cycle of operation left the tubes A conductive and the tubes B non-conductive. Associated with each control receiver, such as CR1-2, is a control repeater relay CRP of the magnetic stick type connected to the points a and b of the associated control receiver through a condenser 340. Since the lever 325 is assumed to be in its central position, no pulses of the medium amplitude are being currently received, so that the control receivers CR1-2 and CR3-4 remain in their last operated condition.

If the lever 325 in the control office is actuated so as to close the contacts 326 and 327, then a pulse of the medium amplitude is received on the step No. 1 on one cycle and a pulse of the low amplitude is received on the step No. 2 of the same cycle, while on the next cycle a pulse of the low amplitude is received on step No. 1 and a pulse of the medium amplitude is received on step No. 2. With this arrangement, it is then apparent that the one-shot multivibrator 156 will apply a pulse on the bus 213 on the appropriate step periods to shift the condition of the control receiver CR1-2 on each cycle of operation. More specifically, when a carrier pulse of the medium amplitude is received on the step No. 1, the one-shot multivibrator places a positive potential on the bus 213 which renders the tube B of the control receiver CR1-2 conductive. During that cycle the carrier pulse for the step No. 2 will be of the low amplitude so that the resulting action is that a pulse of energy is applied from the point a of the control receiver CR1-2 through the condenser 340 to the relay CRP to actuate its contacts to lower positions. However, on the next cycle of operation a carrier pulse of the medium amplitude will be received on the step No. 2 which will cause the tube A to be rendered conductive and the tube B non-conductive so that the point b of the control receiver CR1-2 rises in potential while the point a drops in potential thus causing a positive pulse of energy to be applied through the relay CRP and condenser 340 in the opposite direction. For this reason, the contacts 341 and 342 of the relay CRP are operated to alternate positions on alternate cycles of operation.

While the contacts 341 and 342 are in raised positions, (+) is applied to the left-hand side of the condenser 343 while its right-hand side is connected to (—). This places a charge upon this condenser 343 such that when the contacts 341 and 342 are moved to their lower positions it is discharged through the decoding relay DC1-2. In other words, the operation of the contacts 341 and 342 to the opposite positions alternately charges the condenser 343 and then discharges it through relay DC1-2. The condenser 344 is provided to smooth out the discharge of the condenser 343 through the relay windings so that the relay is effectively energized for a substantial period of time rather than just momentarily in order that this relay DC1-2 will remain picked up so long as the relay CRP is operated once for each cycle of operation of the communication system.

When the neutral relay DC1-2 is energized, it closes front contact 345 and energizes a suitable signal, such as lamp L1-2. Obviously, the contacts of this relay, such as contact 345, may be used to control any device desired, but it may be assumed for convenience that the lamp L1-2 is a manual block signal or the like. If it is a manual block signal, then it may represent a green indicator lamp and in such a case an associated red indicator lamp would be controlled through a back contact of this relay DC1-2.

From the above description, it will be apparent that the reception of carrier pulses of medium amplitude on particular steps of alternate cycles results in a distinctive control, but if any transient condition interrupts the continuity of this alternate control then the relay DC1-2 ceases to receive energy and remains dropped away. Obviously, the probability of a transient condition simulating this type of code is very remote and thus the organization proposed provides a very reliable means of control.

*Maintainer's call.*—In providing a centralized traffic controlling system, it is sometimes desirable to provide means for calling a maintainer or a trainman to a field station for the purpose of answering a telephone to receive instructions from a central office. Such a call is ordinarily used only at relatively infrequent intervals and for this reason it is desirable that it be added to a system with a minimum of additional apparatus.

In accordance with the present invention, it is proposed that this so-called maintainer's call may be added to the system without the necessity of additional control steps but in a special manner to employ the control steps already provided. This is believed feasible since such control is required only at infrequent intervals and will not interfere with the regular controls as and when they are required.

Referring to Fig. 22A it will be noted that the control levers SML and SGL of Fig. 8A are connected through push buttons $MC^1$ and $MC^2$ respectively to the medium amplitude bus 202. With the organization of the switch and signal controls shown in Fig. 8A there is a medium amplitude carrier pulse for the switch control on each cycle and also one for the signal control on each cycle. Referring to Fig. 22B, it will be seen that this results in the energization of the relay WZ in one direction or the other on each cycle, and also the energization of the relays RGZ and LGZ in one direction or the other on each cycle of operation. These two energizations are routed through oppositely connected windings of the maintainer's call relay MCR and contact 171 of relay CHR³ to ground. Since the energization of this relay MCR in opposite directions is in such a rapid sequence as provided by the present system, the relay MCR does not respond to either energization but remains in its last actuated position.

If the operator actuates the maintainer's call button MC¹ to open the control for the switch machine relay WZ, and thus prevents the energization of the upper winding of relay MCR, the signal control results in the energization of the lower winding of the relay MCR which effectively actuates the contact 350 to a lower position. On the other hand, if the operator actuates the button MC², the signal control for that station is interrupted but the switch control is present so that the upper winding of the relay MCR is energized while its lower winding is not. This energization causes the relay MCR to be energized in such a direction as to pick up its contact 350 which remains in that position and closes a circuit for the indicator lamp 351 and the gong or other audible signal 352.

In brief, the operator at the central office may control the relay MCT to one position by operating the maintainer's call button MC¹, and may control it to its opposite position by actuation of the maintainer's call button MC². Both of these buttons MC¹ and MC² are self-restoring push buttons and normally maintain their contacts closed, so that the usual switch and signal controls are transmitted.

*Adjustment of modulation control.*—In the above discussion in connection with Fig. 5, it was assumed that the carrier pulses are transmitted over the line circuit having sine wave forms as conventionally illustrated in Fig. 13. In other words, the carrier frequency is varied in amplitude to form pulses of carrier frequency each having an envelope of a full cycle of a sine wave beginning at one negative peak and extending to the next negative peak. The use of such a sine wave shape for modulating the carrier frequency keeps the width of the band of frequencies required to transmit the intelligence over the line circuit at a minimum. This is desirable for several reasons, including:

(a) The possibility of including more carrier frequency channels on the same line circuit.

(b) The presence of less distortion of the pulse wave shape when transmitted over a given line circuit for a given distance.

(c) The possibility of transmitting a greater distance over a given line circuit within the limits of distortion allowable for proper communication in a system of this type.

In the above description, it is assumed that the wave shapes are of perfect sine wave form, i. e. the envelopes 108, 109 and 110 in Fig. 13 are assumed to include no distortion. However, in practice it may be difficult to so set the values of the apparatus as to produce carrier envelopes that represent the ideal. Also, after any one setting there may be slight variations in the voltages supplied to the apparatus which do not warrant a readjustment of the apparatus but which would cause the modulation to be slightly imperfect. For example, it might happen that a decrease in voltage might cause the pulse envelope to reach zero earlier in the pulse period and the next pulse to leave zero late, thereby giving a flat portion along the zero axis between two successive pulses. Such imperfections of the pulse shape would cause an increase in the band width of the frequency required to transmit the intelligence. In view of this practical problem, it has been found expedient to so adjust the apparatus as to provide a small residual of carrier frequency on the line circuit rather than providing what might be termed one hundred per cent modulation. When this adjustment is used, slight variations do not change the wave shape but merely the amplitude.

This adjustment may be employed for the transmission of controls from the central office to the field stations without any modification of the apparatus either at the control office or at the field stations other than the adjustment of the apparatus. More specifically, with reference to Fig. 5 the connection 199 to the plate resistor of the inverter 122 should so be set as to give the proper control of the modulator 107. However, if this adjustment is made at the field stations in connection with the transmission of indications, there is a residual carrier placed on the line circuit by each of the several field stations, and these residual carriers may combine with the indication pulses transmitted by each of the stations in turn in such a way as to give them improper amplitudes. For this reason, it is necessary to provide circuit means at each field station which will allow the application of the residual carrier by the indication transmitter only when that station is identified for the transmission of its indication carrier pulses.

This may be accomplished as shown in Fig. 23 where the modulator 188 of Fig. 10C has its screen grid provided with a positive potential only when the normal check step 167 of the control counting chain is operated off normal with a relatively high potential applied to the wire 174 from its point *a*. This causes the modulator 188 to act as a gate and pass an output only when its screen grid is made positive. The inverter 187 is of course connected in the same way as in Fig. 5 but with the proper adjustment to give the desired control of the output.

It is to be understood that this adjustment of the modulator to give a residual carrier for reasons above explained is an optional feature and need be employed only in those cases where it is desirable because of apparatus characteristics. Obviously, if the ideal modulation control can be provided without the residual carrier between pulses, such adjustment as herein discussed becomes wholly unnecessary.

Résumé

A communication system is thus provided in accordance with the present invention which transmits intelligence by carrier pulses having sine wave shaped envelopes which begin and end in that portion of a sine wave where the rate of change is a minimum. The transmission of carrier pulses of this shape results in a minimum of distortion and provides a maximum speed of transmission together with the efficient use of the carrier line circuits.

The intelligence is transmitted by selectively determining the amplitude of the different pulses. In other words, each pulse transmitted may be any one of a plurality of different amplitudes selected in accordance with the information to be transmitted for that pulse. In order to provide transmission in opposite directions, the control pulses of one carrier frequency are transmitted from the central station to the various field stations, while the indication pulses of a different carrier frequency are transmitted from the field stations, one at a time to the central office. The different stations are identified or counted in sequence so that they are rendered available for receiving controls and transmitting indications one at a time in turn. This is accomplished by transmitting station counting pulses of a distinctive amplitude.

The various field stations are all rendered effective for transmission and reception during each cycle of operation which is made characteristic by suitable cycle marking pulses at the beginning and end of each cycle. The characteristic cycle marking pulses at the beginning of a cycle render active a time gating organization at each field station for rendering that station responsive to station counting pulses only if they are received in succession at the proper times. This provides a check against the improper operation of a station due to a transient condition on the line circuit.

The step-by-step operation of the system is effected by employing electronic apparatus which is substantially instantaneous in its response to the different step conditions. The stepping operation occurs at a receiving station in response to a pulse as detected by a low amplitude discriminator which is effective in response to the reception of pulses of low, medium or high amplitudes so that the stepping operation is performed for each pulse regardless of its particular amplitude.

The reception of a detectable pulse initiates a timing organization which is effective to cause the next step to be taken after a predetermined time which coincides with the end of a pulse period. In other words, the stepping operation is performed in response to the effective reception of a pulse without requiring means which is responsive to the termination of that pulse. This provides a stepping organization which can be responsive to received pulses in accordance with their rate of reception independently of the distortion of the trailing portions of such pulses.

The apparatus employed in the system for the step-by-step operation is provided with checking means to assure that its electronic counting chain is in the proper condition at the beginning of a cycle of operation. This apparatus operates to effect resynchronization of each station only when a fault occurs and is in addition to the provision of the cycle marking means which allows the initiation of a station only if the characteristic pulses at the beginning of a cycle are properly received.

The present invention also provides an organization for reducing the number of step devices required to count any given number of pulses, and this organization is conveniently termed a "decade counter."

The present invention also discloses how trigger pulses can be synchronized with other pulses for effecting the initiation of counting chains at the proper times.

Suitable storage means is provided for response to the momentary control conditions present on the different steps, which storage means is shown as being of two types; one of the electronic multivibrator type which remains in its last actuated position; and the other of the electronic timer type which holds its condition for a limited time and is dependent upon a subsequent actuation within that time for maintaining its active condition.

The present disclosure also provides an extra control for a maintainer's call by acting on the other controls at a time when they are not in use.

Suitable apparatus is provided at each field station for transmitting a series of pulses constituting the indications. This apparatus is initiated into operation when that station is identified for the reception of controls, but since it must make only one cycle in response to such identification, suitable means is provided to protect such counting chain against an accidental repeat operation.

In Figs. 10D and 12, the control relays WZ, RGZ and LGZ are indicated as being of the magnetic-stick type, that is, their contacts are actuated to one position or the other in accordance with their polarity of energization and remain in their last actuated positions by reason of permanent magnets incorporated in the relays. In many installations, it is desirable to use neutral relays which have stick circuits that may be locally controlled, such as in the case of the signal control where it may be desirable to cause a signal to be automatically put to stop upon the passage of a train. This type of control has been shown in the above mentioned Patent No. 2,159,922 to R. F. Wells, and it is to be understood that similar neutral relays could be employed in connection with this invention, if desired. To replace the mag-stick relay WZ would require two neutral relays each having a local stick circuit including a back contact of the other relay. Thus, when one relay would be picked up on its step, it would drop the other relay and automatically establish its own stick circuit. All such modifications of the present disclosure are to be considered as within the contemplated scope of the present invention.

It might be noted in this connection that the use of a mag-stick relay for the reception of controls, such as the relay WZ of Fig. 10D, provides a check against an improper transmission on a step. More specifically, in order to operate this relay WZ to the position shown its lower winding must be energized by its control receiver CR1 during a cycle of operation, and during this cycle of operation the control receiver CR2 must not be energized. Likewise, if the relay WZ is to have its contacts actuated to their upper positions, then the control receiver CR2 must be actuated during a cycle of operation to energize the upper winding of the relay WZ, but during that cycle the control receiver CR1 must not be actuated. In other words, the proper control for this relay WZ requires a pulse of the medium amplitude on one of its associated steps and a pulse of the low amplitude on the other of its associated steps. If pulses of the medium amplitude should erroneously occur on both of its control steps, then both windings of the relay WZ would be energized substantially at the same time, and since they are differentially connected they would oppose each other and there would be no net effect on the relay to change the position of its contacts. To this extent, the use of a magnetic-stick relay provides a checking feature not provided by the use of neutral relays, as above mentioned.

In connection with the description of the Figs. 21A and 21B, it was pointed out that the pulses of successive steps may be coded in a way to assure positive control of a device. This type of coding can be employed because the system embodying the present invention is of the continuously operating type. It should be understood in this connection, that this same principle of coding can be applied to the transmission and reception of indications as well as to the transmission of controls. This has not been shown in detail since the checking of indications in a centralized traffic control system is ordinarily not employed, but if the communication system of the present invention is adapted for some other use it is obvious that this same principle of coding controls may be applied to the return indications transmitted from the field stations to the central office.

In the description relating to the reception of controls by a field station, it was pointed out that the discriminators 151, 152 and 153 of Figs. 10A and 10C respectively control their associated one-shot multivibrators. In these figures, it is shown that this control is by direct connection between the output circuit of the discriminator to one of the gates of the associated one-shot multivibrators. On the other hand, in connection with the reception of indications as described and shown in Fig. 9, the connection between the discriminators 134 and 135 and their respective one-shot multivibrators 136 and 143 is shown as including a condenser. This use of the condenser is to be considered optional, since its main purpose is to provide control by relatively short pulses, whereas the absence of the condenser as employed in Figs. 10A and 10C provides that the control of the one-shot multivibrator 160 for example by the amplitude discriminator 151 is of a duration equal to the entire time the discriminator is operated. In some cases, this may be desirable, such as in the case shown where the double-gating of the one-shot multivibrator 160 is employed. However, it is intended to be understood that the embodiment of the invention is not limited to the use of any particular form in the particular situations shown, since these different forms are to be considered as alternative ways of accomplishing the same results.

It should also be understood that the present embodiment and its mode of operation have been described in rather specific terms for making clear the features of the present invention, but it should be understood that the particular apparatus may be considerably varied and still accomplish the functions and features of the present invention. Although only one theory of operation and functioning of the circuits and vacuum tubes has been discussed to provide a practical understanding of the invention, it should be understood that other theories of operation of the devices might be expressed in different terms but they would in no way change the practical operations, functions and relationships contemplated by this invention.

Also, the present disclosure sets forth how control pulses may be coded in a manner to check the reliability of the transmission of information. This portion of the disclosure also includes a decoding device which has been shown and claimed in the prior application Ser. No. 26,793 filed May 13, 1948, by F. X. Rees, and no claim to such decoding device per se is intended to be made in this application.

Having described a communication system of the pulsed carrier type as one specific embodiment of the present invention, it is desired to be understood that this form is selected to facilitate in the disclosure of the invention rather than to limit the number of forms which it may assume; and it is to be further understood that various modifications, adaptations and alterations may be applied to the specific form shown to meet the requirements of practice, without in any manner departing from the spirit or scope of the present invention.

What we claim is:

1. In a communication system of the electron tube stepping pulse type, a source of pulse frequency at a control office, an electron tube control counting chain at the control office operated step-by-step in response to said pulse frequency, transmitting means at the control office governed by said control counting chain for transmitting a distinctive control pulse on a particular carrier frequency for each step of said control counting chain, an electron tube control counting chain at a field station operated step-by-step in response to the reception of said control pulses of said particular carrier frequency, means at the field station rendered effective on each step of said control counting chain to register the distinctive character of the control pulse for that step, a source of pulse frequency at the field station, an electron tube indication counting chain at the field station, circuit means responsive to the initiation of said control counting chain at said field station for initiating said indication counting chain at that field station into operation to operate step-by-step in response to said associated pulse frequency through a cycle of operation, transmitting means at the field station governed by the associated indication counting chain for transmitting a distinctive indication pulse of a different carrier frequency on each step, an electron tube indication counting chain at the control office operated step-by-step in response to the reception of said indication pulses of said different carrier frequency, and means rendered effective on each step of said indication counting chain at the control office to register the distinctive character of the indication pulse for that step.

2. In a communication system of the type described, a source of pulse frequency, an electron tube control counting chain at the control office operated one step at a time for each successive pulse applied from said source of pulse frequency, carrier pulse transmitting means at the control office governed by said control counting chain on each step for transmitting a carrier pulse of a particular carrier frequency and of a distinctive amplitude on that step, an electron tube control counting chain at a distant field station operated one step at a time in response to the reception of said control carrier pulses transmitted from the control office, means rendered effective on each step of said control counting chain at the field station to register the distinctive amplitude of the carrier pulse received for that step, a source of pulse frequency at the field station, an electron tube indication counting chain at the field station operable one step at a time in response to the successive pulses applied from said source of pulse frequency, circuit means responsive to the initiation of the operation of the associated control counting chain at the field station for initiating the operation of said indication counting chain at the field station into operation by the associated pulse frequency to be operated step-by-step through a single cycle of operation, carrier pulse transmitting means at the field station governed by the associated indication counting chain for transmitting an indication pulse of a different carrier frequency and of a distinctive amplitude on each step of the indication counting chain, an electron tube indication counting chain at the control office operated step-by-step in response to the reception of said indication carrier pulses, and means rendered effective on each step of said indication counting chain at the control office to register the distinctive amplitude of the pulse for that step.

3. In a communication system of the carrier frequency pulse type for communication with a plurality of field stations, a transmitter including a source of carrier frequency pulses and effective to transmit a series of pulses to constitute a cycle of operation certain ones of which are of a particular character to identify the successive stations and others of which are of different characters to represent control influences, apparatus at each of the field stations comprising, a station counting chain including a series of electron tube devices adapted to be operated step-by-step in succession only in response to the successive station pulses of said particular character, a control counting chain including a series of electron tube devices adapted to be operated step-by-step in succession in response to the reception of pulses regardless of their character, said control counting chain being rendered active to operate in response to control pulses only when the associated station counting chain is in a condition identifying its particular station, and control receiving means for each step of said control counting chain rendered effective on its respective step to act in response to the character of the control pulse for that step.

4. In a communication system of the carrier frequency pulse type for communicating with a distant field station, a source of carrier frequency pulses, transmitting means connected to said source and effective to transmit a series of pulses to constitute a cycle of operation, the beginning of each series being made distinctive by having two pulses of a distinctive character transmitted within a predetermined time interval, a time discriminator at the field station rendered active only in response to the reception of said two pulses at the beginning of a cycle of operation only if said two pulses are received within said predetermined time, an electron tube counting chain at the station including a series of electron tube devices adapted to be operated step-by-step in succession in response to the pulses of a cycle of operation, said electron tube counting chain being rendered responsive to the pulses of a cycle only upon the operation of said time discriminator at the beginning of a cycle, whereby said electron tube counting chain cannot be initiated into operation unless the beginning of the cycle is properly characterized.

5. In an organization for transmitting carrier frequency signals from a control office to each of a plurality of field stations in succession, an electron tube counting chain including a series of electron tube devices adapted to be operated step-by-step in succession in response to a series of trigger pulses on a common trigger bus, trigger pulse producing means including a source of alternating current, an over-amplifier tube and a trigger tube for causing a trigger pulse to be placed on said trigger bus for each cycle of said alternating current, a source of carrier frequency, a pulse transmitter receiving carrier frequency from said source and capable when rendered effective of transmitting carrier frequency pulses of any one of a plurality of different characters, station identifying means for controlling said pulse transmitter on certain steps of said electron tube counting chain to transmit pulses of one particular character to successively identify the field stations, control identifying means for controlling said pulse transmitter on certain other steps following the identification of each station to cause it to selectively transmit pulses of a different character in accordance with the controls for that station, an electron tube station counting chain at each field station including a series of electron tube devices adapted to be operated step-by-step in succession in response to the reception of station counting pulses of said particular character, another electron tube control counting chain at each field station including a series of electron tube devices adapted to be operated step-by-step in succession in response to the reception of control identifying pulses when its respective station has been identified by the operation of its associated station counting chain, and control receiving means at each station controlled on each step of said control counting chain in accordance with the distinctive character of the control pulses received for that step.

6. In a communication system of the carrier frequency pulse type for communication between a plurality of field stations, a transmitter including a source of carrier frequency pulses of a particular carrier frequency and effective to transmit a series of pulses to constitute a cycle of operation certain ones of which are of a particular character to identify the successive stations and others of which are of different characters to represent control influences, apparatus at each of the field stations comprising a station counting chain including a series of electron tube devices adapted to be operated step-by-step in succession only in response to the successive station pulses of said particular character, a control counting chain including a series of electron tube devices adapted to be operated step-by-step in succession in response to the reception of pulses regardless of their character but only providing the associated station counting chain is in a condition identifying its particular station, control receiving means for each step of said control counting chain for registering on its step the particular character of the carrier frequency pulse for that step, an indication transmitter including a source of carrier frequency pulses of a different carrier frequency and effective to transmit a series of pulses to constitute the indications of the associated station each one of which is of a particular character depending upon the indication to be transmitted, said indication transmitting means being rendered active only when the associated station counting means is in a condition to identify its particular station, and an indication receiving means in the central office for receiving the indications from the different field stations in sequence.

7. In a communication system of the carrier frequency pulse type for communication with a plurality of field stations, an electron tube counting chain at a central office and another at each of the field stations, means for causing the electron tube counting chains at the field stations to operate in response to distinctive pulses transmitted from the central office by the operation of said counting chain at the central office, and means at each field station connected to the different steps of the counting chain at its station to be responsive to the characters of the received pulses for the respective steps.

8. In a communication system of the carrier frequency type for communicating with a plurality of field stations from a central office, a transmitter at the central office including a source of carrier frequency and pulse forming means constructed to transmit a series of pulses constituting a cycle of operation and including a synch pulse at the beginning followed by a plurality of spaced station call pulses, the first of said station call pulses having a corresponding space between it and said synch pulse and said series also including control pulses between successive station call pulses with those control pulses immediately following a particular station call pulse belonging to the corresponding station, receiving means at each field station effective to receive all the pulses transmitted from said control office and including a station counting chain having a plurality of electron tubes connected to operate step by step in response to input pulses, a timer responsive to an input pulse to measure a time period corresponding to the spacing between station call pulses, a synch pulse selector controlled by said receiver to supply an input pulse to said timer only in response to the reception of said synch pulse, a station call pulse gate connected to said receiver to receive input pulses, and also connected to said timer to receive an input at the end of each timing operation, but said station call pulse gate being effective to supply an input pulse to said counting chain only if a station call pulse is received immediately following the completion of a timing operation by said timer, circuit means effective to supply an input pulse to said timer each time said station call pulse gate is effective to cause an operation of said counting chain, and circuit means at each station rendered distinctively responsive to the control pulses for that station upon the operation of said station counting chain to that particular step assigned to such station.

9. In a communication system of the carrier frequency pulse type for communicating with a plurality of field stations from a central office, a transmitter at the central office including a source of carrier frequency and pulse forming means constructed to transmit a series of pulses including a synch pulse at the beginning of the series followed by a plurality of spaced station call pulses, the first of said station call pulses having a corresponding space between it and said synch pulse, receiving means at each field station responsive to all transmitted pulses and including a series of electron tubes connected to form a counting circuit operable step by step in response to input pulses, a synch pulse selector controlled by said receiver to give an output pulse only in response to the reception of said synch pulse, a timer responsive to an input pulse to measure a time period corresponding to said spacing between said station call pulses and then effective to give an output pulse, a station call pulse gate connected to said receiver to receive input pulses corresponding to said synch and station call pulses and connected to said timer to receive its output pulses but said station call pulse gate being effective to supply a pulse to the input of said counting circuit only if a station call pulse is received coincident with one of said timer pulses, circuit means connecting the output of said synch pulse selector to the input of said timer, and circuit means effective to supply an input pulse to said timer each time said station call pulse is effective to cause a stepping operation by said counting circuit.

10. In a communication system of the carrier frequency pulse type for communicating with a plurality of field stations from a central office, transmitting apparatus including a source of carrier frequency and apparatus effective to transmit different series of distinctive pulses to constitute a cycle of operation, certain pulses of which are made distinctive to identify said stations and other pulses of which are made distinctive to characterize controls for that station then identified, receiving apparatus at each field station for receiving all pulses transmitted from said control office, said receiving apparatus comprising station identifying means including a plurality of electron tube devices responsive to said station pulses to determine when its station is conditioned to receive control pulses, a plurality of electron tube devices forming a control counting chain operable step by step in response to control pulses when conditioned by said station identifying means, said control counting chain operating irrespective of the character of such control pulses, and control receiving means connected to each step of said control counting chain and conditioned on its step in accordance with the character of the control pulse for that step.

11. In a communication system of the carrier frequency pulse type, a transmitter capable of transmitting pulses of carrier frequency, each pulse having a sine wave shape beginning and ending at points of zero rate of change, and each of said pulses being made distinctive in accordance with a control condition to be transmitted, receiving apparatus at a distant location operable to receive and amplify pulses of said carrier frequency, timing means initiated by said receiver upon the reception of each pulse as soon as it has attained a predetermined value to measure a predetermined time period corresponding to a time substantially equal to the remaining duration of the pulse then being received, trigger circuit means operated by said timing means at the end of each measured period for producing a trigger pulse, an electron tube counting chain connected to operate step by step in response to each trigger pulse produced by said trigger circuit means to thereby effect the stepping operation between successively received pulses, and circuit means associated with each step of said counting chain and distinctively conditioned in accordance with the character of the pulse received during that step, whereby the step by step operation of said electron tube counting chain takes place between successive pulses in spite of such pulses being of a sine wave shape without the usual abrupt leading and trailing edges.

12. In a communication system of the carrier frequency pulse type, a transmitter capable of transmitting a series of pulses each being made distinctive in accordance with a control to be transmitted, said transmitting means also acting to cause said pulses of carrier current to be of sine wave shape beginning from zero and ending at zero, a receiving organization at a distant station including a plurality of discriminators, one for each different character of the transmitted pulses, a counting chain including a series of electron tube devices operable step by step, timing means rendered effective near the beginning of each received pulse to measure off a time period equal to the remainder of that pulse period and cause a trigger pulse to be formed and applied to said counting chain to cause the next step, and circuit means rendered responsive on each step to the condition of said discriminators to register on that step the particular character of the pulse then being received, whereby the step by step operation at the receiving station is caused to take place between successive pulses by reason of the measuring of a predetermined time from the beginning of each pulse.

13. In a communication system of the carrier frequency pulse type for communication between a central office and one or more field stations, a source of carrier frequency, a transmitter including a counting chain having a series of electron tube devices adapted to be operated step by step in succession at a particular rate, circuit means acting on each step of said counting chain to determine the distinctive character of the carrier pulse for that step, other circuit means governing said transmitter to determine that the envelope of each pulse of carrier frequency is of a sine wave form beginning and ending at points of zero rate of change, said other circuit means also causing said counting chain to take its successive steps at said zero points, a receiver at a remote station responsive to each carrier pulse to produce a trigger pulse, an electron counting chain including a series of electron tube devices adapted to be operated in turn by said trigger pulses produced by said receiver, and means controlled by said receiver on each step of said counting chain to give a distinctive output in accordance with the particular character of the pulse received for that step.

14. In a communication system of the carrier frequency pulse type, a transmitter including a source of carrier frequency and a source of modulating sine wave frequency, an electron tube counting chain connected to said modulating frequency to be operated step-by-step, one step each time said modulating frequency causes the output of said transmitter to be reduced to zero, circuit means rendered effective on each step to determine the distinctive character of the transmitter carrier pulse for that step in accordance with a control to be transmitted, a receiver at the distant field station including means to give different outputs depending upon the distinctiveness of the pulses received and acting to give a trigger pulse output for each pulse received regardless of its character, an electron tube counting chain at said station connected to be operated step by step by said trigger pulses, and means rendered effective on each step of said counting chain to be distinctively controlled on that step in accordance with the character of the pulse then being received.

FRANK X. REES.
ROBERT H. BECHTOLD.

REFERENCES CITED

The following references are of record in the file of this patent:

UNITED STATES PATENTS

| Number | Name | Date |
| --- | --- | --- |
| 1,740,556 | White | Dec. 24, 1929 |
| 1,745,072 | Wensley | Jan. 28, 1930 |
| 1,795,000 | White | Mar. 3, 1931 |
| 2,339,872 | Miller | Jan. 25, 1944 |
| 2,365,450 | Bliss | Dec. 19, 1944 |
| 2,373,134 | Massonneau | Apr. 10, 1945 |
| 2,405,096 | Mumma | July 30, 1946 |
| 2,406,803 | Chatterjea et al. | Sept. 3, 1946 |
| 2,425,307 | Desch et al. | Aug. 12, 1947 |
| 2,428,089 | Mumma et al. | Sept. 30, 1947 |
| 2,434,921 | Grieg | Jan. 27, 1948 |
| 2,438,492 | Bascom et al. | Mar. 30, 1948 |
| 2,440,278 | Labin et al. | Apr. 27, 1948 |
| 2,444,426 | Busignies | July 6, 1948 |
| 2,444,479 | Trevor | July 6, 1948 |
| 2,444,950 | Nichols et al. | July 13, 1948 |
| 2,448,487 | Field et al. | Aug. 31, 1948 |
| 2,451,812 | Desch et al. | Oct. 19, 1948 |
| 2,451,859 | Mumma et al. | Oct. 19, 1948 |
| 2,465,355 | Cook | Mar. 29, 1949 |
| 2,466,467 | Mumma et al. | Apr. 5, 1949 |
| 2,468,703 | Hamel | Apr. 26, 1949 |
| 2,471,413 | Cleeton | May 31, 1949 |